(12) United States Patent     (10) Patent No.:    US 8,977,995 B1
Arora et al.                                      (45) Date of Patent:      Mar. 10, 2015

(54) TIMING BUDGETING OF NESTED PARTITIONS FOR HIERARCHICAL INTEGRATED CIRCUIT DESIGNS

(75) Inventors: Sumit Arora, Ghaziabad (IN); Oleg Levitsky, San Jose, CA (US); Amit Kumar, Greater Noida (IN); Sushobhit Singh, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/586,495

(22) Filed: Aug. 15, 2012

Related U.S. Application Data

(63) Continuation-in-part of application No. 12/897,777, filed on Oct. 4, 2010, now Pat. No. 8,640,066, which is a continuation-in-part of application No. 12/708,530, filed on Feb. 18, 2010, now Pat. No. 8,365,113, application No. 13/586,495, which is a continuation-in-part of application No. 12/708,530, filed on Feb. 18, 2010, now Pat. No. 8,365,113, which is a continuation-in-part of application No. 12/437,096, filed on May 7, 2009, now Pat. No. 8,504,978, and a continuation-in-part of application No. 11/621,915, filed on Jan. 10, 2007, now Pat. No. 7,926,011.

(60) Provisional application No. 61/265,705, filed on Dec. 1, 2009, provisional application No. 61/164,860, filed on Mar. 30, 2009.

(51) Int. Cl.
*G06F 17/50* (2006.01)

(52) U.S. Cl.
CPC .......... *G06F 17/505* (2013.01); *G06F 2217/84* (2013.01)

USPC .......... 716/105; 716/106; 716/108; 716/110; 716/111; 716/113; 716/134; 716/136

(58) Field of Classification Search
CPC ........................... G06F 17/505; G06F 2217/84
USPC ......... 716/105, 106, 108, 110, 111, 113, 134, 716/136
See application file for complete search history.

(56) References Cited

U.S. PATENT DOCUMENTS

| | | | | |
|---|---|---|---|---|
| 5,237,514 A | * | 8/1993 | Curtin | 716/113 |
| 5,475,607 A | * | 12/1995 | Apte et al. | 716/113 |
| 5,778,216 A | * | 7/1998 | Venkatesh | 713/503 |
| 5,793,693 A | * | 8/1998 | Collins et al. | 365/230.01 |
| 5,956,257 A | * | 9/1999 | Ginetti et al. | 716/103 |
| 6,099,584 A | * | 8/2000 | Arnold et al. | 716/104 |

(Continued)

*Primary Examiner* — Helen Rossoshek
(74) *Attorney, Agent, or Firm* — Alford Law Group, Inc.; Tobi C. Clinton

(57) ABSTRACT

In one embodiment, a method of designing an integrated circuit is disclosed, including receiving a plurality of top level timing constraints and a description of the integrated circuit design defining a hierarchy of partitions having multiple levels with one or more nested partitions; generating timing models for each partition of the plurality of partitions in response to the description of the integrated circuit design; and concurrently generating timing budgets level by level for all partitions at each level, beginning with the lowest level to each next upper level of the hierarchy of the partitions in response to the description of the integrated circuit design, the timing models, and the plurality of top level timing constraints. Please see the detailed description and claims for other embodiments that are respectively disclosed and claimed.

19 Claims, 24 Drawing Sheets

(56) References Cited

U.S. PATENT DOCUMENTS

| | | | |
|---|---|---|---|
| 6,305,001 B1* | 10/2001 | Graef | 716/105 |
| 6,324,678 B1* | 11/2001 | Dangelo et al. | 716/103 |
| 6,421,809 B1* | 7/2002 | Wuytack et al. | 716/132 |
| 6,622,290 B1* | 9/2003 | Ginetti et al. | 716/113 |
| 6,622,291 B1* | 9/2003 | Ginetti | 716/108 |
| 6,658,628 B1* | 12/2003 | Landy et al. | 716/103 |
| 6,662,349 B2* | 12/2003 | Morgan et al. | 716/114 |
| 6,817,005 B2* | 11/2004 | Mason et al. | 716/116 |
| 6,845,494 B2* | 1/2005 | Burks et al. | 716/108 |
| 6,865,726 B1* | 3/2005 | Igusa et al. | 716/105 |
| 6,968,514 B2* | 11/2005 | Cooke et al. | 716/102 |
| 7,103,863 B2* | 9/2006 | Riepe et al. | 716/113 |
| 7,143,367 B2* | 11/2006 | Eng | 716/102 |
| 7,146,595 B2* | 12/2006 | Knol et al. | 716/119 |
| 7,243,323 B2* | 7/2007 | Williams et al. | 716/113 |
| 7,356,451 B2* | 4/2008 | Moon et al. | 703/19 |
| 7,401,243 B2* | 7/2008 | Knepper et al. | 713/322 |
| 7,409,652 B1* | 8/2008 | Fox et al. | 716/106 |
| 7,418,686 B1* | 8/2008 | Knol et al. | 716/118 |
| 7,475,000 B2* | 1/2009 | Cook et al. | 703/14 |
| 7,519,928 B2* | 4/2009 | Ja | 716/108 |
| 7,530,046 B1* | 5/2009 | Nixon et al. | 716/103 |
| 7,669,155 B2* | 2/2010 | Ganesan et al. | 716/100 |
| 7,720,107 B2* | 5/2010 | Bhattacharya et al. | 370/503 |
| 7,962,886 B1* | 6/2011 | Pandey et al. | 716/136 |
| 8,010,921 B2* | 8/2011 | Visweswariah | 716/113 |
| 8,250,505 B1* | 8/2012 | Borer et al. | 716/104 |
| 8,255,860 B1* | 8/2012 | Fung | 716/134 |
| 8,365,113 B1* | 1/2013 | Bhardwaj et al. | 716/106 |
| 8,456,191 B2* | 6/2013 | Kelem et al. | 326/40 |
| 8,504,978 B1* | 8/2013 | Bhardwaj et al. | 716/139 |
| 8,522,179 B1* | 8/2013 | Griesbach et al. | 716/108 |
| 8,539,402 B1* | 9/2013 | Bhardwaj et al. | 716/105 |
| 8,539,419 B2* | 9/2013 | Rao et al. | 716/122 |
| 8,543,951 B2* | 9/2013 | Rao et al. | 716/108 |
| 8,572,532 B1* | 10/2013 | Singh et al. | 716/108 |
| 8,589,838 B1* | 11/2013 | Borer et al. | 716/104 |
| 8,640,066 B1* | 1/2014 | Gupta et al. | 716/108 |
| 2003/0005398 A1* | 1/2003 | Cho et al. | 716/8 |
| 2003/0229871 A1* | 12/2003 | Nakae et al. | 716/6 |
| 2004/0003360 A1* | 1/2004 | Batchelor et al. | 716/6 |
| 2004/0078767 A1* | 4/2004 | Burks et al. | 716/8 |
| 2006/0171234 A1* | 8/2006 | Liu et al. | 365/230.03 |
| 2009/0271750 A1* | 10/2009 | Richardson et al. | 716/6 |
| 2014/0059505 A1* | 2/2014 | Blair et al. | 716/108 |

* cited by examiner

| PIN NAME | | ATTRIBUTE | SUB PROPERTIES | | |
|---|---|---|---|---|---|
| | | | CLOCK NAME | POLARITY | EXCEPTION TAG-SET |
| 2004 | | PHASE 1 | CLK1 | RISE | MCP1 |
| 2008 | | PHASE 1 | CLK1 | RISE | MCP1 |
| 2020 | IN1 | PHASE 2 | CLK1 | RISE | MCP1, MCP2 |
| 2024 | D | PHASE 3 | CLK1 | RISE | MCP2 |
| 2025 | | PHASE 1 | CLK1 | RISE | MCP1 |
| 2026 | D | PHASE 1 | CLK1 | RISE | MCP1 |

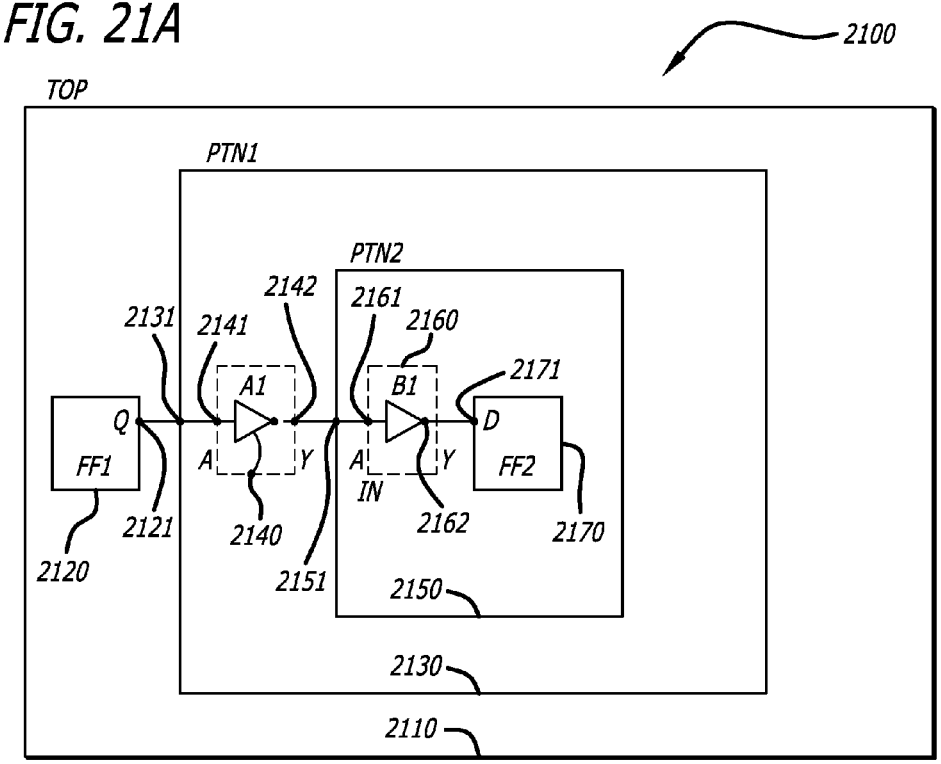

FIG. 23B
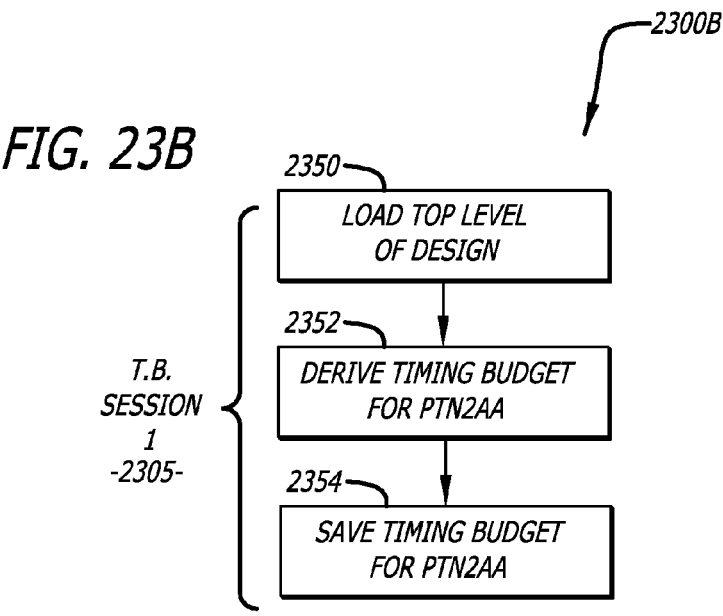
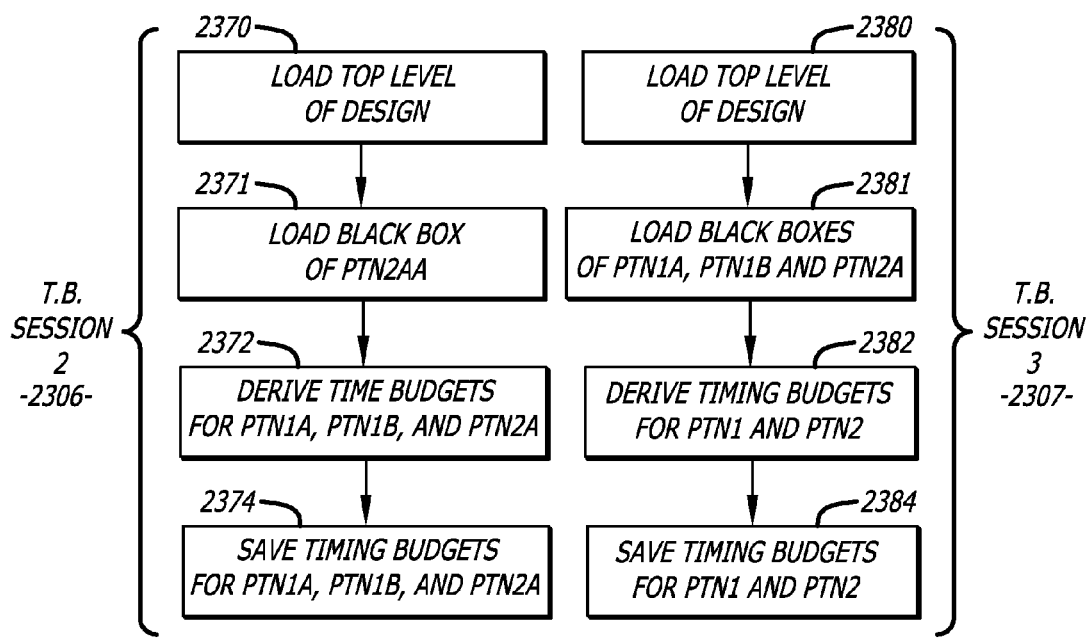

deriveTimingBudget    -DBS    *PartitionName*

TIMING BUDGETING OF NESTED PARTITIONS FOR HIERARCHICAL INTEGRATED CIRCUIT DESIGNS

CROSS-REFERENCE TO RELATED APPLICATIONS

This patent application is continuation in part and claims the benefit of U.S. Pat. No. 8,640,066 entitled MULTI-PHASE MODELS FOR TIMING CLOSURE OF INTEGRATED CIRCUIT DESIGNS filed on Oct. 4, 2010 by inventors Dinesh Gupta and Oleg Levitsky.

Further, this United States (U.S.) patent application is a continuation in part and claims the benefit of U.S. Pat. No. 8,365,113 entitled FLOW METHODOLOGY FOR SINGLE PASS PARALLEL HIERARCHICAL TIMING CLOSURE OF INTEGRATED CIRCUIT DESIGNS filed on Feb. 18, 2010 by inventors Vivek Bhardwaj et al.

U.S. Pat. No. 8,365,113 claims the benefit of U.S. Provisional Patent Application No. 61/265,705 entitled FLOW METHODOLOGY FOR SINGLE PASS PARALLEL HIERARCHICAL TIMING CLOSURE OF INTEGRATED CIRCUIT DESIGNS filed on Dec. 1, 2009 by inventors Vivek Bhardwaj et al.; and is a continuation in part claiming the benefit of U.S. Pat. No. 8,504,978 entitled USER INTERFACE FOR TIMING BUDGET ANALYSIS OF INTEGRATE CIRCUIT DESIGNS filed on May 7, 2009 by inventors Vivek Bhardwaj et al., hereby incorporated by reference; and is a continuation in part claiming the benefit of U.S. Pat. No. 7,926,011, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, hereby incorporated by reference. U.S. Pat. No. 8,504,978 claims the benefit of U.S. Provisional Patent Application No. 61/164,860 entitled USER INTERFACE FOR TIMING BUDGET ANALYSIS OF INTEGRATE CIRCUIT DESIGNS filed on Mar. 30, 2009 by inventors Vivek Bhardwaj et al.

This patent application hereby further incorporates by reference U.S. Pat. No. 7,467,367 entitled METHOD AND SYSTEM FOR CLOCK TREE SYNTHESIS OF AN INTEGRATED CIRCUIT filed by inventors Li et al. on Oct. 27, 2005; and U.S. Pat. No. 8,594,988 entitled METHOD AND APPARATUS FOR CIRCUIT SIMULATION USING PARALLEL COMPUTING filed by inventors Athanasius W. Spyrou on Jun. 21, 2007.

FIELD OF THE INVENTION

The embodiments of the invention generally relate to design methods for timing closure of integrated circuit designs.

BACKGROUND

The design of integrated circuit chips continues to evolve from the original concept of having more than one function on a chip to a complete system of components on a chip. Fabrication technology continues to rapidly decrease the design features size and increase the manufacturability size of a chip. This enables a large number of functions, available to a designer, to be incorporated on a chip. Designers then, have the ability to create systems on an IC that are increasingly more complex, very large and require a high-level design language in order to build, verify and test integrated circuit systems.

The task of designing these integrated circuits is also very complex and time consuming, involving synthesizing, analyzing and optimizing many circuit parameters. Because of this complexity, electronic design automation (EDA) systems have been developed to assist designers in developing integrated circuit designs at multitude levels of abstraction.

To ease the design of a complex integrated circuit, design tasks may be divided up into multiple functional blocks with a plurality of levels of hierarchy. However, dividing up an integrated circuit design into multiple blocks and hierarchical levels can complicate the evaluation of the overall circuit design. Moreover an integrated circuit design may be so large in size or scale (e.g., 1 million gates or more), each partition may have numerous signal paths (e.g., hundreds of thousands of signal paths for data, address, control, and clock signals) and numerous input, output, or input/output ports (e.g., thousands of ports).

With giga-gate (e.g., 1 billion gates or more) scale integrated circuit designs, robust hierarchical solutions to analyzing integrated circuit designs become even more important. Limits of computer capacity have bound chip designers to implement giga gate chip designs hierarchically. However, dividing the semiconductor chip hierarchically and implementing it through software is a complex and involved process. The added prototyping complexity involved can be justified if the implementation process yields quick turnaround times without extra iterations or repetition in the design flow process. With a giga gate chip design, hierarchical design becomes the preferred choice, but fast turnaround times in chip closure remains a factor to reckon with.

Designing an integrated chip utilizing a hierarchical approach provides the designer a method to reduce turnaround time. Another method to further decrease turnaround time that is commonly deployed is to create partitions within the design. Especially when designs are very large in size and complexity, they may be partitioned into smaller blocks or partitions based upon logical hierarchy. Timing budgeting derives input and output delay constraints along with path exceptions for the timing closure of these hierarchical blocks or partitions, enabling the timing closure of all the blocks simultaneously. This helps designers by saving time and minimizes the computing infrastructure required.

Partitioning a design is beneficial for analyzing integrated circuits such as with time budgeting, however, designers may want to create a nested partition to further control the implementation parameters of a function or sub circuit within a partition. Existing budgeting methodologies typically allow for only one level of partition such that there is no straightforward design flow for handling time budgeting of nested partitions.

Timing budgets for data paths are usually automatically generated in early design stages when the integrated circuit design may be incomplete or have errors so that generated timing budgets may require manual correction and analysis. The process of automatic timing budgeting is usually focused on worst case scenarios i.e., overly pessimistic that may lead to errors. The timing budgeting for blocks or partitions are specifically an issue due to multiple paths that must be analyzed that may share a common input and output.

As the complexity of designing integrated circuits continues to push the limits of the design software infrastructure, the high level description languages may need to change in order to minimize the limitations/burden to the designer. The embodiment of this invention expands the capability of the design tools for the designers of integrated circuits such that timing goals of an integrated circuit design may be met.

SUMMARY OF THE INVENTION

The embodiments of the invention are best summarized by the claims. However in brief, a number of embodiments of the invention provide time budgeting of nested partitions in the hierarchy of partitions for integrated circuit designs during the time budgeting process. Beginning with the lowest level to each next upper level of the hierarchy of partitions in the integrated circuit design, timing budgets are concurrently generated for all partitions at each level, level by level, in one time budgeting session to reduce the time spent generating timing budgets for all partitions of an integrated circuit design.

BRIEF DESCRIPTION OF THE DRAWINGS

The present invention is illustrated by way of example, and not limitation, in the figures of the accompanying drawings in which like references indicate similar elements and in which:

FIG. 21A illustrates an exemplary portion of an integrated circuit design that includes a partition with a nested partition.

FIG. 21B illustrates an exemplary portion of an integrated circuit design that illustrates a case where the nested partition is committed and is a black box.

FIG. 21C illustrates an exemplary portion of an integrated circuit design that illustrates a case where the nested partition is uncommitted and has a full netlist available.

FIG. 23B illustrates a bottoms up timing budget process with multiple time budgeting sessions for the exemplary hierarchy of the integrated circuit design shown in FIG. 22.

DETAILED DESCRIPTION

Figure 1:
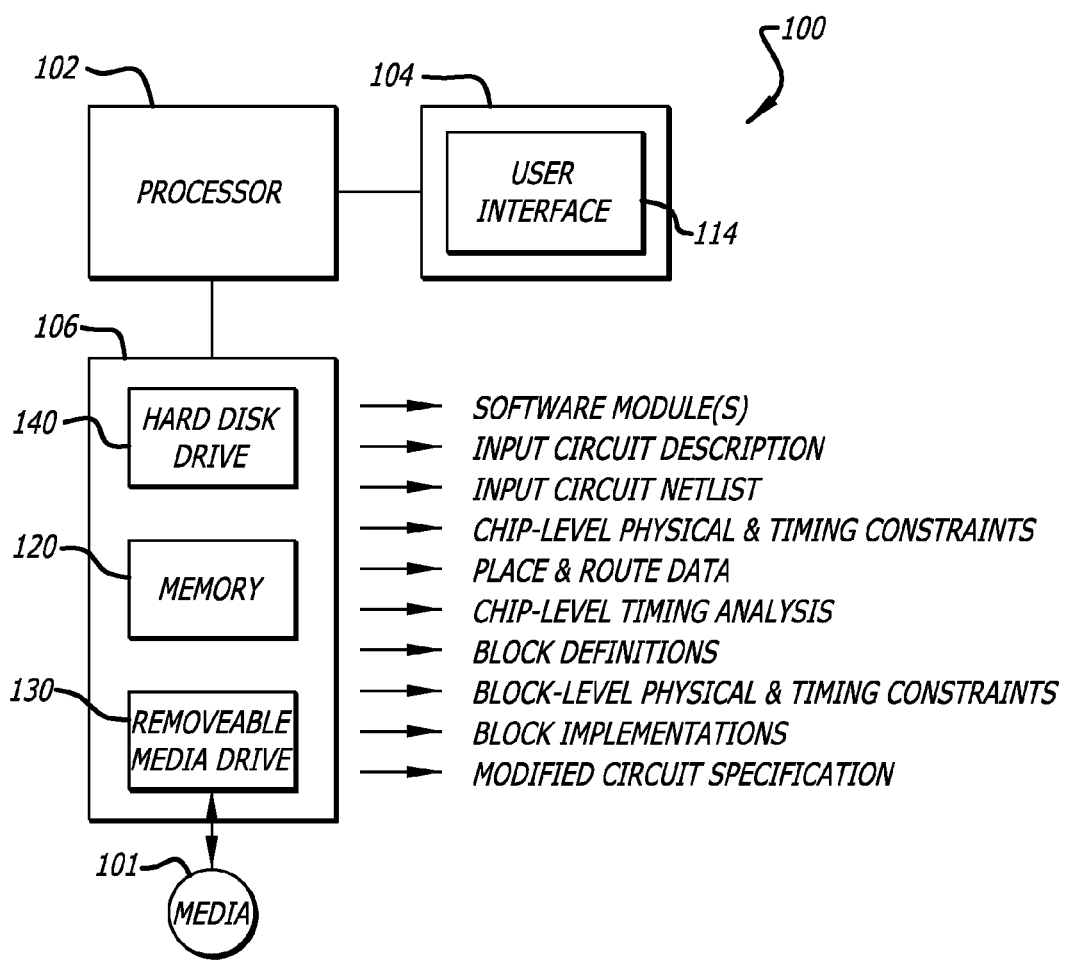
FIG. 1 illustrates a block diagram of an exemplary system for designing integrated circuits including a design flow for timing closure.

In the following detailed description of the embodiments of the invention, numerous specific details are set forth in order to provide a thorough understanding of the aspects of the invention. However, it will be obvious to one skilled in the art that the embodiments of the invention may be practiced without these specific details. In other instances well known methods, procedures, components, and circuits have not been described in detail so as not to unnecessarily obscure aspects of the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Introduction

The embodiments of the invention facilitate budgeting of clock signal timing and data signal timing of nested partitions of an integrated circuit design as part of the time budgeting flow or methodology. Time budgeting divides the time for a data signal to propagate along the data path across partition boundaries. Time budgeting also divides the time for clock signals (clock division) to propagate along clock paths across partition boundaries. That is, the embodiments of the invention facilitate budgeting of clock timing along with the budgeting of existing data or signal timing. The clock budget timing may be modeled in the timing models for partitions and nested partitions. An improved design flow may be implemented that provides a single parallel time budgeting execution process with little to no manual intervention, re-budgeting or serialization.

Time budgeting of data paths (data time budgeting) was described previously in U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, and U.S. Patent Application No. 61/265,705, entitled FLOW METHODOLOGY FOR SINGLE PASS PARALLEL HIERARCHICAL TIMING CLOSURE OF INTEGRATED CIRCUITS filed by Bhardwaj et al. on Dec. 1, 2009 are hereby incorporated by reference. As part of the timing budgeting process, U.S. patent application Ser. Nos. 11/621,915 and 61/621,705 describe embodiments that generate block-level timing constraints of data paths for each block-level circuit. The block-level timing constraints of data paths may be used to budget timing of functional modules or blocks within an integrated circuit design. Timing budgeting of the data paths allows partitioning an integrated circuit design into separate blocks or modules (partitions) that may have nested partitions and perform a stand alone optimization of each based on the generated constraints, including timing constraints.

Timing budgeting is a part of the block implementation/design in the IC design flow or sequence that allows generating timing and physical constraints for each partition and nested partition (e.g., module, block, etc.) of an integrated circuit design, prior to completing the physical design.

For clock time budgeting, a total chip clock delay at the top level of hierarchy is divided up amongst the partitions and nested partitions in parallel with the data time budgeting of the data signal paths. Given a clock delay number that represents a delay within the block, the time budgeting module breaks the total chip clock delay into external clock delay and internal clock delay across the partition boundary. The time budgeting module defines the external clock delay as a source latency in the block constraint file. The budgeting module defines the internal clock delay as a network latency in the block constraint file. The budgeting module further defines or puts the internal clock delay number in the block timing model.

A high level logic synthesis tool translates a high level description of a circuit into a gate level netlist and maps logic gates of a cell library therein to form a flattened gate level netlist of the entire circuit, referred to as a chip netlist or a chip-level netlist. A timing analysis with a timing simulator may be used to verify that chip level timing constraints are being met by the chip level netlist. Partitioning and timing budgeting may be performed on the chip level netlist. With the chip level netlist being partitioned and timing budgeting performed, further implementation by logic synthesis and timing analysis may be independently applied to a hierarchy of an integrated circuit design.

In one embodiment of the invention, a method for integrated circuit design and analysis is disclosed. The method includes defining a hierarchy having multiple levels with a plurality of nested partitions; committing a netlist to the plurality of nested partitions, concurrently generating timing budgets for each of the plurality of nested partitions in the multiple levels of hierarchy; pushing level timing constraints to one or more of the partitions; and generating timing models for each of the plurality of partitions.

In another embodiment of the invention, a system for designing an integrated circuit is disclosed. The system includes a processor and a storage device to store instructions for execution by the processor. The storage device having instructions stored therein to adapt the processor to perform one or more of the operations and functions described herein including receiving a plurality of top level timing constraints and a description of the integrated circuit design; determining an order of hierarchy of partitions from the innermost partition to the outermost partition; and concurrently generating timing budgets level by level from the innermost partition to the outermost partition for all partitions at each level in response to the order of hierarchy of partitions, the top level timing constraints, and the description of the integrated circuit design.

In still another embodiment of the invention, a machine readable product for designing an integrated circuit is disclosed. The machine readable product comprises a machine readable storage device having stored therein machine readable instructions. The machine readable instructions, when executed by a machine such as a processor, function to perform one or more of the operations and functions described herein, including receiving a plurality of top level timing constraints and a description of the integrated circuit design defining a hierarchy of partitions having multiple levels with one or more nested partitions; generating timing models for each partition of the plurality of partitions in response to the description of the integrated circuit design; and concurrently generating timing budgets level by level for all partitions at each level, beginning with the lowest level to each next upper level of the hierarchy of the partitions in response to the description of the integrated circuit design, the timing models, and the plurality of top level timing constraints.

Circuit Design System

FIG. 1 illustrates a block diagram of an exemplary circuit design system 100 for designing integrated circuits in accordance with an embodiment of the invention. As discussed in more detail below, the circuit design system 100 is capable of generating timing constraints for individual hierarchical blocks of an integrated circuit that are derived from the chip-level timing constraints and analysis. Using the chip-level timing constraints and analysis, the circuit design system 100 is capable of generating block-level timing constraints for module or block-level circuits as well as other constraints for time budgeting. The block-level timing constraints may be in the form of one or more logical timing constraint points associated with ports of a block-level circuit. The block-level timing budgeting data may be propagated to the timing budgeting data of other modules and blocks in the hierarchy of the integrated circuit so that when the blocks are finally assembled together to form the entire chip, timing closure for the entire chip can be achieved.

The circuit design system 100 may be configured as one or more computer systems comprising one or more processors 102, an input/output interface 104, and one or more storage devices 106. The one or more processors 102 may be any type of data processing device, including microprocessors, microcontrollers, reduced instruction set computer (RISC) processors, networked computer systems, etc. or a specialized processor for performing integrated circuit design. The one or more storage devices 106 may be any one or more computer readable mediums include memory devices 120, storage media 101 readable by a removable media drive 140, and/or a hard disk drive 140 (e.g., RAM, ROM, magnetic hard disks, optical storage discs, etc.) for storing one or more software modules of instructions that control the processor 102 to perform its various operations. The one or more storages devices 106 may store information (e.g., circuit netlist, constraints, etc.) as well that the processor 102 uses in performing the circuit design process described herein. Such information may include the input circuit description specified by a user, the input circuit netlist generated by a logic synthesis operation, the chip-level physical and timing constraints, place and route data including chip-level timing analysis generated by a place and route operation, block definitions including block-level physical and timing constraints generated by a chip partitioning operation, block implementations generated by a block implementation operation, and the modified circuit specification generated by a chip assembly and top-level implementation operation, and verified by a circuit sign-off verification operation. Use of a plurality of computer systems over a network for circuit simulation of blocks in parallel is further described in U.S. patent application Ser. No. 11/766,775 entitled METHOD AND APPARATUS FOR CIRCUIT SIMULATION USING PARALLEL COMPUTING filed by inventors Athanasius W. Spyrou on Jun. 12, 2007, Under the control of instructions of one or more software modules stored in the one or more storage devices 106, the one or more processors 102 may perform the various operations of the circuit design system 100, including logic synthesis, chip-level floor planning, place and route, chip partitioning, block implementation, top-level implementation, chip assembly, and circuit sign-off verification.

The input/output interface 104 allows a user to send and receive information to and from the processor 102, as well as control the various operations performed by the processor 102. For example, the input/output interface 104 may comprise one or more input devices, such as a keyboard, a pointing device (e.g., a mouse, a track ball), a touch-sensitive display, microphone, etc. The input/output interface 104 may also comprise one or more output devices, such as a display (including a touch-sensitive display) driven by a graphics generator, speakers driven by an audio generator, etc.

Using the one or more input devices of the input/output interface 104, a user may specify an input circuit description in any of a number of formats, including in a hardware description language (HDL), such as VHDL or Verilog, or in a resistor-transistor logic (RTL) language. Using one or more output devices of the input/output interface 104, a user may view the results of the circuit design operation performed by the processor 102. The user may also control the circuit design operations performed by the processor 102 using the input/output interface 104.

The timing budgeting graphical user interface (GUI) 114 is displayed graphically in a graphics window on a display device (one of the input/output devices 104, e.g., liquid crystal display or cathode ray tube display) for viewing by a user and to interact with the user using other input devices (e.g., a mouse, with mouse buttons, and a graphical pointer generated by a graphics generator). Instructions stored in the one or more storage devices 106, when executed by the processor 102, may generate the timing budgeting graphical user interface (GUI) 114 for one or more blocks/modules in response to one or more of the partitioning of the chip level netlist, chip-level design constraints (e.g., timing constraints, physical constraints, etc.), a timing library for the standard circuit cells in the IC design, timing models for macros/black boxes in the IC design, if any, a chip floorplan, and an initial placement data of cells and an initial route data of wire nets, if available.

Chip Hierarchy

Figure 7:
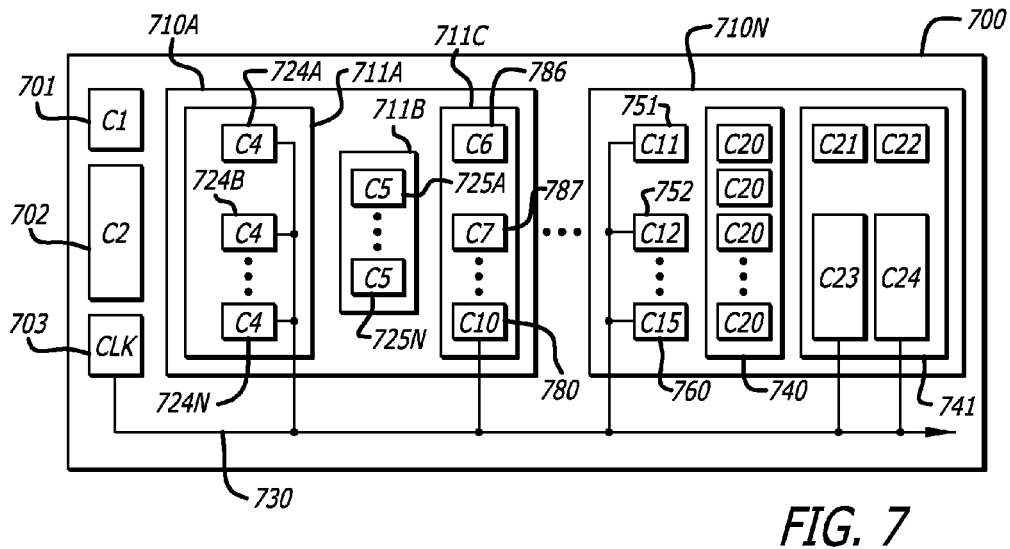
FIG. 7 illustrates a block diagram of an exemplary integrated circuit design depicting an exemplary hierarchy of instantiation.
Figure 8:
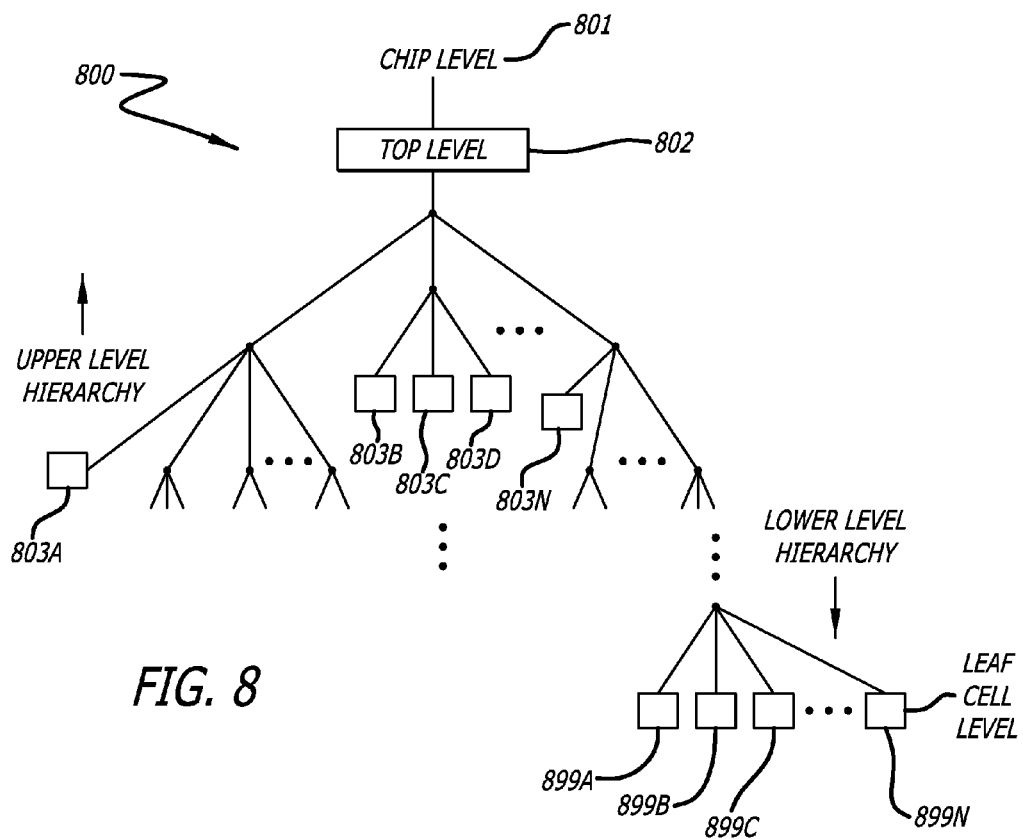
FIG. 8 illustrates an exemplary tree diagram of an integrated circuit design illustrating different levels of hierarchy.

Referring now to FIG. 7, the embodiments of the invention are used to design an integrated circuit, such as an exemplary integrated circuit 700. The integrated circuit 700 can be represented in a number of different ways such as a flattened chip or a tree hierarchy of different levels of circuits. One representation of the integrated circuit 700 is by a hierarchical netlist with different levels of hierarchy including a top level with one or more types of partitions (e.g., macro-blocks, modules or partitions (also referred to as upper-level blocks), blocks, sub-blocks, and leaf-cells or gates) at lower block levels instantiated therein. The levels of hierarchy often include a top level 802; one or more block-levels 803A-803N, and a cell, gate or leaf level 899A-899N as illustrated in the exemplary hierarchy tree of FIG. 8. The cells at the leaf level 899A-899N of hierarchy may include transistors that may make up one or more logical gates.

The top-level 802 of the hierarchy of the integrated circuit 700 may include one or more cells 701-703, one or more upper-level blocks 710A-710N, and top level interconnect 730, for example. At the one or more block levels 803A-803N, the upper level block 710A may include one or more lower level blocks 711A-711C. At the one or more block levels 803A-803N, the upper level block 710N may include one or more cells 751-760 and one or more lower level blocks 740-741. The lower level blocks may include additional blocks or leaf cells at leaf cell levels 899A-899N. For example, blocks 711A-711C respectively include leaf cells 724A-724N; leaf cells 725A-725N, and leaf cells 726-730. In a block, the same leaf cell may be instantiated numerous times, such as a D flip flop to make up a register, for example. In block 711A, the same cell C4 is instantiated N times as leaf cells 724A-724N. In another block, different leaf cells may be instantiated depending upon the desired logical functionality.

Alternatively, the integrated circuit 700 may be represented by a flattened chip level netlist of leaf-cells or gates without any added levels of hierarchy. Instead of a block level hierarchy, a flattened netlist may be used so that all design details of the integrated circuit are visible at the chip level 801.

A flattened chip level netlist of an integrated circuit 700 is typically used to perform chip-level timing analysis as entire data paths with their delay elements are more visible. However, timing closure by an EDA tool may be more difficult to obtain with a flattened chip level netlist on an entire integrated circuit. Additionally, one computer system is typically used to perform a timing analysis on a flattened chip level netlist, as it is difficult to share the computational load of a flattened chip level netlist with other networked computers. With a limited amount of computer resources, the time to perform a timing analysis of an entire integrated circuit chip may be quite long given today's complicated integrated circuits. In contrast with a hierarchical netlist of an integrated circuit, block-level timing analyses can be independently performed on a block by block basis using block level timing requirements and a top level timing analysis can be performed using the top level interconnect, models of the blocks, and top level circuitry, if any. The block-level timing analyses, the top level analyses, as well as timing budget generation and analyses, can be shared amongst a plurality of networked computer systems so that it can be performed independently in parallel and achieve timing results and timing closure for the overall integrated circuit chip sooner.

Figure 5:
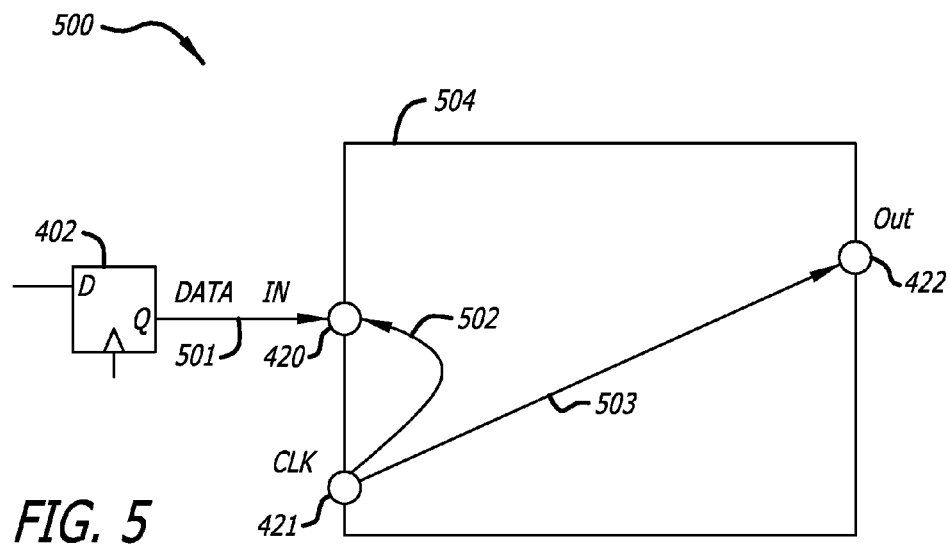
FIG. 5 illustrates a timing graph of a data path and a clock path in the exemplary partition.
Figure 6:
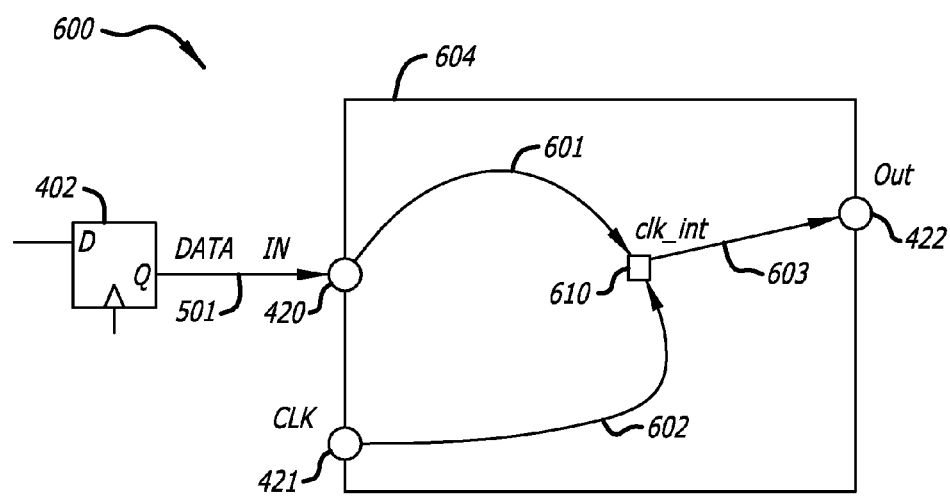
FIG. 6 illustrates a clock delay timing graph of the data path and clock path in the exemplary partition to budget for clock timing in the partition.

To speed the timing analysis at the top level, the blocks may be modeled with a simple timing model, such as by a timing graph shown in FIGS. 5-6, for the purpose of analyzing timing at the top level. The more accurate the timing model of the blocks, the more accurate is the timing analysis of the top level of the integrated circuit.

The cell 703 may be a clock generator or clock buffer that generates a clock signal CLK 730 that is coupled into one or more partitions, blocks and cells at various levels of hierarchy in the chip. The clock signal 730 may experience various timing delays along the clock path before reaching a logic gate or register within a block. Exemplary timing delays in the clock path are described herein with reference to FIG. 4A and FIG. 9. Previously, the timing model for the blocks may have ignored the timing delays in the clock path or treated it uniformly. Embodiments of the invention provide a new timing model for the partitions, blocks, and cells that considers the timing delays in the clock paths to allow independent timing analysis between blocks and the top level and improve accuracy in the timing analysis thereof.

Software Module System

Figure 2A:
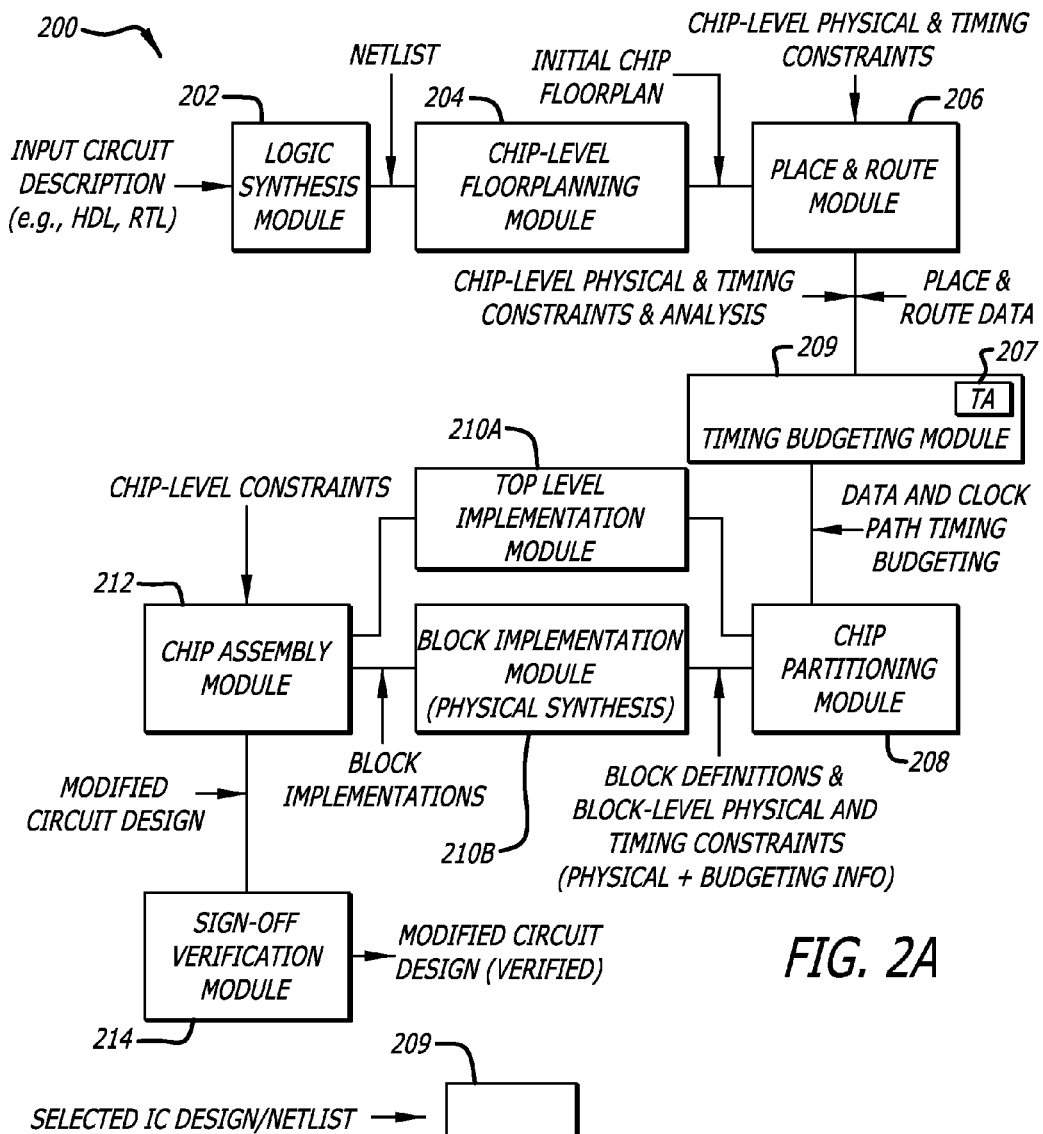
FIG. 2A illustrates a block diagram of exemplary software modules used in an exemplary integrated design system.

FIG. 2A illustrates a block diagram of an exemplary software suite 200 used by the circuit design system 100 in performing its circuit design function. The software suite 200 includes a logic synthesis module 202, a chip-level floor planning module 204, a place and route module 206, a chip partitioning module 208, a timing budgeting module 209, a top-level implementation module 210A in parallel with a block implementation module 210B, a chip assembly module 212, and a circuit sign-off verification module 214.

The logic synthesis module 202 generates a gate-level netlist from an input circuit description specified by a user using the input/output interface 104 (FIG. 1). The chip-level floorplanning module 204 generates an initial chip floorplan from the gate-level netlist.

The place and route module 206 generates an initial layout for the chip-level circuit using the initial chip floorplan and flat chip-level physical and timing constraints, and flat chip level timing constraints. The flat chip-level physical constraints and flat chip level timing constraints may be specified by a user using the input/output interface 104. Alternatively, the input/output interface 104 or other software module can generate flat chip-level timing constraints. This is ok.

Figure 2B:
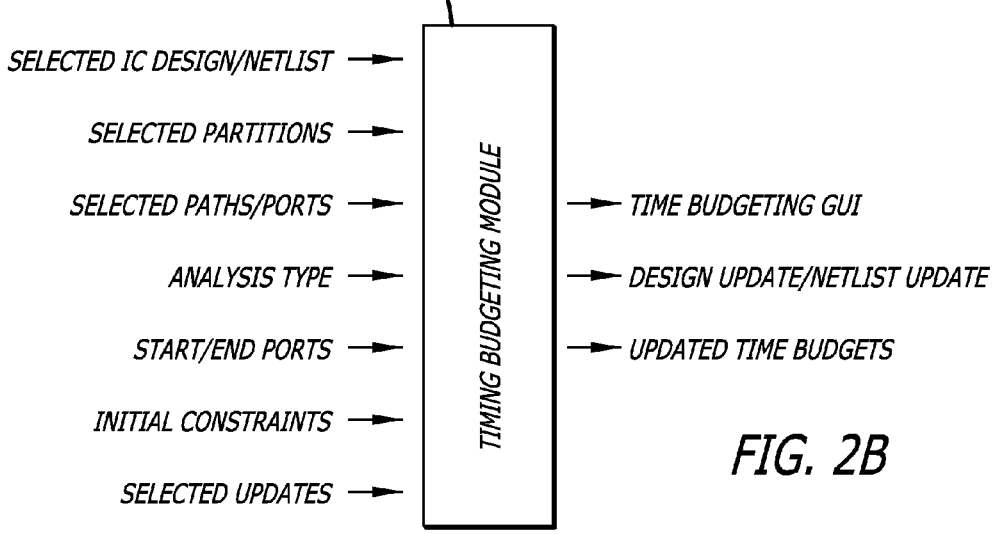
FIG. 2B illustrates a block diagram of an exemplary timing budgeting software module used in the exemplary integrated design system.

FIG. 2B illustrates a block diagram of the timing budgeting software module 209 with exemplary input/outputs. The timing budgeting module 209 generates timing budgets independent of the physical partitioning in response to a timing budget command (deriveTimingBudget). The timing budgeting module 209 may include a timing analysis (TA) module 207 that is called by the timing budgeting module to calculate delays along one or more selected signal paths of an integrated circuit design. The timing budgeting module 209 automatically generates initial time budgets (both data timing budgets and clock timing budgets for each partition) and then analyzes and adjust the initial time budgets for the various levels of hierarchy and blocks in the integrated circuit design, prior to completion of the physical layout. Budgeting information can be saved with a budgeting command (saveTimingBudget) without saving the physical portions of the IC design. While the IC design is being partitioned, in response to a savePartition command, timing budgets may be saved concurrently with the saving of the partitions generated after the physical partitioning module 208 of the IC design.

The chip partitioning module 208 partitions the initial chip layout into a top level and various hierarchical block-level circuits, and generates block-level physical and timing constraints instantiated into the top level. In response to the flat chip-level physical constraints and flat chip level timing constraints, the chip partitioning module 208 generates the top-level physical constraints and top-level timing constraints as well as the block-level physical constraints and block-level timing constraints for each block-level partition.

The block top-level implementation module 210 generates block implementations from the block definitions and block 210A optimizes the top-level netlist in response to the top-level physical and constraints, the top-level timing constraints, and the timing models of the partition blocks generated by the timing budgeting module 209. The timing models of the blocks generated by the timing budgeting module 209 includes timing constraints for both data paths and clock paths in each partition block.

The block implementation module 210B optimizes the block-level netlists (also referred to as block level implementation) in response to the block definitions, the block-level physical constraints, and the block-level timing constraints. The block implementation module 210B and the top level implementation module 210A operate independent of each other so that the top level and the block partitions can be implemented concurrently in parallel.

The chip assembly module 212 assembles the block implementations, together merging them within the top-level to form a flat chip level implementation. The chip assembly module may further optimize the assembled flat chip level implementation using chip-level constraints to generate a modified circuit design.

The sign-off verification module 214 verifies that the modified circuit design performs to the specification of the integrated circuit design.

The chip partitioning module 208 can generate block-level timing constraints for data paths into each block-level circuit that are derived from the flat chip-level timing constraints and analysis. The block-level timing constraints for data paths are in the form of logical timing constraint points (hereinafter referred to as "logical TC points") at the data input and/or output ports of each defined block-level circuit where a data path crosses a partition boundary. Each logical TC point defines a clock source parameter for specifying a clock governing the propagation of data through a data path that passes through the block port, the delay parameter specifying a data propagation delay at the block port associated with a preceding or following block, and any applicable timing exceptions associated with the data path. Using the logical TC points, the block implementation module 210 performs timing analysis and/or optimization on the individual blocks to obtain implementations for the blocks. The derivation of the logical TC points from the chip-level timing constraints ensures that when the implemented blocks are subsequently assembled into the entire chip by the chip assembly and top level implementation module 210, timing closure for the entire chip can be achieved, and verified by the circuit sign-off verification module 212.

Clock ports are different from input and output data ports. A clock port is where a clock signal enters a partition block crossing over the partition boundary. More than one clock signal may enter a partition block so that different circuits may be clocked differently. There is one clock signal per clock port that may result in one or more clock paths between a clock source and one or more respective clock sinks within a partition block.

Clock Time Budgeting with Data Time Budgeting

The timing budgeting module 209 may automatically generate initial data timing budgets and clock timing budges for each partition block. The timing budgeting module 209 may also analyze and adjust the initial time budgets for the various levels of hierarchy and blocks in the integrated circuit design, prior to completion of the physical layout. U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, incorporated by reference, describes embodiments that generate block-level timing constraints for the data paths in each block-level circuit. Chip level timing constraints are used to automatically generate the initial timing budgets for each of the partitions (e.g., functional modules or blocks) of an integrated circuit design as part of the timing budgeting process.

During the timing budget generation process, the timing budget analysis module 209 generates constraints (physical and timing constraints) for each partition, whether it is a module, a block, or other level of hierarchy in the integrated circuit design, including data path timing constraints and clock path timing constraints. An initial analysis is performed for each partition to determine their ports and check for false paths that may occur due to an improper assertion on the part. The false paths are saved in a first file (e.g., a warning file or .warn file) within a storage device. An initial timing budget analysis is performed to trace selected paths to generate detailed information regarding the path and how the initial timing budget information was automatically assigned. The detailed information regarding the path is saved in a second file (e.g., a justify budgeting file or justifyBudget file) within the storage device. The detailed information may also be generated interactively. A timing budget analyzer may display some of the timing budgeting information contained in the second saved file (e.g., the justify budgeting file) to report it to the user.

Figure 11:
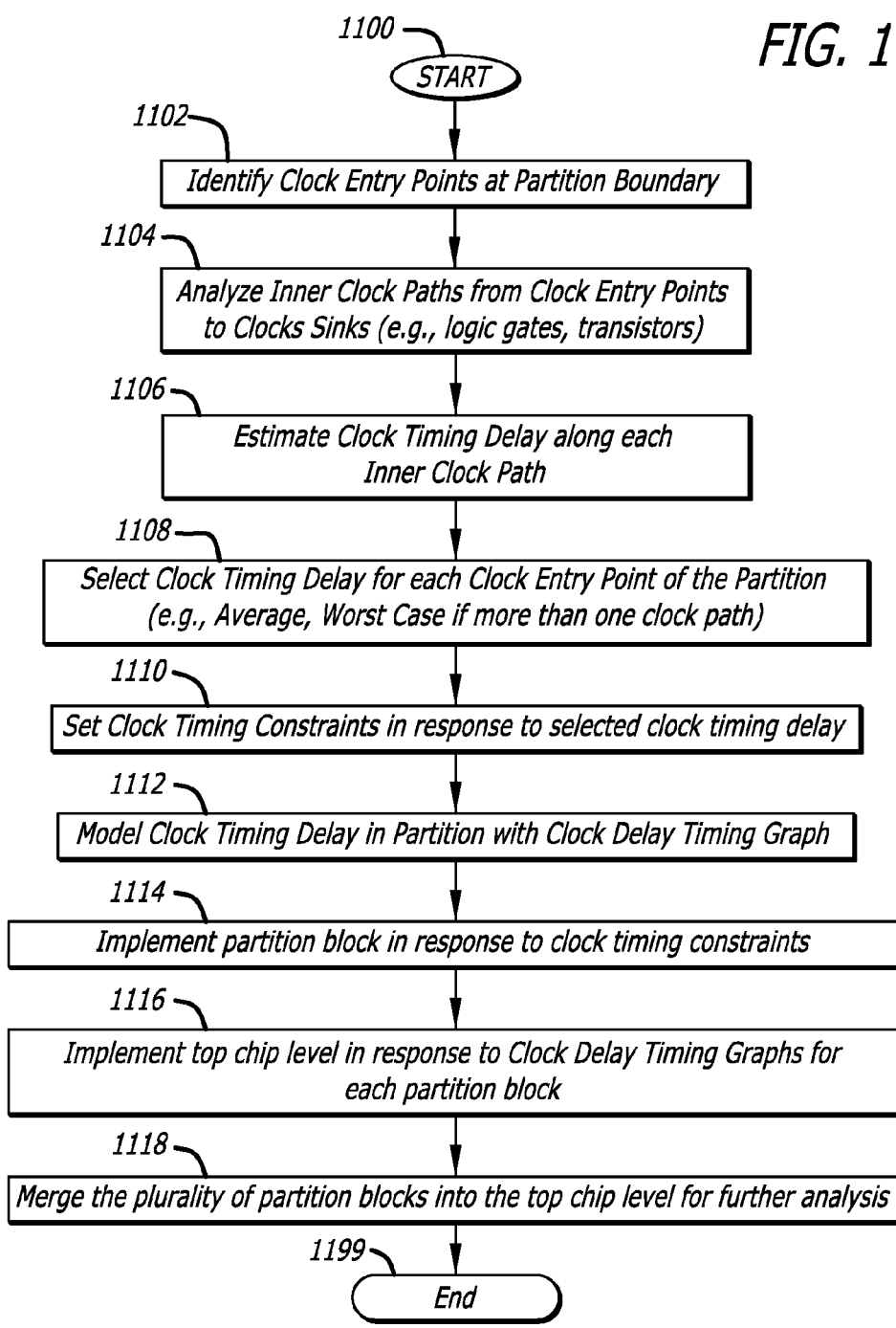
FIG. 11 illustrates a flow chart of an exemplary method of designing in parallel a top chip level and partition blocks on lower levels of a chip hierarchy.

Referring now to FIG. 11, a method of clock timing budgeting is now described with reference to FIGS. 4A-4B, 5-7 including automatic generation of block level timing constraints for the inner clock paths in each block-level circuit. The method starts at process 1100 and then goes to process 1102.

At process 1102, each partition block is analyzed to determine one or more clock entry points (CEP) at the partition boundaries for one or more clock signals used therein.

Figure 4A:
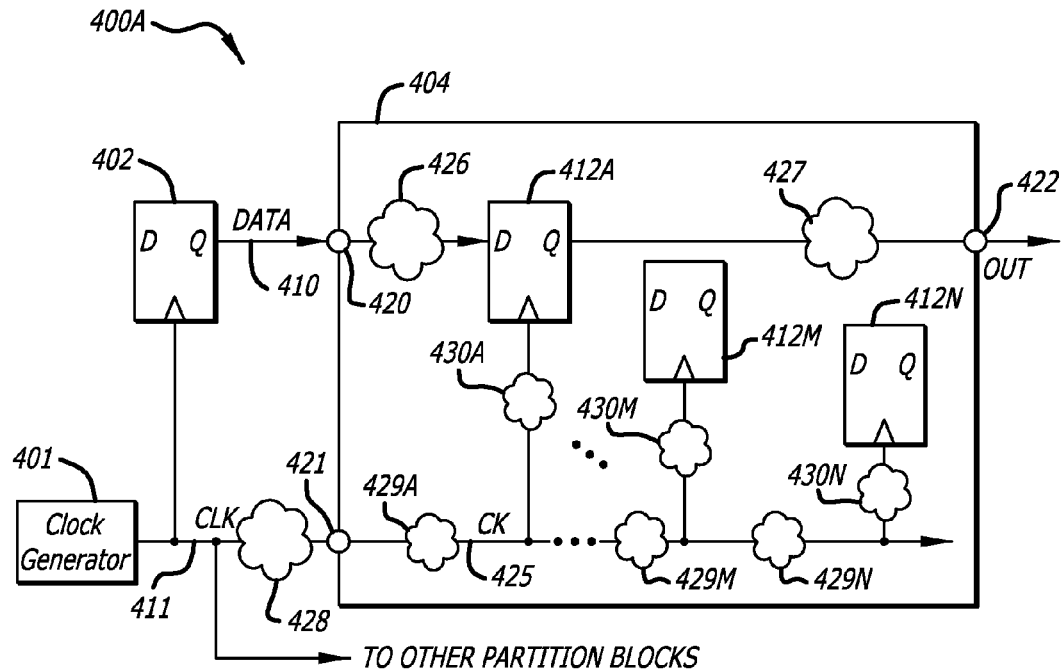
FIG. 4A illustrates an exemplary integrated circuit design partition with data and clock inputs.

Referring now to FIG. 4A, a block diagram of a circuit 400A including an exemplary partition block 404 is shown. The partition block 404 has a data entry point DEP 420, a clock entry point CEP 421, and a data out point DOP 422 at the partition boundary separating the internal circuits and paths of the partition from external circuits and paths. The entry points 420-422 may also be referred to as pins of the partition block.

A clock generator 401 generates an external clock signal CLK 411 that is coupled into the block 404 at the clock entry point 421. The clock generator 401 may be a simple clock buffer for buffering an input clock signal or a more complex circuit such as a clock oscillator circuit or a phase locked loop (PLL) clock generator to form the external clock signal CLK 411.

The clock paths between the source and the sinks are divided or split up at each clock entry point 421 of the partition block. Conceptually, the total clock delays from chip clock root or source outside the block to the sinks inside the blocks are divided or split into portions outside and inside the block. The clock timing delay portion inside the block is referred to as the intra-partition clock delay. The clock timing delay portion outside the block from the clock source is referred to as the source latency. The value of the intra-partition clock delay within a block may be selectively defined by a user or estimated from a chip-level clock tree, such as described in METHOD AND SYSTEM FOR CLOCK TREE SYNTHESIS OF AN INTEGRATED CIRCUIT filed by Li et al. issued as U.S. Pat. No. 7,467,367. The intra-partition clock delay is used to perform clock budgeting.

At process 1104, inner clock paths are analyzed from the clock entry points to the clock sinks A clock sink is a logic gate or transistor that receives the clock signal.

Figure 4B:
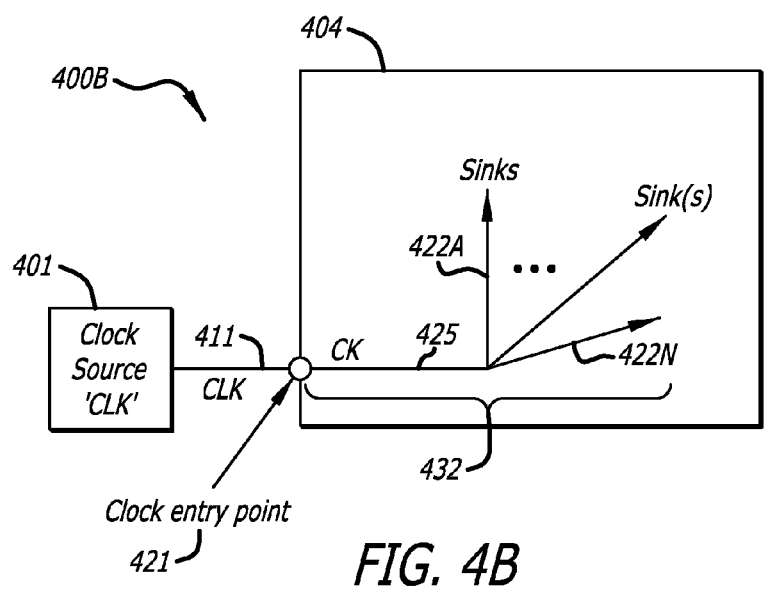
FIG. 4B illustrates an exemplary wire diagram of clock loading.

FIG. 4B illustrates a circuit 400B with clock generator 401 generating an external clock signal CLK 411 on an external clock signal path to extend into an inner clock signal path 432 within a partition block. The external clock signal CLK 411 entering into the partition block 404 at the clock entry point CEP 421, becomes the inner clock signal CK 425 on the inner clock signal path and drives the various one or more clock sinks 422A-422N (e.g., clock receiver, clock gated transistor) inside the block 404. The one or more clock sinks 422A-422N may correspond to one or more D flip flops or registers 412A-412N within the block.

Referring back now to FIG. 4A, the external clock signal CLK 411 is coupled into the partition block 404 at the clock entry point CEP 421 becoming the inner clock signal CK 425. The external clock signal CLK 411 may be coupled into other partition blocks within the integrated circuit chip. The external clock signal CLK 411 may pass through some resistor-capacitor parasitic loads and/or combinational logic 428 before being coupled into the partition block 404 at the clock entry point CEP 421. The inner clock signal CK 425 is coupled into the clock input of the D flip-flops/registers 412A-412N. However, before the inner clock signal CK 425 reaches the clock input of the D flip flops/registers 412A-412N, it may also pass through resistor-capacitor parasitic loads and/or input digital combinational logic 429A-429N and resistor-capacitor parasitic loads and/or input digital combinational logic 430A-430N.

An external D flip-flop or register 402 (a plurality of D flip-flops in parallel coupled to a bus forming a register), internal to another partition or at a different hierarchical level, generates an external data signal DATA 410. The external data signal DATA 410 is coupled into the block 404 at the data entry point DEP 420.

The external data signal DATA 410 may pass through some resistor-capacitor parasitic loads and/or input digital combinational logic 426 before being input for capture into an internal D flip flop or register 412A. The Q output signal from the internal D flip-flop or register 412A is actively generated upon receipt of an edge of the inner clock signal CK 425. When active, the Q output signal from the internal D flip flop or register 412A may pass through some resistor-capacitor parasitic loads or output digital combinational logic 427 before being output from the block 404 as the output signal OUT at the data out point DOP 422. The partition block 404 may include other internal D flip flops or registers 412B-412N each having their own clock path and data path that may or may not have input digital combinational logic 426 and/or output digital combinational logic 427.

At process 1106, the clock timing delay along each inner clock path is estimated. A clock entry point may have one or more inner clock paths to one or more clock sinks. The clock timing delay from the clock entry point to each clock sink may be estimated as the resistor-capacitor parasitic loads and/or input digital combinational logic along each path may differ.

Figure 9:
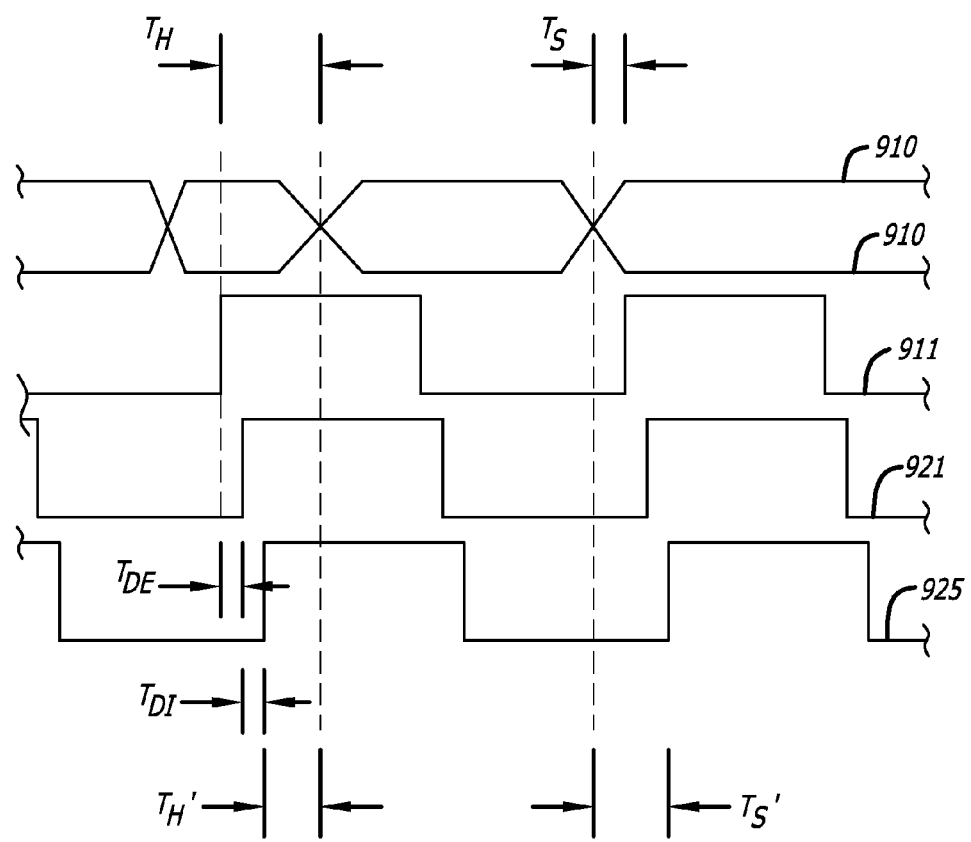
FIG. 9 is a waveform timing diagram illustrating exemplary timing in the clock path with respect to data timing.

FIG. 9 illustrates exemplary timing delays for signals around the exemplary partition block 404. A clock signal waveform 911 is exemplary of a clock signal 411 generated by the clock generator 401. Due to the timing delays from one or more of the resistor-capacitor parasitic loads and/or combinational logic 428, 429A-429N, and 430A-430N in the clock path an exemplary clock signal waveform 925 may be formed representing the internal clock signal CK 425 that is coupled into clock logic or one or more internal D flip flops/registers 412A-412N. A data signal waveform 910 represents timing of an exemplary data signal 410 that may be coupled into a partitioned block.

Without any delay in the clock path, the transistor circuits in a D flip-flop/register 412A-412N will have a setup time Ts and a hold time $T_H$ constraint for the data signal with respect to a rising or falling edge of the clock signal clocking the D flip-flop/register, such as that shown between waveforms 910 and 911 in FIG. 9.

External clock timing delay $T_{DE}$ in the clock path 411 external to the partition, due to resistor-capacitor parasitic loads and/or combinational logic 428 or otherwise, results in a delayed clock signal such as exemplified by waveform 921 at the clock entry point 421. An exemplary external clock timing delay $T_{DE}$ is shown between the difference in the timing of edges in the waveforms 911 and 921 of FIG. 9.

Internal clock timing delay $T_{DI}$ in the clock path 425 within a partition, due to resistor-capacitor parasitic loads and/or combinational logic 429A-429N and 430A-430N or otherwise, results in a delayed clock signal such as exemplified by waveform 925. An exemplary internal clock timing delay $T_{DI}$ is shown between the difference in the timing of edges in the waveforms 921 and 925 of FIG. 9.

The delayed clock signal can alter the setup and hold times at a D flip/flop or register within a partitioned block. Assuming the data signal waveform 910 does not change, a delay in the clock signal can alter the setup and hold times, such as a shorter hold time $T_H$' and a greater setup time Ts', as illustrated by the relationship between waveforms 910 and 925 in FIG. 9. Representing the delays in the clock path during clock budgeting can assist in obtaining timing closure of an integrated circuit design sooner.

To estimate the timing delays in the clock paths, the resistor-capacitor parasitic loads and/or input digital combinational logic along each path may be estimated as a function of distance due to placement of the gates and transistors and parasitic capacitance values for the leaf cells of the circuits in a cell library. If the clock paths are routed after the clock tree is synthesized, the parasitic resistances and capacitances may be extracted from the routed clock paths to perhaps obtain a better estimate of the clock timing delay along each clock path.

At process 1108, a clock timing delay is respectively selected for each of one or more clock entry points of each partition block. As mentioned herein, each clock entry path may have multiple clock paths resulting in multiple clock timing delay values for the respective clock entry point. For simplification, a single value is selected to represent the clock timing delay for the multiple paths. If a single path, the value may be based on the single clock timing delay that is determined from the one clock path. In the case of a plurality of clock paths associated with the same clock entry point, the value may be selected based on a heuristic, such as the worst case clock timing delay, an average clock timing delay, or a weighted average clock timing delay of the plurality of clock timing delays.

At process 1110, clock timing constraints are set in response to the selected clock timing delay.

Assume that the nominal clock latency or clock timing delay for the partition block 404 is along an inner clock path CK 432 from the clock entry point CEP 421 to a clock sink S (e.g., sink 422N). The nominal clock latency or delay along this inner clock path CK 432 may also be referred to as the inter partition delay (abbreviated as inter_ptn_delay) and assigned to an inner clock signal pin CK 425 of the partition block. The inter partition delay value may vary from partition block to partition block.

At a top level, there is a given overall chip constraint for clock delay or latency. This top or chip level clock timing constraint has an overall chip target timing latency or delay that may be referred to as chip target delay (abbreviated as chip_target) and assigned to the chip clock signal pin CLK.

The original chip level timing constraint, chip_target, for the clock may be set by the following instruction:

set_clock_latency<chip_target>CLK

With the chip level clock timing constraint, clock timing constraints can be written for inner clock signal pin CK of the block 404. The following instructions are written into the block constraint file to set the clock timing constraint for the block 404:

set_clock_latency<inter_ptn_delay>CK
    set_clock_latency-source<chip_target-
       inter_ptn_delay>CK At process 1112, the clock timing delay in each partition is modeled by a new timing graph that considers clock latency or clock timing delays. The new timing graph may be referred to as a merged data and clock constraint (MDCC) timing graph. FIG. 6 illustrates an exemplary merged data and clock constraint timing graph 600 that models data path timing with clock timing constraints. To generate a MDCC timing graph, an initial timing graph may be formed that models data path timing alone.

FIG. 5 illustrates an initial timing graph 500 with a block model 504 that models data path timing and constraints in the partition block 404, before clock time budgeting. The block model 504 includes a timing arc 502 from the clock entry point CEP 421 to the data entry point DEP 420, and a timing arc 503 from the clock entry point CEP 421 to the data out point DOP 422. The timing graph 500 may further include a timing arc 501 to model the input delay along the external data signal DATA 410 from the data output Q of the D flip-flop or register 402 into the block 404 at the data entry point DEP 420.

The timing arc 502 has setup and/or hold timing constraints for the data signal at the data entry point DEP 420 with respect to the clock signal CLK. The timing arc 503 has an internal data signal timing delay constraint for the data path within the partition block 404. However, neither timing arc 502 nor timing arc 503 considers that there may be an inter partition delay in the clock path. The partition block model 504 may be updated to take into consideration the inter partition delay through clock time budgeting.

Referring now to FIG. 6, a MDCC timing graph 600 including a partition block model 604 for clock time budgeting is illustrated. Like the timing graph 500, the MDCC timing graph 600 may further include the timing arc 501 to model the input delay along the external data signal DATA 410 from the data output Q of the D flip-flop or register 402 into the block 404 at the data entry point DEP 420.

To take into consideration the inter partition delay through clock time budgeting, a new internal timing pin 610 (may be referred to as an internal clock time budgeting pin (clk_int) 610) is introduced within the partition block model 604. Replacing the timing arc 502 of FIG. 5 are an internal clock timing arc 602 and an internal data input timing arc 601. The internal clock timing arc 602 is formed from the clock entry point CEP 421 to the internal clock time budgeting pin 610. The internal data input timing arc 601 is formed from the data entry point DEP 420 to the internal clock time budgeting pin 610. The timing arc 503 of FIG. 5 is replaced by a data output timing arc 603 and the internal clock timing arc 602. The data output timing arc 603 is formed from the internal clock time budgeting pin 610 to the data output point DOP 422. The timing arcs may also be referred to as timing vectors. The timing arcs may be replaced with intra-partition delay characterization. That is, the timing arcs can be modeled or characterized for the budgeted/estimated timing delays for both the data paths and the clock paths into and out from the partition block.

The arrival timing arc 601 includes the arriving combinational logic delays or arriving constraint checks (e.g., setup time, hold time). The outgoing timing arc 603 includes the outgoing combinational logic delays. The internal clock timing arc 602 has an estimated partition clock latency. If parasitic resistances and capacitances are extracted from the building of clock buffer tree with a clock tree synthesis tool, a more substantial real partition clock latency may be associated with the internal clock timing arc 602 instead.

The internal clock timing arc 602 has a latency or delay (intra-partition clock latency) corresponding to the clock intrapartition delay time (intra_ptn_delay or IPD). The timing constraint of the data output timing arc 603 may be that of the timing arc 503 but adjusted for the delay (intra_ptn_delay or IPD) of the internal clock timing arc 602. The internal data input timing arc 601 has a data delay corresponding to the budged data delay, including the setup time for the data path. As shown by the arcs in FIG. 6, the intra-partition clock latency associated with the internal clock timing arc 602 has an effect on timing of the data paths involving the internal data input timing arc 601 and the data output timing arc 603.

The timing graph 600, also referred to as a timing budget model or timing budget abstraction, may be used to model timing of each partition block at the top level so that data path timing requirements are met during timing analysis at a top level, including the influence that the intra-partition clock latency may have on timing of the data path. That is, the data path timing is responsive to the clock timing budgeting and the intra-partition clock latency. The timing graph 600 may also be used for comparison to determine if the design of the partition block meets both the data and clock timing constraints.

As mentioned herein, the clock time budgeting allows for design and analysis of the top level of the chip in parallel with the design and analysis of the lower levels of the hierarchy such as the partition blocks. Accordingly, processes 1114 and 1116 while shown in series in FIG. 11 may be performed in parallel.

At process 1114, each partition block may be implemented (e.g., designed, analyzed, optimized, etc. in detail) independent from the top level and each other partition block in response to the data path and clock timing constraints.

At process 1116, the top chip level may be designed in detail independent from the lower levels of the hierarchy in response to block timing models, the clock delay timing graphs for each partition block.

At process 1118, after the top level and block levels have been implemented, they may be merged together to complete the chip design. The completed chip design may then undergo further analysis so that design goals and specifications are met.

At process 1199, the processing of the integrated circuit design may end.

IC Design Methods with Clock and Data Time Budgeting

Figure 10:
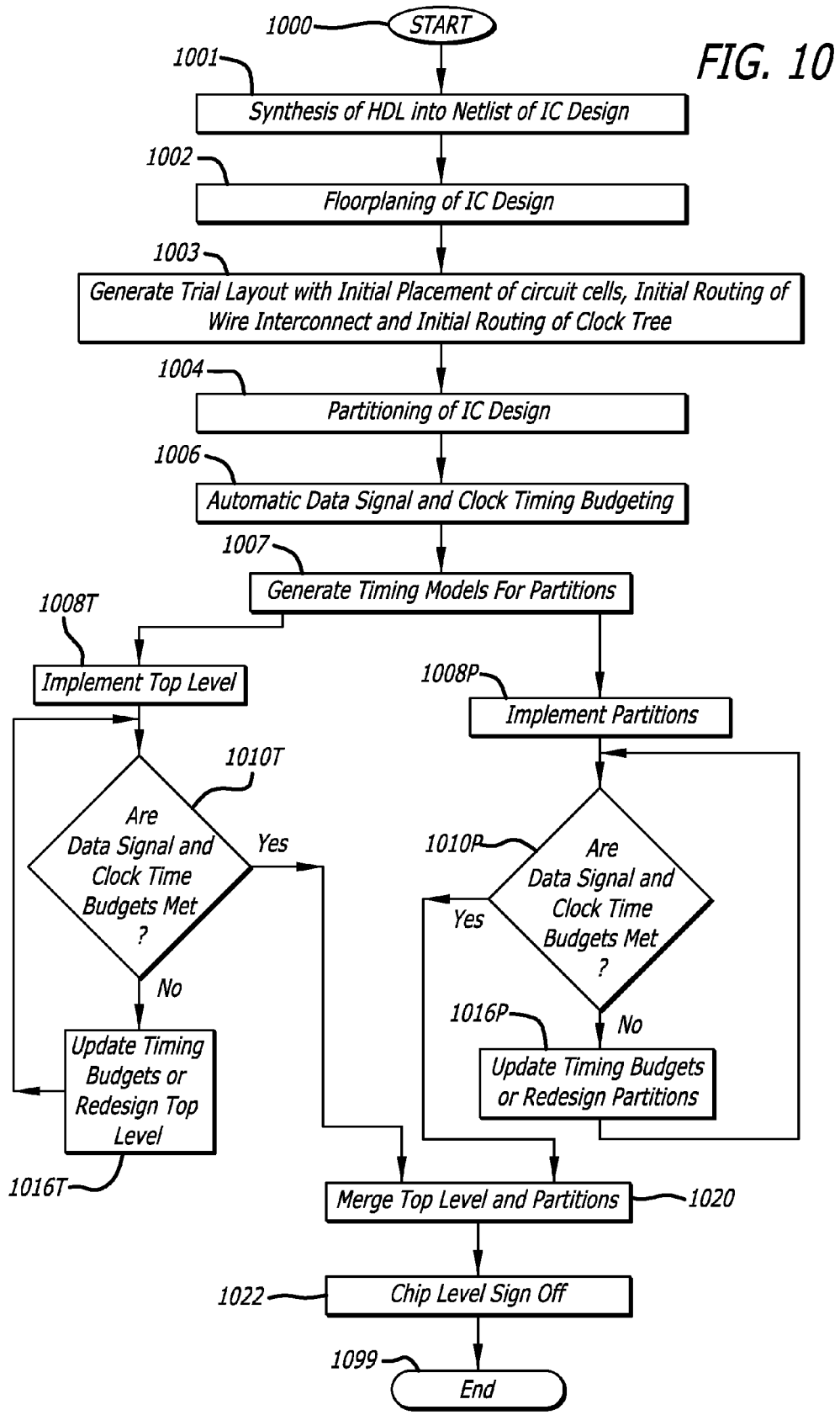
FIG. 10 illustrates a flow chart of an exemplary method of budgeting clock timing.

Referring now to FIG. 10, a flow chart illustrates an exemplary process of integrated circuit design with clock and data timing budget. The process starts at block 1000 and then goes to block 1001.

At block 1001, a high level description of the integrated circuit (IC) design is logically synthesized into a netlist of the IC design. The process then goes to block 1002.

At block 1002, a floor plan for the layout of the integrated circuit design may be planned out. Major logical blocks of the IC design or partitions may be positioned in a floor plan of the layout based on certain constraints during the floorplanning process. The process then goes to block 1003.

At block 1003, an initial placement of circuit cells, an initial routing of wire interconnect forming data paths, and an initial clock tree synthesis and routing may be performed to generate a trial layout of the integrated circuit design. This is to better gauge data signal timing delays in wire interconnect in the data paths and clock timing delays in the wire interconnect in the clock paths of the IC design. The process then goes to block 1004.

At block 1004, to ease design and analysis, the integrated circuit design is partitioned into a plurality of partitions by partitioning up the netlist. The partitioning process is responsive to the floor plan and the initial placement of the circuit cells and initial the routing of wire interconnects and clock tree of the trial layout. The initial chip level netlist of the integrated circuit design is partitioned into a hierarchy of a top level and a plurality of partitions (e.g., partition blocks,). The top level includes an initial top level netlist and each partition includes an initial partition netlist. The process then goes to block 1006.

At block 1006, in response to the initial partition netlists and the initial top level of the integrated circuit design, data timing budgets and clock timing budgets for the plurality of partitions and the top level of the integrated circuit design may be automatically generated. The automatically generated timing budgets are saved to a file so that they can be read for later analysis and implementation of the detail design of the partition blocks and top level. The process then goes to block 1007.

At block 1007, a timing model for each of the one or more partitions of the integrated circuit may be generated in response to the one or more partition interfaces specified in the top-level netlist, the data timing budgets and the clock timing budgets. Each timing model includes an intra-partition clock timing constraint for each respective partition. The process then splits up into parallel processes that may be concurrently performed and goes to blocks 1008P and 1008T.

At block 1008P, one or more partition blocks may be implemented in response to the clock timing budgets for the clock paths and the data timing budgets for the data paths. The implementation of each block includes a block level timing analysis of the partition and an optimization the partition block netlist from an initial partition block netlist into an optimized partition block netlist. The partition netlist is optimized to meet constraints and the clock and data timing budgets. In the timing analysis, timing delays are computed for each block/circuit cell along one or more desired data signal paths for data path timing budget analysis. The timing delays contributed by each block are summed up along each selected signal paths entire length from a start point to an end point as it traverses one or more levels of hierarchy of the IC design, in response to the netlist. Timing delays are computed along the clock path for a timing budget analysis. The process may then go to block 1010P.

At block 1010P, a comparison process automatically compares the timing delay along data paths and clock paths with the data time budgets and clock time budgets, respectively. Alternatively, the comparison process 1010P may be a manual comparison process performed by a designer.

Further at block 1010P, a determination may be made by as to whether or not the data and clock timing budgets are being met along the data and clock signal paths. If a timing budget is not being met along a data signal path or a clock signal path, the path may be flagged as failing. A failing path may warrant further timing budgeting analysis to determine where a path is not meeting the data or clock timing budget. A graphical user interface (GUI) as described in U.S. patent application Ser. No. 12/437,096 entitled USER INTERFACE FOR TIMING BUDGET ANALYSIS OF INTEGRATED CIRCUIT DESIGNS filed on May 7, 2009 by inventors Vivek Bhardwaj et al., may be used to analyze a failing path. If the timing budget is not being met along a signal path, a user may elect to update a timing budget or redesign the IC in the next process, block 1016P. If the timing budgets are being met, updating/redesign process of block 1016P can be skipped and goes to process block 1020.

At block 1016P, if timing budgets are not being met (e.g., time delay is over timing budget), the timing budgets for the partitions of the IC design may be selectively updated. More likely, the netlist of the IC design may be updated so that the selected path under analysis will meet the timing budgets.

A failing clock path may be redesigned so that it meets the clock timing budgets. A partition block may be redesigned to reduce an inner clock timing delay along an inner clock path from a clock entry point at a partition boundary to a clock sink. The inner clock path may be redesigned to reduce an inner clock timing delay. Alternatively or conjunctively, an external clock path from the clock source to the clock entry point at the partition boundary may be redesigned to reduce the external clock timing delay. Logic gates clocking a clock in the clock path may be reduced to reduce the clock timing delay. Parasitic resistance and/or parasitic capacitance may be reduced in the clock path to reduce the clock timing delay. The process may then go back to block 1010P to determine if the timing budgets are being met.

At block 1008T, the top level is implemented in response to the initial top level netlist, the top level constraints (physical and timing constraints) or the clock timing budgets for the clock paths and the data timing budgets for the data paths in the top level, and each of the respective timing budgeting models for each partition instantiated into the top level. The implementation of the top level includes a top level timing analysis of the top level netlist and an optimization the top level netlist from an initial top level netlist into an optimized top level netlist.

At block 1010T, a comparison process automatically compares the timing delay along data paths and clock paths in the top level with the data time budgets and clock time budgets, respectively. Alternatively, the comparison process 1010T may be a manual comparison process performed by a designer.

Further at block 1010T, a determination may be made by as to whether or not the data and clock timing budgets are being met along the data and clock signal paths in the top level. If a timing budget is not being met along a data signal path or a clock signal path, the path may be flagged as failing. A failing path may warrant further timing budgeting analysis to determine where a path is not meeting the data or clock timing budget. A graphical user interface (GUI) as described in U.S. patent application Ser. No. 12/437,096 entitled USER INTERFACE FOR TIMING BUDGET ANALYSIS OF INTEGRATE CIRCUIT DESIGNS filed on May 7, 2009 by inventors Vivek Bhardwaj et al., may be used to analyze a failing path. If the timing budget is not being met along a signal path, a user may elect to update a timing budget or redesign the IC in the next process, process block 1016T. If the timing budgets are being met, updating/redesign process of process block 1016T can be skipped and the process goes to process block 1020.

At process block 1016T, if timing budgets are not being met (e.g., time delay is over timing budget), the timing budgets for the top level of the IC design may be selectively updated. More likely, the netlist of the IC design may be updated (optimized) so that the selected path under analysis will meet the timing budgets of the top level.

A failing clock path may be redesigned so that the partition meets the data path clock path timing budgets. The top level may be redesigned to reduce, an external clock path from the clock source to the clock entry point at partition boundaries may be redesigned to reduce the external clock timing delay. Logic gates in the top level clocking or buffering a clock in the clock path may be reduced to reduce the clock timing delay. Parasitic resistance and/or parasitic capacitance may be reduced in the clock path to reduce the clock timing delay in the top level. The process may then go back to block 1010T to determine if the timing budgets are being met in the top level.

At process block 1020, the pluralities of partitions are merged into the top level design and to form a flattened chip level implementation. The flattened chip level may be analyzed so determine if the chip level timing constraints are being met. The process may then go to process block 1022.

At process block 1022, if the flattened chip level design or implementation meets the chip level constraints, the chip level design may be signed off. If the data path and clock path time budgeting is sufficiently accurate, the flattened chip level netlist may meet chip level timing constraints with a single optimization of the top level and each partition block to achieve a single pass design flow. That is, to achieve a single pass design flow, the data path and clock path time budgeting is sufficiently accurate so that the flattened chip level netlist meets chip level timing constraints without more than a single optimization of the top level or the partition block.

One or more of the processes may be repeated if the netlist of the IC design is updated or the budgets are updated. If constraints are met, repetition of a step may not be needed and the process may go to block 1099 and end.

Single Pass Parallel Flow Design Methodology

Previously, the design flow process to achieve signal timing goals was repetitive (not single pass) and difficult to partition into parallel independent jobs. Without accurate clock network delays, the data timing budgets generated for partitions could be poor, such that timing closure may not be achieved. The timing design flow process often included rebudgeting and repartitioning after physical clock tree synthesis phase to achieve timing closure. Without clock latency modeling, the library models generated by data time budgeting are mostly useless during clock tree synthesis at the top level. Accurately modeling the clock latency is important so that time budgeting information remains valid for an accurate top level analysis during clock tree synthesis of the chip. Otherwise, designers need to wait for all partitioned blocks to have timing closure before starting top level clock tree construction and top level timing analysis.

At the block level, without clock latency modeling, two different sets of timing constraints are needed for partitioned blocks—an initial set of timing constraints prior to clock tree synthesis and a revised set of timing constraints post clock tree synthesis. With the two different timing constraints, a repetitive iteration in the design of the partition block may be needed.

Clock budgeting/division and modeling fills gaps in the design flow so that a single pass timing closure with partitioned blocks being analyzed in parallel together may be achieved. Parallel timing analysis of the top chip level design and the partitioned blocks in a hierarchy can speed turn around time. Achieving rapid timing closure can also speed time to market of new circuit designs. A fast clock tree synthesis (CTS), such as described in U.S. Pat. No. 7,467,367, can be performed early in the design flow to synthesize an initial clock tree of a plurality of clock paths into each partition to get estimated clock budgets. The clock tree path within each partition may be saved to a CTS file for each respective partition that contains the intra-partition clock latency determined from the fast CTS. Otherwise, intra-partition clock latency for each partition block may be supplied by the expert user/designer, which can be then used in the clock budgeting process.

Figure 3:
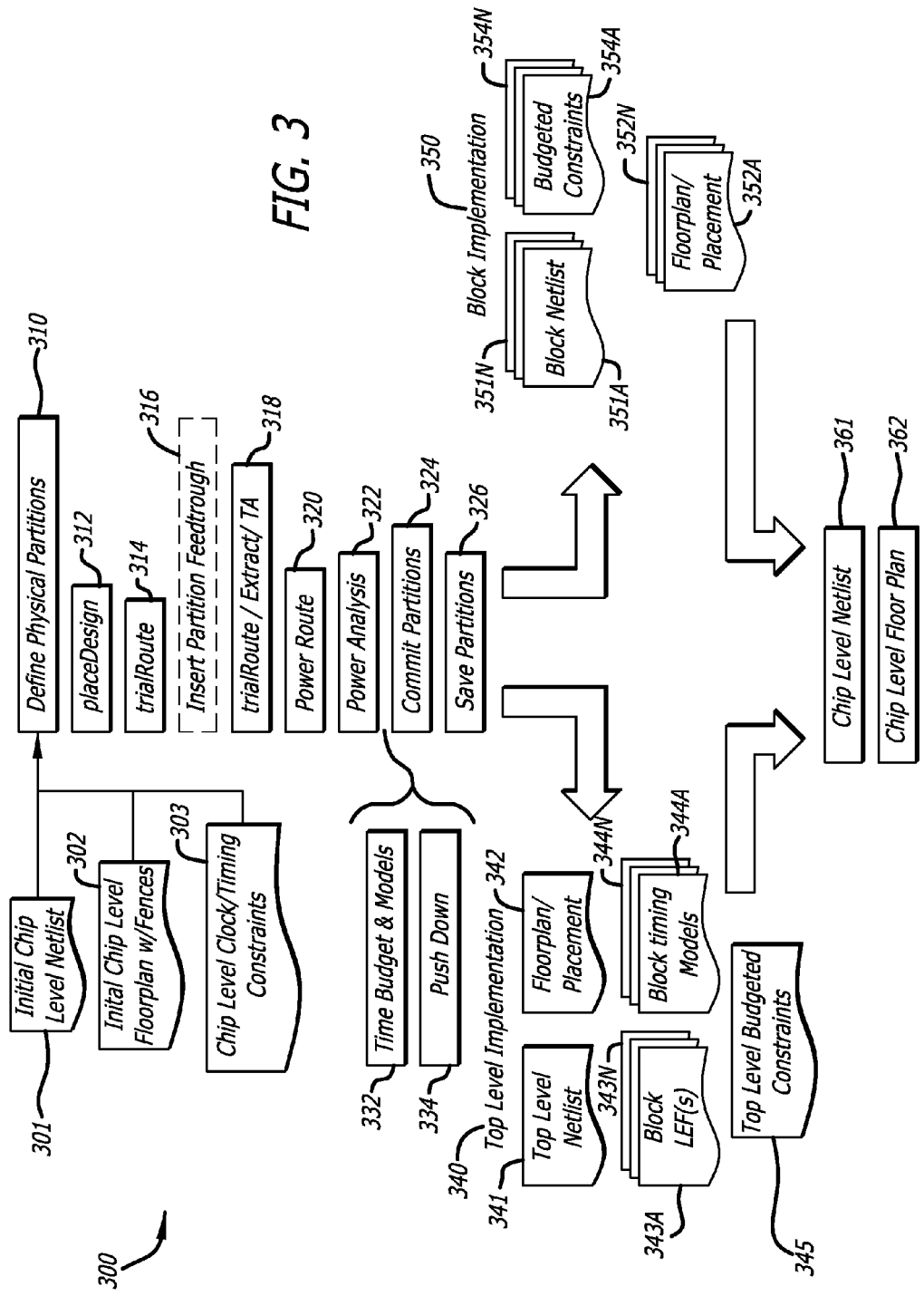
FIG. 3 illustrates an exemplary design methodology for timing closure of block level design and top level design of an integrated circuit.

FIG. 3 illustrates a hierarchical design flow 300 for timing closure that employs the clock latency modeling techniques described herein. The clock latency modeling improves the time budgeting process 332 so that the design flow 300 may be implemented. The hierarchical design flow is non-iterative with a parallel flow implementation that may be achieved in a single pass with the push of a single button. The hierarchical flow 300 is composed of a top level implementation 340 and a block level implementation 350 to achieve rapid design closure in circuit designs that pose capacity challenges in a flat implementation. The entire top level implementation and block level implementation may be signed off without further iterations of the hierarchical design flow. With a parallel design flow, computers located in multiple geographical locations can perform the design flow with little to no interaction regarding environmental embodiments.

In FIG. 3, a database of an initial flat chip level netlist 301, an initial chip level floorplan 302 with any fences, and flat chip level timing constraints 303 are read and used in the sequence of the hierarchical design flow 300. The flat chip level timing constraints 303 may include chip-level clock path timing constraints and chip-level data path timing constraints in a design constraint file.

At process 310, with the netlist, floorplan, and timing information, the top chip is partitioned into sub-chips (also referred to as partitions, partitioned blocks, chiplets, or blocks). The partitioning of the design breaks up the tasks of achieving timing closure of the integrated circuit design between the top chip level and the lower levels of the partitioned blocks. This process forms a top level netlist and a plurality of partition block netlists that can be independently implemented into circuit mask data. With the top level netlist partitioned from the partition block, the top level chip design can be implemented independent of the implementation of the partition blocks. The design flow can then proceed in parallel to (i) implement and achieve timing closure of a top level implementation 340 of the circuit design; and (ii) implement and achieve timing closure of block level implementations 350 of the circuit design.

Implementing a partition block includes a first netlist optimization (e.g., gate level synthesis) of the initial partition netlist after the partition process 310 but prior to clock tree synthesis in response to the initial partition netlist and the clock and data path partition constraints formed during the clock and data time budgeting process 332. Implementing the top level chip design includes a first netlist optimization of the initial top-level netlist after the partition process 310 in response to the initial top-level netlist and the clock and data path top-level constraints formed during the clock and data time budgeting process 332.

At process 312, an initial placement of the circuits forming the top chip level and the circuits forming each of the blocks in the various levels of hierarchy may be made. After the initial placement of the design, the process may go to process 314.

At process 314, a trial routing of interconnect is made for the top level of the chip and/or the partition blocks at the various levels of hierarchy.

An optional process 316 may then be performed next. At process 316, partition feed-throughs may be routed so that signals are passed through a shorter path and possibly experience less parasitic resistance and capacitance loading.

At process 318, a second trial routing may be performed with an extraction of parasitics in order to perform an initial timing analysis. A second round of routing may be recommended after pin assignment. This second round of routing honors the pin assignment that was made. The timing analysis of each partition block design is used to verify that the timing constraints at the block level are being met. The timing analysis of the top level chip design is used to verify that the timing constraints at the top chip level are being met.

At process 320, a routing of the power and ground interconnections is made between partitions at the top level and within the partitions at the lower block level.

At process 322, a power analysis may then be performed on the top level and the block level partitions to be sure that the power and ground interconnections are sufficiently wide with low resistance to handle the global and local power consumption.

Before committing partitions at process 324, the plurality of partitions are designed in detail and analyzed through processes 332-334.

At process 332, time budgeting of the hierarchy of the plurality of partitions is undertaken to determine data path timing constraints and clock path timing constraints. Timing models for each of the partition blocks. If partition models are available, the time budgeting of the top level may be used to implement the top level design.

At process 334, the time budgets can be pushed down into the lower levels of the hierarchy from top level down to the lowest cell level to further design lower level partitions.

As described herein, the time budgeting process is a process of generating timing constraints for the top level of the chip and the individual partition blocks determined during partitioning. Along with the constraints, the time budgeting process also generates timing budget models of the individual blocks. For implementation of the top level, the top level constraints and the block models are used together to implement the design of the top level of the integrated circuit, independent of the implementation of the one or more blocks. The top level of the chip may exclude the partitioned implementation of the blocks (e.g., block netlists 351A-351N) and instead utilize block timing models 344A-344N to implement the top level and obtain timing closure thereof. In this manner, the top level of the chip (e.g., top level netlist 341) may be designed independently of the design of the partitioned blocks. Similarly, the partitioned blocks (e.g., block netlists 351A-351N) may be designed independently of the top level of the chip. Subsequently the implementation of partitioned blocks are merged into the implementation of the top level to form the flattened chip level implementation or design including an optimized chip level netlist 361 and optimized chip level floor plan 362.

For N partitioned blocks, the time budgeting process generates timing budgeted constraints 354A-354N for initial block netlists. The initial block netlists are optimized in response to the timing budgeted constraints 354A-354N into respective block netlist 351A-351N with floorplan/placement 352A-352N for the block level implementation 350. In addition to the data path and clock path timing constraints, the time budgeting process 332 also generates block timing models 344A-344N for each block 351A-351N. Together with the top level constraints 303, the block timing models 344A-344N are used for timing closure of the top level implementation 340 of the chip.

The time budgeting process also generates the top level timing budgeted constraints 345 as well as the block level timing models 344A-344N. The initial top level netlist is optimized into the top level netlist 341 with the floorplan/placement 342 in response to the top level timing budgeted constraints 345 and the block level timing models 344A-344N.

Each of the timing budgeted constraint files 354A-354N for each respective partition block 351A-351N includes an internal clock delay number representing the clock delay within the partition block and an external clock delay number representing the clock delay external to the partition block. Thus, the total chip clock delay is divided into external clock delay and internal clock delay across a partition boundary. The partition boundary groups the circuits within a partition block into a set of circuits such as shown in FIG. 4A. The external clock delay is a source latency in the block constraint file 354A-354N. The internal clock delay is a network latency in the block constraint file 354A-354N. For the top level implementation 340, the internal clock delay number is included in the block timing model 344A-344N for each respective block netlist 351A-351N.

At process 324, after the initial partition netlist have been formed and budgeted for timing, the partition (e.g., the block netlist 351A-351N) can be committed in the overall integrated circuit design.

At process 326, the partition is saved to the design data base. Further design and analysis of the integrated circuit design may occur thereafter. The top level and the block level partitions can be independently implemented and concurrently implemented in parallel.

The design flow 300 may theoretically flow seamlessly. After saving the partitions 326, the block(s) and the top level of the chip can be independently implemented in parallel up until a post route phase that is performed on the chip level design. That is, with the clock timing latency being modeled in the block level time budgeting models, the top level netlist 341 and the block level netlists 351A-351N can be implemented independently but concurrently in parallel together.

With the individual block netlists 351A-351N and the top level netlist 341 being implemented, they can be merged or assembled back together to form an optimized chip level netlist 361 and a chip level floor plan 362.

Furthermore, with the clock timing latency being modeled, post route sign off timing can be achieved after block level netlist and the top level netlist of the design is assembled together into the chip level netlist 361 and a chip level floor plan 362 without a need to re-partition the design.

In an alternate embodiment, the block level implementation 350 may use a single constraint file 351A to store the constraints for each and every block.

Generation of Multi-Phase Timing Models

Integrated circuit designs may require to be partitioned so as to reduce implementation run-time and computer memory requirements. In order to achieve the time budgeting goals for an integrated circuit, the partitions and the top level, may need to be independently constrained. The partitions may be created manually or potentially by a software algorithm executed on a computer system. The software algorithm may determine the number of partitions, the size and number of signals in each partition based upon relationships of the data signals and logic blocks. Each partition then is analyzed through the time budgeting process and constraint information for each partition created and collected in an integrated circuit constraint file. A timing model for each partition may also be created and the partition timing models for the integrated circuit may be collected in an integrated circuit timing model library.

The integrated circuit constraint file may contain clock definitions, external delays, exceptions and other chip level constraints and ensures fixed delay parameters, such as setup and hold times, are not violated. The partition timing models contain the timing delay information as determined by the time budgeting process. The chip level (flat/no partitions) model may be structured as a top level that is, an integrated circuit with partitions and the connectivity between partitions. Thus the top level may then be modeled with timing delay models and a constraint file in order to reduce the implementation run time and computer memory requirements.

Once the constraint file has been created, the timing delays or arcs are generated for all input and output partition boundary pins based upon internal partition component delays and loading effects, such as resistance and capacitance. The timing delay or timing arcs are collected and processed to form a timing model for each partition. The timing models for all partitions are then collected together in the integrated circuit timing model library. The library of timing models may then be used in the timing budget process for the entire integrated circuit. The timing delay accuracy for each partition is significant to ensure the overall timing goals of the entire integrated circuit are met.

The time budgeting process analyzes timing delays for the data and clock paths, such as setup and holds times described herein. Timing delay paths or data paths may have a connectivity that includes a plurality of pins. Each pin in a data path may be associated with a clock. Each clock may have a phase or phase attribute that describes the characteristics of the clock signal. The time budget analysis operates on the phase or phase attribute for each pin associated with a clock. All phase attributes on a pin are analyzed to identify unique or distinct phases.

Each phase or phase attribute associated with a pin may include the sub-properties: clock signal name, polarity and exception tag-set. The time budgeting process analyzes each phase on a pin through the examination of the sub-properties. For example, consider a pin that has two phase attributes assigned to it through the connectivity of two data paths. If one of the phase attributes has a different sub-property value, then both phase attributes are saved with the pin. If the sub-properties of the phase attribute are identical then the phase attribute with the worst case timing is kept and the identical phase attribute discarded. Once all the pins have been analyzed for the worst case delays, the partition constraints are generated and collected in the integrated circuit top level constraint file.

The phase attribute sub-properties are the characteristics of the clock signal that controls the data propagation in the integrated circuit. The sub-property clock signal name is the name of the clock signal associated with the pin. The sub-property polarity is the edge of the clock triggering the circuit that controls the propagation of the data signal. The sub-property polarity is assigned either a rising edge or a falling edge of the clock depending upon what clock edge triggers the circuit.

The sub-property tag-set or exception tag-set, may be used to specify additional information, such as exceptions. Exceptions may alter the time budgeting process at the top level where the entire chip timing characteristics are analyzed. A circuit pin may have more than one exception associated with it and the sub-property exception tag-set may then include a set of values for the pin. Examples of exceptions used in the sub-property exception tag-set are: false path, max delay path (MDP), and multi-cycle path (MCP). Each circuit pin may have a plurality of exceptions dependent on the integrated circuit designer designations.

False paths are paths the designer has designated that are not to be analyzed by the time budgeting process. False paths, for example, may include reset paths that initialize or set all sequential components at the same time. False paths may include other paths that are not considered to be timing critical or paths over which signals never propagate.

Max delay paths (MDP) are paths that the designer designates to be the default maximum delay. A max delay path designation may be used to override multiple timing arcs that share a common pin to ensure circuit functionality. For example, the max delay path designation may be used to select a path to use its maximum (timing) delay rather than using the worst case of all timing delays that share a common pin.

Many data paths are time constrained to a single clock period. For example, a data path is constrained to a single clock period if the time delay of the path is constrained to be less than the clock period to meet setup time parameters. A data path with its time delay being constrained to a single clock period is referred to as a single cycle path (SCP). There is no exception tag-set defined for a single cycle path and the phase attribute sub-property exception tag-set is null. Alternatively, a single cycle path may be defined as a pin that has a phase attribute with a sub-property exception tag-set to null.

A data path where the allowable timing delay is multiple clock cycles (more than one clock period) may be referred to as a multi-cycle path (MCP). Multi-cycle paths require additional clock periods for data to propagate through the data path. A multi-cycle path (MCP) may contain a plurality of connected circuit pins. The phase attribute for a circuit pin that is connected in a multi-cycle path (MCP) would have the exception sub-property, set to MCP.

The designer designates exceptions in the integrated circuit such as multi-cycle paths (MCP) in a chip level constraint file. The chip level constraint file includes the path and pins of each exception. The time budgeting process analyzes the integrated circuit and assigns the phase attribute to pins associated with a clock. Then the time budgeting process modifies the sub-property exception tag-set value with the appropriate value based on the exceptions listed in the chip level constraint file. The exception values may include: false path, max delay path (MDP), and multi-cycle path (MCP).

Previously, the timing budgeting process may analyze single clock paths (SCP) and multi-cycle paths (MCP), if they occurred exclusively and not concurrently within an integrated circuit design partition. Previously, the timing budgeting process did not efficiently process the condition where both a single cycle path (SCP) and a multi-cycle path (MCP) coexisted. Previously, the time budgeting process propagated one attribute phase to the next circuit, selecting the worst case timing delay path by default. Previously, timing information was discarded for either a single cycle path (SCP) or a multi-cycle path (MCP) if they coexisted.

Discarding the timing information for either the single cycle path (SCP) or the multi-cycle path (MCP) may result in circuits not being analyzed accurately by the time budgeting process. Inaccurate timing may lead to the integrated circuit (IC) design being non-implementable and require manual edits by the designer in order to resolve the timing problem(s). In order to achieve the time budgeting goals for the integrated circuit (IC), it is desirable that the time budgeting process successfully resolves timing for each partition in the hierarchy.

In the time budgeting process of each partition, sequential components (e.g., D flip/flops or a register) in each partition are analyzed differently from logic gates (e.g., NAND or NOR) and simple networks or passive parasitic networks, such as one or more resistive and one or more capacitive components that may be coupled together. Sequential components require a clock signal to propagate the data signal from the input to the output. Logic gates and simple networks do not require a clock signal to propagate the data signal from one component to another component.

Partitions with a sequential component in a data path may be separated into an input-pin timing graph and an output-pin timing graph. An output pin of a sequential component does not directly influence the input data path timing delay of the sequential component as the clock signal controls the propagation of the data signal from the input pin of the sequential component to the output pin. Thus, creating two timing graphs; input-pin and output-pin, for a path within a partition that includes a sequential component is acceptable in the time budgeting process. The timing graphs may be combined to create a timing model for a partition that includes input pins and output pins. Sequential components may also require additional conditions in order to resolve the timing delays. For example, the data signal delay out of a D flip/flop or a register may be dependent upon the clock signal delay.

Logic gates, combinatorial logic, and or simple networks are defined as circuits that do not require a clock to propagate a signal forward. That is, a data signal that is introduced on the input pin will appear on the output pin without the influence of a clock. Thus, a single timing arc from the input pin to the output pin may be deployed in the timing graph. The conditions such as resistive-capacitive networks or loading on the output-pin may influence the timing delay assigned to the timing arc between the respective input pin and output pin.

Each data path and associated connected circuit pins are analyzed through the time budgeting process with the clock signal constraints such as setup and hold time. Multiple clock signals may enter the partition and be uniquely identified through their clock signal name. Each clock signal name may be associated with a different clock frequency or period.

Data paths containing identical clock names, as specified by the sub-property clock signal name in the pin phase attribute, are analyzed together as a group. There may be a plurality of data paths and associated circuit pins with different clock names or clock periods that may be analyzed independently by the time budgeting process. As such, a plurality of multi-cycle paths (MCP) and or max delay paths (MDP) may coexist with single cycle paths (SCP) in each group of data paths and associated circuit pins with identical clock signal names. Each path may contain a pin in common with another path and therefore may have a plurality of phase attributes assigned to that pin in common.

Several exemplary integrated circuit design partitions are now considered and analyzed to illustrate the invention's ability to support exceptions such as multi-cycle paths (MCP). In each example, the embodiments of the invention creates a multi-phase timing model including a timing graph with an additional internal multi-phase timing pin and associated timing arcs and an exception collected in the top level constraint file.

Figure 18:
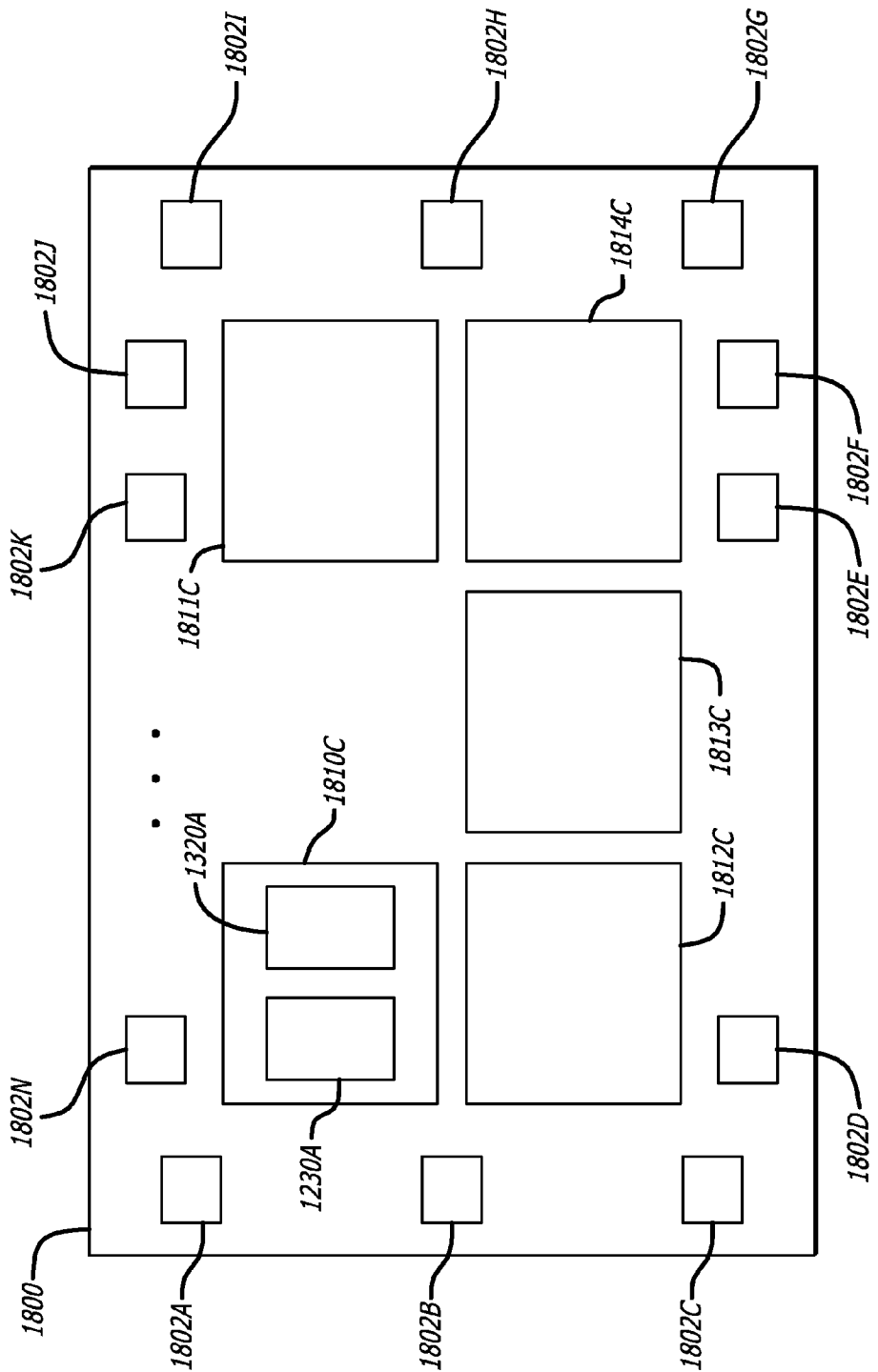
FIG. 18 illustrates a block diagram of an integrated circuit design partitioned into a plurality of partition blocks.

Referring momentarily to FIG. 18, a block diagram of an integrated circuit 1800 is shown. The integrated circuit may be partitioned into a plurality of partitions 1810C-1814C for example. Each partition may be connected to one or more of the other partitions and/or one or more pads 1802A-1802N of the integrated circuit. A partition block, such as partition block 1810C, may have an input partition portion 1230A and an output partition portion 1320A that are separately analyzed so that a multi-phase input timing model and a multi-phase output timing model are generated. A circuit model may be created for each partition 18010C-1814C with a corresponding timing model and associated partition boundary pins.

Partitions in the top level of an integrated circuit may be defined as having only boundary pins that may contain the phase attribute to be used in the time budgeting process. All circuit elements, pins and path delays, are converted to boundary pins and timing arcs in the creation of the timing model. Timing models may not contain the exceptions and therefore the exceptions are retained in the constraint file also referred to as the integrated circuit timing constraint file.

Figure 12A:
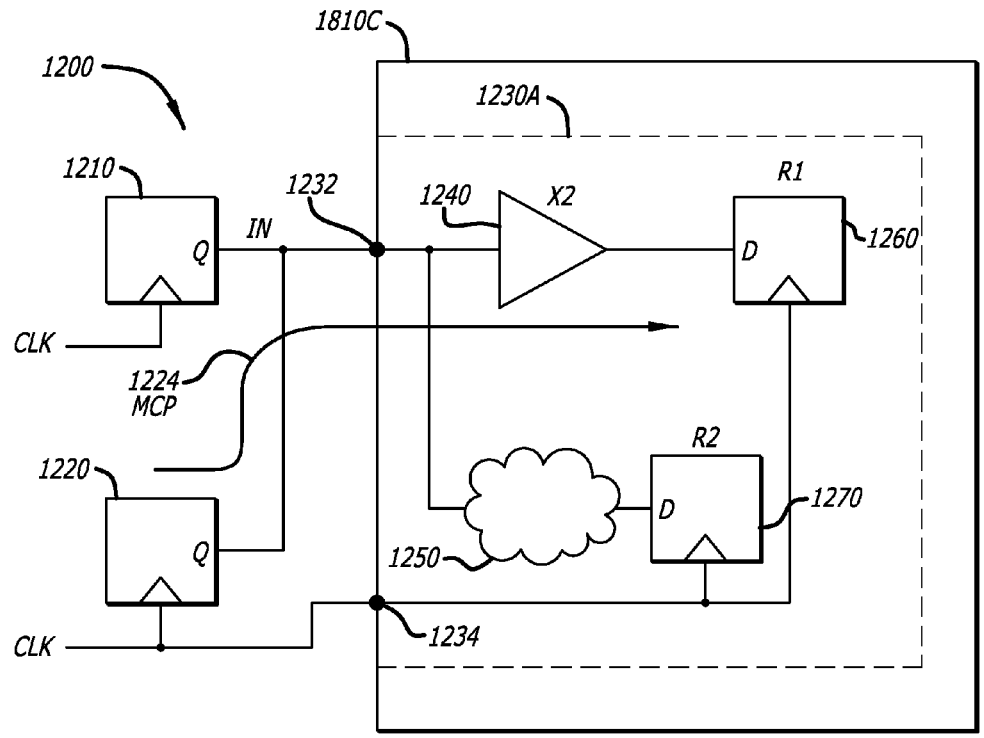
FIG. 12A illustrates an exemplary portion of an integrated circuit design that includes a partition with an input partition boundary pin including a multi-cycle path (MCP).

Referring now to FIG. 12A, an exemplary portion of an integrated circuit design for an input 1200 is shown. The input partition portion 1230A of the partition block 1810C is driven by external input drivers coupled to partition boundary entry points or input pins. The input partition portion 1230A utilizes several sequential components, logic gates and combinatorial logic that may include a resistive-capacitive network, alternatively referred to as combinatorial logic. The input partition portion 1230A as well as the partition block 1810C has a data entry point DEP 1232 and a clock entry point CEP 1234 at the partition boundary separating the internal circuits and paths of the partition from external circuits and paths. The entry points DEP 1232 and CEP 1234 may also be referred to as the boundary pins of the partition block. Boundary pins are retained for the creation of the timing model. Internal partition pins are processed by the time budgeting process into timing arcs that connect the boundary pins for the timing model as shown herein.

In FIG. 12A, the data signal entering the partition at the input data pin DEP 1232 is split between an input of logic gate X2 1240 and an input of combinatorial logic 1250. The clock signal CLK enters the partition block 1230 at the clock entry point CEP 1234 and directly influences the data signal propagating through the data entry point DEP 1232 at a sequential component R1 1260, sequential component R2 1270, the sequential component 1210, and the sequential component 1220.

In this example, the designer has assigned the data entry point DEP 1232 as a multi-cycle path (MCP) 1224 as an example. The multi-cycle path (MCP) 1224 is shown to start from sequential element 1220 through data entry point DEP 1232, through an input of logic gate X2 1240 and into an input of sequential component R1 1260. It may take multiple clock cycles of the clock for data to propagate from the sequential component 1220, through the logic gate X2 1240 and to the sequential logic block 1260 shown in FIG. 12A.

The single cycle path (SCP) is shown starting from sequential component 1210 through the data entry point DEP 1232, through an input of combinatorial logic X2 1250 and into an input of sequential element R2 1270. The single cycle path (SCP) designation indicates that the timing delay through combinatorial logic X2 1250 is less than the time period.

In the time budgeting process, the worst case delay paths in a partition are collected and stored with other constraints in the time budgeting constraint file. The time budgeting constraint file is then used to evaluate all the data paths to ensure the time budgeting process goals are achieved. In the circuit design example shown in FIG. 12A, all sequential components may assume to be triggered by the same clock signal CLK generated by the same clock generator.

In an analysis of the data paths in the input partition portion 1230A, two scenarios are examined. In a first scenario, assume the single cycle path (SCP) is the worst case path with the worst case timing delay. In a second scenario, assume the multi-cycle path (MCP) is the worst case path with the worst case timing delay.

In the input partition portion 1230A for example, a single cycle path (SCP) is described as the path from the sequential component 1210, through the data entry point DEP 1232, through an input of combinatorial logic 1250 and coupled to an input of the sequential component R2 1270. Assuming the first scenario where the single cycle path (SCP) is the worst case path through the data entry point DEP 1232, then the timing information of the multi-cycle path (MCP) 1224 would be discarded and no exception or multi-cycle path (MCP) is collected in the time budgeting process constraint file for the top level analysis.

Without the timing information for the multi-cycle path (MCP) 1224 associated with the partition 1230A the multi-cycle path (MCP) 1224, when analyzed at the chip level, may be more stringently constrained. The multi-cycle path (MCP) 1224 with more stringent constraints may not be implementable resulting in an inoperable integrated circuit design.

Assuming the second scenario where the multi-cycle path (MCP) 1224 is the worst case path, then the timing information of the multi-cycle path (MCP) 1224 is collected in the time budgeting process constraint file and the timing information of the single cycle path (SCP) is discarded. The single cycle path (SCP) may then have overly pessimistic timing constraints and may not be implementable. Thus, timing information for both the single cycle path (SCP) and the multi-cycle path (MCP) are both desired at the top level in order to achieve accurate timing in the time budgeting process.

One or more embodiments of the invention involve the creation of an internal multi-phase timing pin and associated timing arcs in the timing graph model of the partition (multi-phase timing model). The timing information for both the single cycle path (SCP) and multi-cycle path (MCP) are maintained through the timing arcs in the partition timing model. The exception, multi-cycle path (MCP) in this example, referencing this internal pin, is collected in the timing budgeting process constraint file for top level time budgeting analysis. The creation of an internal multi-phase timing pin creates a more accurate timing model and enables the time budgeting process to achieve the time budgeting goals.

Figure 12B:
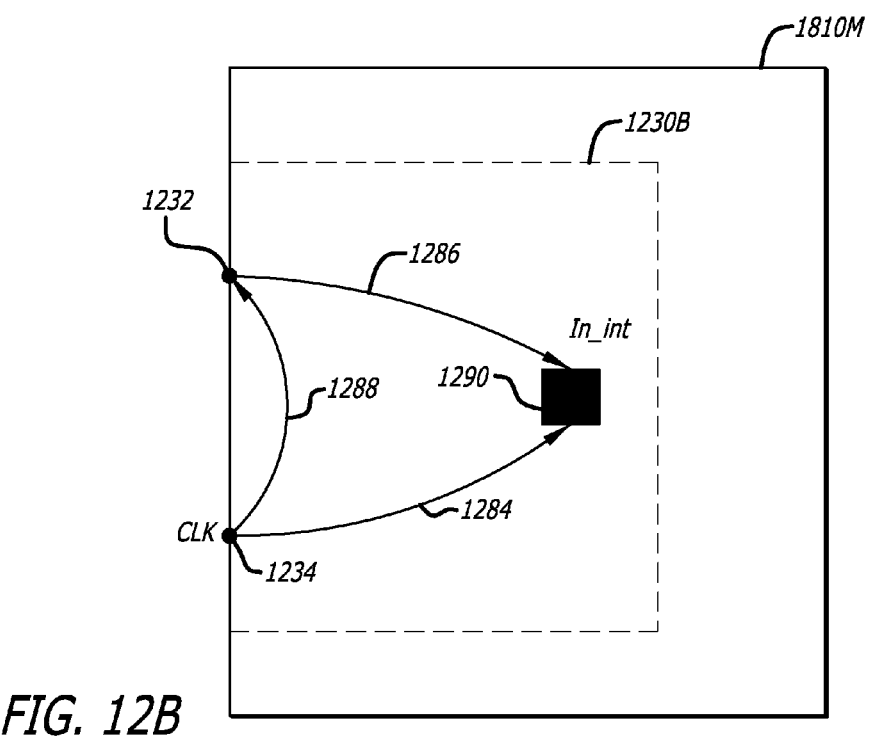
FIG. 12B illustrates a portion of a delay timing model corresponding to the exemplary partition shown in FIG. 12A.

Referring now to FIG. 12B, the corresponding timing graph for an input 1230B of the input partition portion 1230A of FIG. 12A is shown. The timing graph for an input 1230B illustrates the input portion of the exemplary timing model 1810M. In order to keep both the single cycle path (SCP) and multi-cycle path (MCP) 1224 timing information at the top level of the partition, an internal multi-phase timing pin In_int 1290 is created. The internal multi-phase timing pin In_int 1290 in the input timing graph 1230B of the input partition portion 1230A creates a multi-phase model in accordance with an embodiment of the invention. The timing information for the single cycle path (SCP) in the partition is accounted for by a single cycle path (SCP) timing arc 1288 between the clock entry point CEP 1234 and the data entry point DEP 1232. A dummy timing arc 1284, is generated between the clock entry point CEP 1234 and the internal multi-phase timing pin In_int 1290 to complete the connectivity. The multi-cycle path (MCP) 1224 timing information is shown by a multi-cycle timing arc 1286 between the clock entry point CEP 1234 and the internal multi-phase timing pin In_int 1290. The internal multi-phase timing pin In_int 1290 is referenced by the multi-cycle path (MCP) in the timing constraint file.

The circuit design example 1200 shown in FIG. 12A may be read and analyzed as an input to one or more embodiments of the invention. FIG. 12B illustrates an exemplary timing model 1810M that may be output by embodiments of the invention in response.

The input and output portion of a sequential component may be analyzed separately as an input and an output. FIGS. 12A-12B illustrate the analysis of an input portion of an exemplary circuit design. An analysis of an output portion of an exemplary circuit design is now described with reference to FIGS. 13A-13B.

Figure 13A:
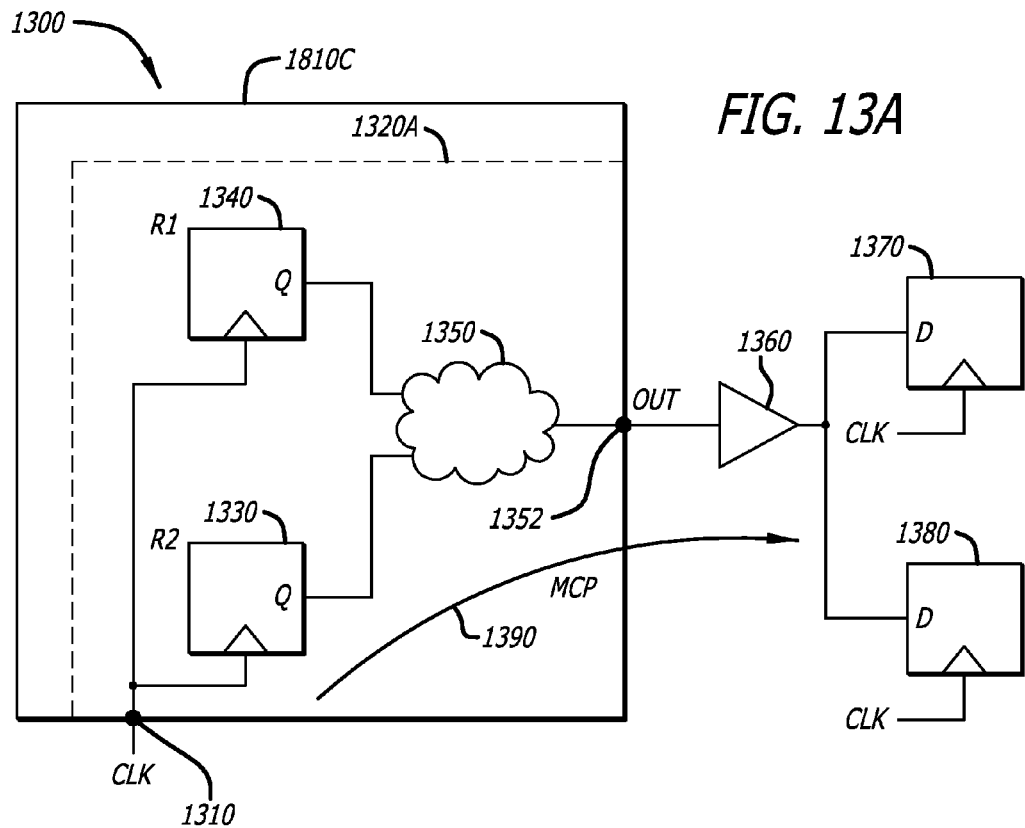
FIG. 13A illustrates an exemplary portion of an integrated circuit design that includes a partition with an output partition boundary pin including a multi-cycle path (MCP).

Referring now to FIG. 13A, an exemplary portion of an integrated circuit design for an output 1300 is shown. The output partition portion 1320A of the partition block 1810C is now examined with the external components attached to the partition boundary output pin OUT 1352. The output partition portion of 1320A illustrated in FIG. 13A includes a sequential component R1 1340, a sequential component R2 1330, and a combinatorial logic 1350 coupled together as shown. The external circuit connected to the partition boundary output pin OUT 1352 includes a logic gate 1360, a sequential component 1370, and a sequential component 1380 coupled together as shown. The clock signal CLK enters the partition at clock entry point CEP 1310. As stated herein, the entry points of a partition may be referred to as the partition boundary pins.

A multi-cycle path (MCP) 1390 is shown from the sequential component R2 1330, through combinatorial logic 1350, through the partition output pin OUT 1352, through the logic gate 1360, and coupled to the input of the sequential component 1380.

A single cycle path (SCP) may be formed from the sequential component R1 1340, through the combinatorial logic 1350, through the partition boundary output pin OUT 1352, through the logic gate 1360, and coupled to the input of the sequential component 1370. A single cycle path (SCP) may exist whenever the exception sub-property tag-set is null for a given pin on a data path.

As previously taught, the time budgeting process collects the worst case delay paths of a partition in the time budgeting process constraint file. The constraint file is then used to evaluate if the time budgeting process goals are achieved. In the circuit design example, all sequential components may be assumed to be triggered by the same clock signal CLK as shown in FIG. 13A.

In an analysis of the output partition portion 1320A shown in FIG. 13A, again consider two cases. In the first case, consider the single cycle path (SCP) of the partition to be the worst path through the partition boundary output pin OUT 1352. In the second case, consider the multi-cycle path (MCP) 1390 of the partition to be the worst case path through the partition boundary output pin OUT 1352.

In the first case, the single cycle path (SCP) of the partition is the worst case path timing delay and the timing information for the multi-cycle path (MCP) 1390 may be lost. Without timing delay information for the multi-cycle path (MCP) 1390 for the partition, the multi-cycle path (MCP) 1390 may be constrained more stringently at the top level such that it may not be implementable.

If the multi-cycle path (MCP) 1390 is the worst case path through the partition boundary output pin OUT 1352 as stated in the second case, the timing information for the single cycle path (SCP) would be discarded from the top level time budgeting process. Without the timing information for the single cycle path (SCP), the timing of the top level determined during the time budgeting process may be inaccurate. Thus, timing information for both the single cycle path (SCP) and the multi-cycle path (MCP) are both desired at the top level in order to achieve accurate timing in the time budgeting process.

As taught herein, an internal multi-phase timing pin is created at the top level of the partition such that the timing delays of both the single cycle path (SCP) and the multi-cycle path (MCP) are included for the time budgeting process of the integrated circuit.

If a pin in a partition in an integrated circuit design had only a multi-cycle path (MCP) designation or only a single cycle path (SCP) designation, then the worst case timing delay would be analyzed correctly by the time budgeting process. Embodiments of the invention resolve the scenario where both a multi-cycle path (MCP) and a single cycle path (SCP) are assigned to the same pin in a partition.

Figure 13B:
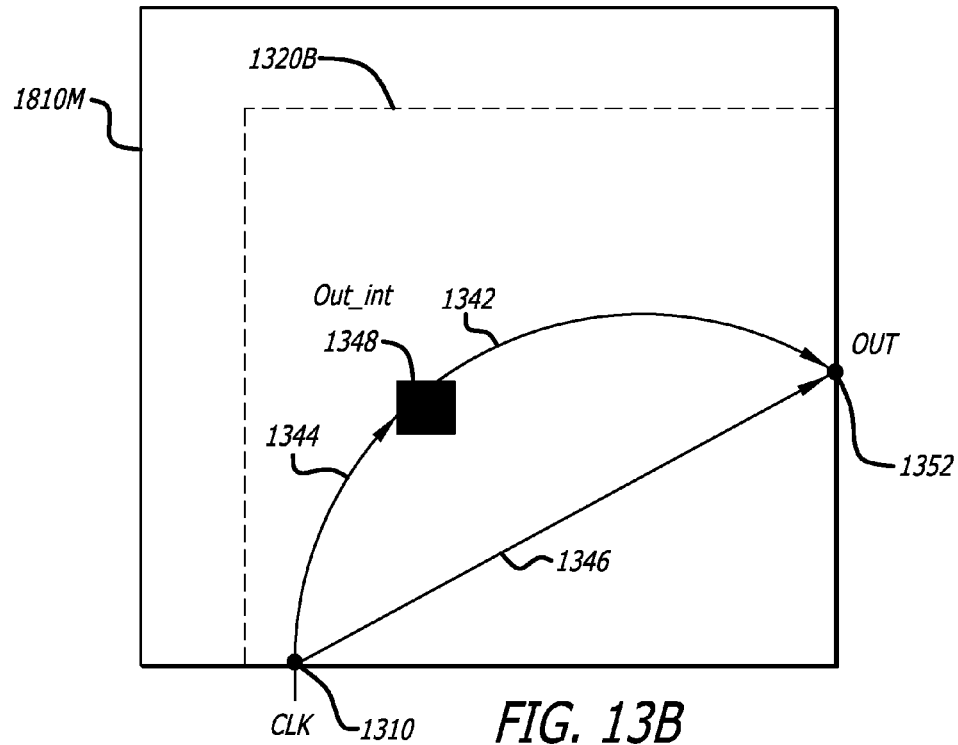
FIG. 13B illustrates a portion of a delay timing model corresponding to the exemplary partition shown in FIG. 13A.

The timing model for an output 1320B in FIG. 13B includes the timing delay arcs for the single cycle path (SCP) and the multi-cycle path (MCP) 1390. The single cycle path (SCP) timing delay is shown by timing arc 1346 and extends between the clock entry point CEP 1310 and the partition boundary output pin OUT 1352. The multi-cycle path (MCP) timing arc 1390 is coupled between the newly created internal multi-phase timing pin, Out_int 1348 and the partition boundary output pin OUT 1352. A dummy timing arc 1344 is coupled between the clock entry point CEP 1310 and the internal multi-phase timing pin Out_int 1348. The dummy timing arc 1344 is created in order to achieve connectivity in the timing graph to the newly created internal multi-phase timing pin. The internal multi-phase timing pin Out_int 1348 is referenced by the exception, multi-cycle path (MCP), in the constraint file.

The timing model shown in FIG. 13B provides greater timing accuracy as a result of the inclusion of the internal multi-phase timing pin. The internal multi-phase timing pin provides additional timing information at the top level of the circuit design and a new constraint collected in a constraint file. Thus allowing for a more accurate time budgeting process.

Figure 14A:
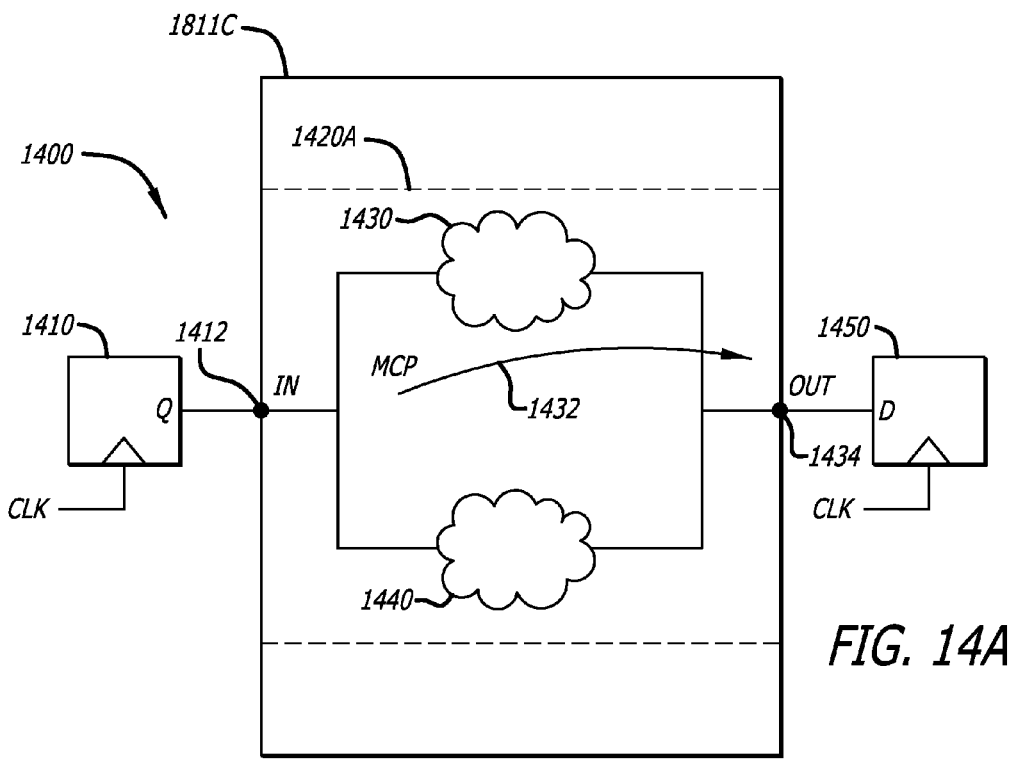
FIG. 14A illustrates an exemplary portion of an integrated circuit design that includes a partition with a pass-through with two partition boundary pins including a multi-cycle path (MCP).

Referring now to FIG. 14A, an exemplary portion of an integrated circuit design for a pass through 1400 is shown. The pass through partition portion 1420A of the partition block 1811C includes a sequential component 1410 driving the boundary input pin IN 1412 of partition 1420A. A path from the partition boundary input pin IN 1412 splits into two paths, one through an input of combinatorial logic 1430 and one through an input of combinatorial logic 1440 with the outputs coupled together at the partition boundary output pin OUT 1434 as shown. A sequential component 1450 is coupled to the partition boundary output pin OUT 1434.

Continuing with FIG. 14A, a multi-cycle path (MCP) 1432 that has been designated for this example that includes a data path from the output of sequential component 1410, through the partition boundary input pin IN 1412, through the combinatorial logic 1430, through the partition boundary output pin OUT 1434 and coupled to the sequential component 1450. Previously, the time budgeting process may not be able to capture timing information of the multi-cycle path (MCP) 1432, due to the concurrent existence of a single cycle path (SCP) through the combinatorial logic 1440.

Figure 14B:
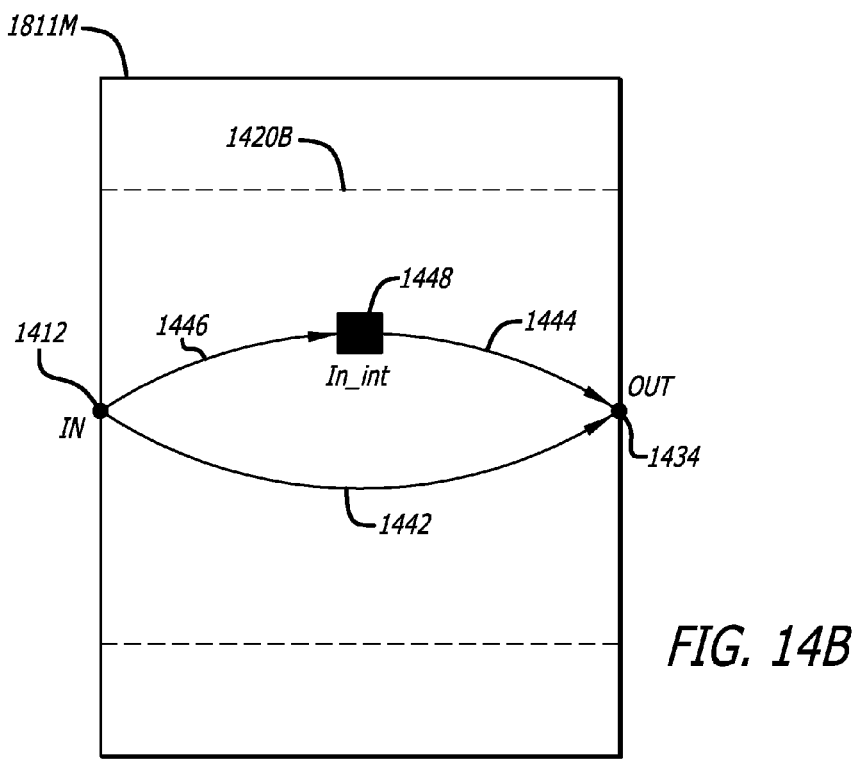
FIG. 14B illustrates a delay timing model corresponding to the exemplary partition shown in FIG. 14A.

Referring now to FIG. 14B, the corresponding timing model for a pass through 1420B of the pass through partition portion 1420A of FIG. 14A is shown. The timing graph for a pass through 1420B illustrates the pass through portion of the exemplary timing model 1811M. A new internal multi-phase timing pin In_int 1448 has been generated that will allow both the single cycle path (SCP) and multi-cycle path (MCP) timing delay information to be used for the integrated circuit time budgeting process. In the circuit design example, all sequential components may be assumed to be triggered by the same clock signal CLK as shown in FIG. 14A.

In FIG. 14B, the multi-cycle path MCP 1432 is modeled by the timing arc 1444 that couples together the internal multi-phase timing pin In_int 1448 and the partition boundary output pin 1434. The single cycle path (SCP) is modeled by the timing arc 1442 that couples together the partition boundary input pin IN 1412 and the partition boundary output pin OUT 1434. A dummy delay timing arc 1446 is coupled between the partition boundary input pin IN 1412 and the internal multi-phase timing pin In_int 1448. The dummy delay timing arc 1446 is created to establish connectivity to the newly created internal multi-phase timing pin. Accordingly, the timing of the partition and integrated circuit (IC) are now more accurate and that the circuit may be implemented in order to meet the time budgeting goals.

Figure 15A:
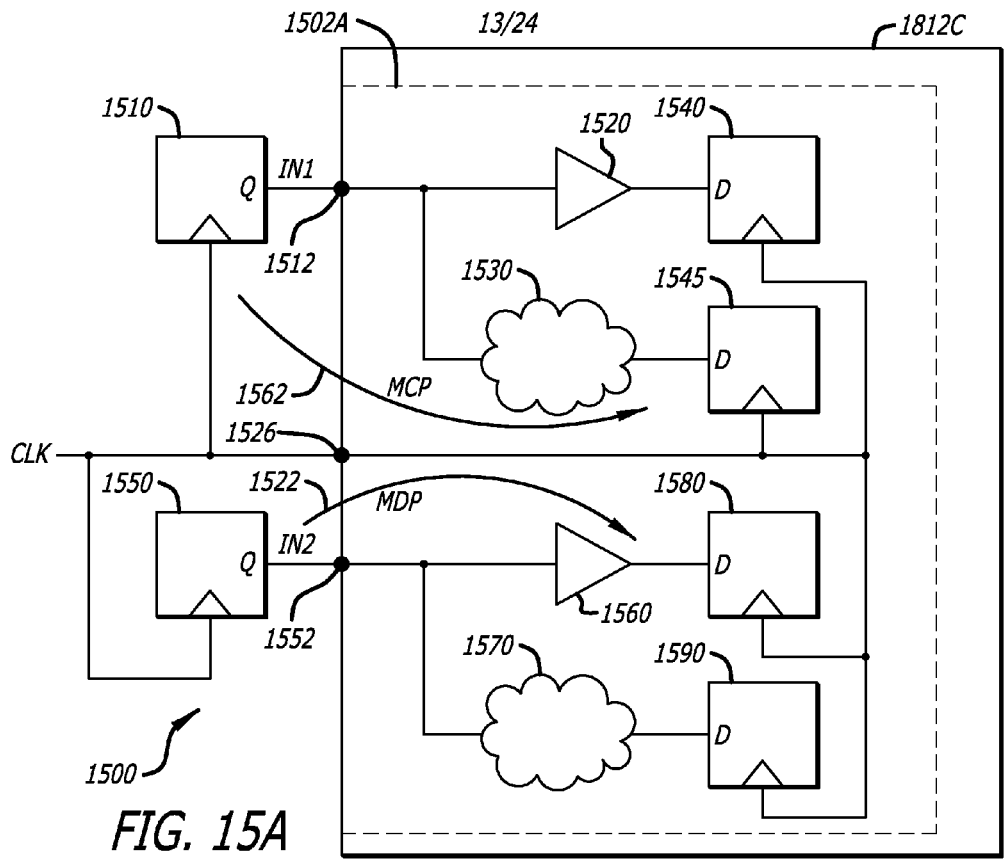
FIG. 15A illustrates an exemplary portion of an integrated circuit design that includes a partition for three input partition boundary pins including a multi-cycle path (MCP) and a maximum delay path (MDP).

Referring now to FIG. 15A, an exemplary portion of an integrated circuit design for an input including a multi-cycle path (MCP) and a max delay path (MDP) 1500 is shown. A schematic block diagram of the input partition portion 1502A of a partition block 1812C is an exemplary application of the invention where a multi-cycle path (MCP) and a max delay path (MDP) coexist in the same partition. The input partition portion 1502A has sequential component 1510 and sequential component 1550 coupled to the partition input pins IN1 1512 and IN2 1552 respectively as shown in FIG. 15A.

In FIG. 15A, the partition input pin IN1 1512 is coupled to an input of the logic gate 1520. The output of logic gate 1520 is coupled to an input of sequential component 1540. The partition input pin IN1 1512 is also coupled to an input of combinatorial logic 1530. The output of combinatorial logic 1530 is coupled to an input of sequential component 1545.

Continuing with FIG. 15A, the partition boundary input pin IN2 1552 is coupled to an input of logic gate 1560 with the output of logic gate 1560 coupled to an input of sequential component 1580. The partition boundary input pin IN1 1552 is also coupled to an input of combinatorial logic 1570 with the output of combinatorial logic 1570 coupled to an input of sequential component 1590. In the circuit design example shown in FIG. 15A, all sequential components may be assumed to be triggered by the same clock signal CLK.

The partition 1502A shown in FIG. 15A, has two single cycle paths (SCP): SCP1 and SCP2. The first single cycle path, SCP1, is the path from sequential component 1510, through the partition input pin IN1 1512, through a logic gate 1520 and coupled to the sequential component 1540. The second single cycle path, SCP2, is the path from sequential component 1550 through the partition input pin IN2 1552, through combinatorial logic 1570 and coupled to the sequential component 1590.

The partition 1502A in FIG. 15A, also contains a multi-cycle path (MCP) 1562 and a max delay path (MDP) 1522. The multi-cycle path (MCP) 1562 originates from sequential component 1510, through the partition boundary input pin IN1 1512, through the combinatorial logic 1530 and coupled to sequential component 1545 as shown. The max delay path (MDP) 1522 originates from sequential component 1550, through the partition input pin IN2 1552, through the logic gate 1560 and coupled to the sequential component 1580.

Figure 15B:
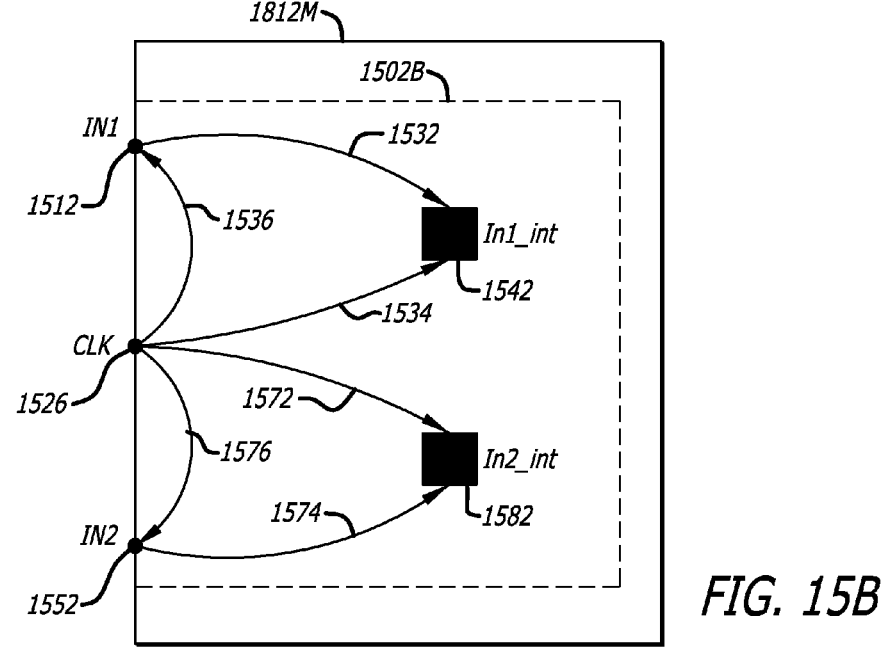
FIG. 15B illustrates a portion of a delay timing model corresponding to the exemplary partition shown in FIG. 15A.

Referring now to FIG. 15B, the corresponding timing model for an input with a MCP and MDP 1502B of the input with a MCP and MDP partition portion 1502A of FIG. 15A is shown. The timing model for an input with a MCP and MDP 1502B illustrates the input with a MCP and MDP of the exemplary timing model 1812M. An input timing model is generated for the input partition portion to form a multi-phase timing model 1502B for the partition. Two internal multi-phase timing pins (In1_int 1542 and In2_int 1582) have been created to capture the timing delay for the multi-cycle path (MCP) and max delay path (MDP). The new multi-phase timing model includes two new internal multi-phase timing pins with associated timing arcs and single cycle path (SCP) timing arcs.

In FIG. 15B, the single cycle path SCP1 timing arc 1536 couples together the clock signal CLK at partition boundary CEP 1526 to the partition boundary input pin IN1 1512. The multi-cycle path (MCP) timing arc 1532 is shown coupling together the partition boundary input pin IN1 1512 to the newly created internal multi-phase timing pin In1_int 1542 along with a dummy timing arc 1534 connecting to the CEP 1526. In the circuit design example, all sequential components may be assumed to be triggered by the same clock signal CLK as shown in FIG. 15A.

Continuing with FIG. 15B, the single cycle path SCP2 timing arc 1576 couples together CEP 1526 to the partition boundary input pin IN2 1552. The max delay path (MDP) timing arc 1572 is shown coupling together the partition boundary input pin IN2 1552 to the newly created internal multi-phase timing pin In2_int 1582 along with a dummy timing arc 1574.

As can be seen in the example described in FIG. 15A-B, the embodiment of the invention includes all four timing delay paths (MCP 1532, MDP 1572, SCP1 and SCP2) for the top level time budgeting process. Without the embodiments of the invention, two of the four paths timing delay information would not be evaluated by the time budgeting process and hence a potential decrease in timing accuracy. This may lead to an increase of time-costly hand edits and or potentially, integrated circuits that may not be implementable. The multi-phase timing model creates a more accurate timing model for the time budgeting process in order to achieve the time budgeting goals.

Figure 19A:
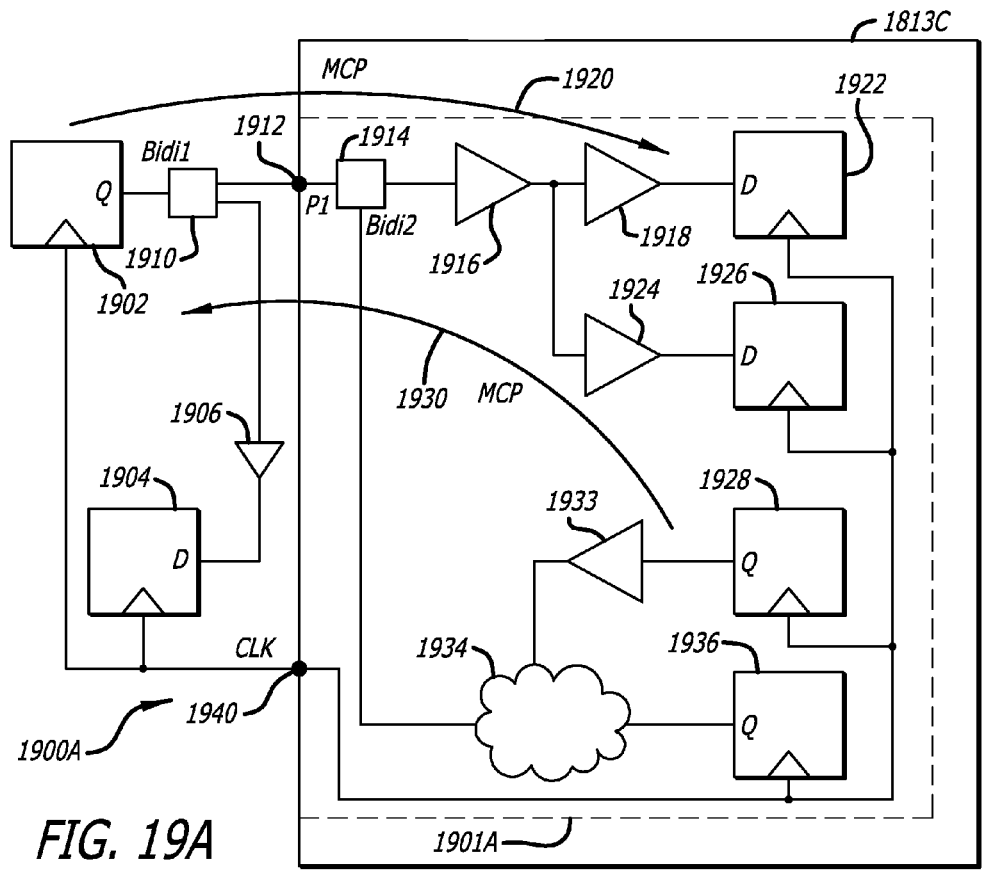
FIG. 19A illustrates an exemplary portion of an integrated circuit design that includes a partition for two bidirectional input/output partition boundary pins with a multi-cycle path (MCP).

Referring now to FIG. 19A, an exemplary portion of an integrated circuit design 1900A is shown. The bidirectional partition portion 1901A of the partition block 1813C includes a bidirectional pin P1 1912 with a multi-cycle path (MCP) 1920. A bidirectional pin is a circuit pin that may function both as an input pin and as an output pin to circuits within the partition. Bidirectional logic, such as a tri-stateable output buffer and/or a tri-stateable input receiver, may be used to control the input/output functionality of the bidirectional pin.

An input signal coupled to the partition 1901A may originate from an output of the sequential component 1902 coupled to bidirectional logic Bidi1 1910. The input signal travels through the bidirectional logic Bidi1 1910 and enters the partition 1901A at a bidirectional partition boundary input pin P1 1912. The bidirectional partition boundary pin P1 1912 is coupled to bidirectional logic Bidi2 1914. The bidirectional logic Bidi2 1914 then is coupled to an input of logic gate 1916. The output of logic gate 1916 is coupled to the inputs of logic gates 1918 and 1924. The output of logic gate 1918 is coupled to an input of sequential component 1922. The output of logic gate 1924 is coupled to an input of sequential component 1926.

A clock signal CLK may be coupled to each of the clock inputs of the sequential components of the circuit 1900A as shown. In the examples shown herein, the clock entering the partition have been identical in order to clarify the invention. A plurality of different clock signals may enter the partition in an integrated circuit. The time budgeting process properly processes clock signals that enter into a partition that may have different frequencies, clock signal names, polarities, and directions.

Continuing with FIG. 19A. An output signal from partition 1901A, may originate from an output of the sequential component 1928 or the sequential component 1936. The output of the sequential component 1928 is coupled to an input of logic gate 1933. The output of the logic gate 1933 is coupled to an input of combinatorial logic 1934. An output of sequential component 1936 may be coupled to another input of combinatorial logic 1934. The output of the combinatorial logic 1934 is coupled to an input of bidirectional logic Bidi2 1914. The bidirectional logic Bidi2 1914 is coupled to bidirectional partition boundary pin P1 1912. Bidirectional logic Bidi1 1910 connects to the bidirectional partition pin P1 1912 to receive the output signal from the partition. An output of bidirectional logic Bidi1 1910 is coupled to an input of the logic gate 1906 to receive the output signal and drive it to an input of the sequential component 1904.

A first multi-cycle path (MCP) 1920 may be defined to start from sequential component 1902; go through bidirectional logic Bidi1 1910, bidirectional partition pin P1 1912, bidirectional logic Bidi2 1914, logic gate 1916, logic gate 1918; and into/end at sequential component 1922 as shown in FIG. 19A. A second multi-cycle path (MCP) 1930 may be defined to start from sequential component 1928; go through logic gate 1933, combinatorial logic network 1934, bidirectional logic Bidi2, partition bidirectional pin P1 1912, bidirectional logic Bidi1, logic gate 1906; and into/end at sequential component 1904.

Figure 19B:
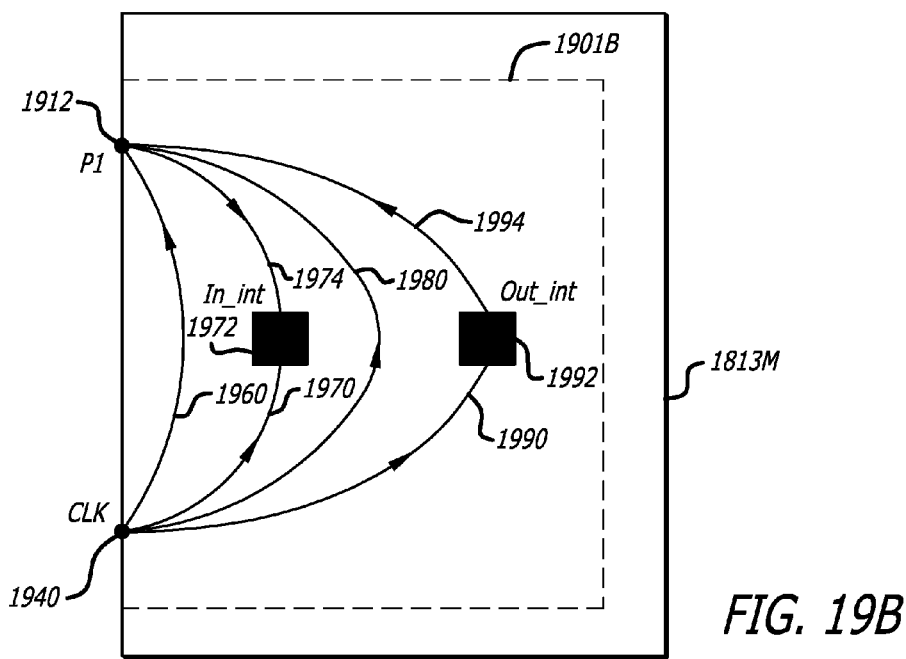
FIG. 19B illustrates a delay timing model corresponding to the exemplary partition shown in FIG. 19A.

Referring now to FIG. 19B, the corresponding timing model for a bidirectional partition portion 1901B of the bidirectional partition portion 1901A of FIG. 19A is shown. The timing model for a bidirectional 1901B illustrates the bidirectional portion of the exemplary timing model 1813M. The multi-phase partition timing model 1901B includes two internal multi-phase timing pins to account for the two multi-cycle paths (MCP), MCP 1920 and MCP 1930. In one or more embodiments of the invention, two internal multi-phase timing pins In_int 1972 and Out_int 1992 are created to ensure the timing delays of the two multi-cycle paths MCP 1920 and 1930 shown in FIG. 19A are collected for the top level time budgeting process.

In FIG. 19B, a single cycle path (SCP) with associated input timing delay is modeled by timing arc 1960. A single cycle path (SCP) with associated output signal timing delay is modeled by timing arc 1980.

Timing information for the first multi-cycle path (MCP) 1920 is modeled and collected by a first MCP timing arc 1974 coupled between the bidirectional partition pin 1912 and the first internal multi-phase timing pin In_int 1972. A first dummy timing arc 1970, associated with the first MCP timing arc 1974, is coupled between the clock input pin 1940 and the first internal multi-phase timing pin In_int 1972 to complete the connectivity of the timing graph to the internal multi-phase timing pin In_int 1972.

Timing information for the second multi-cycle path (MCP) 1930 is modeled and collected by a second MCP timing arc 1994 coupled between the bidirectional partition pin 1912 and the second internal multi-phase timing pin Out_int 1992. A second dummy timing arc 1990, associated with the second MCP timing arc 1994, is coupled between the clock input pin 1940 and the second internal multi-phase timing pin Out_int 1992 to complete the connectivity of the timing graph to the second internal multi-phase timing pin Out_int 1992.

Without the newly created internal multi-phase timing pin(s) as shown in the timing graphs or models in FIGS. 12B, 13B, 14B, 15B, and 19B, timing information may be lost or discarded. The internal multi-phase timing pin provides the ability to create timing arcs that allow sub-property tag set exceptions such as multi-cycle path (MCP) and or max delay path (MDP) timing information to be collected along with single cycle path (SCP) timing information. Thus the multi-phase timing model with internal multi-phase pins and associated timing arcs may accurately represent the delay timing at the top level in achieving the time budgeting goals.

In the embodiments of the invention, the number of internal multi-phase timing pins that are created is determined by the number of phase attributes per pin per direction per partition. That is, each pin in a partition may have one or more phase attributes depending on the integrated circuit design. The time budgeting process efficiently analyzes the data paths through a pin with a plurality of phase attributes by using the sub-property clock signal name and polarity. However, without the embodiments of the invention, exceptions such as multi-cycle paths (MCP) and max delay paths (MDP) are not accurately modeled for timing delays and the time budget goals may not be achieved.

The exception sub-property tag-set identifies exceptions where the timing delays may be inaccurately analyzed if multi-cycle paths (MCP) and or max delay paths (MDP) exist. With the exception sub-property, exceptions such as multi-cycle path (MCP) and max delay path (MDP) may be accurately modeled through the inclusion of an internal multi-phase timing pin, associated timing arcs and constraints.

Figures 20A, 20B:
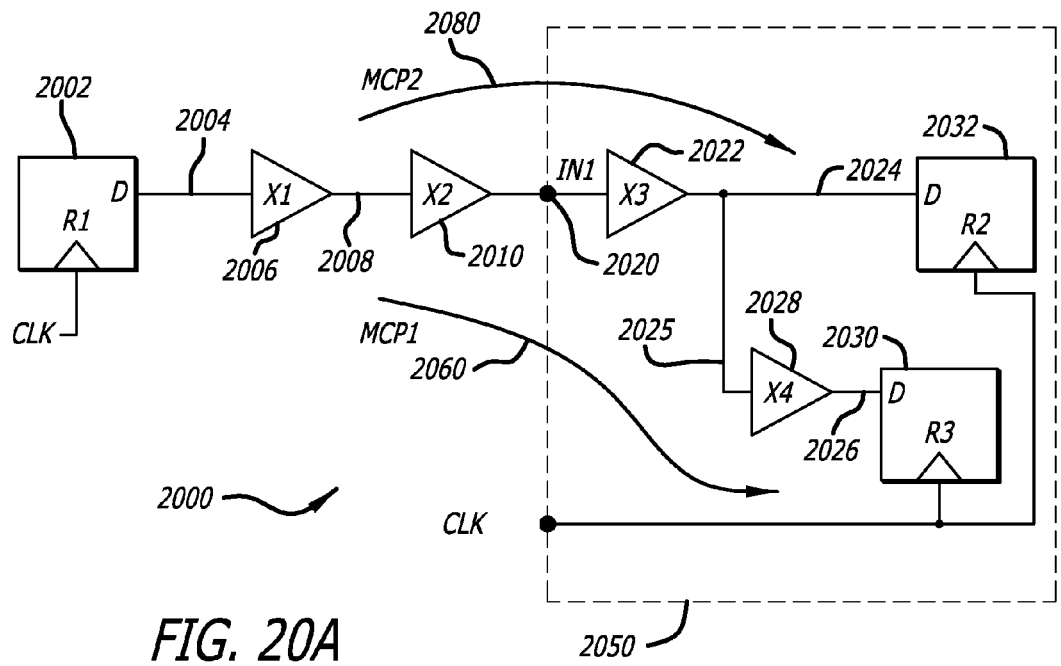
FIG. 20A illustrates an exemplary portion of an integrated circuit design that includes a partition for an input partition boundary pin and two multi-cycle paths (MCP).
FIG. 20B illustrates the phase attribute and sub-properties for pins corresponding to the exemplary portion of an integrated circuit and partition shown in FIG. 20A.

Referring now to FIG. 20A, and exemplary portion of an integrated circuit 2000 is shown. There are two multi-cycle paths MCP1 2060 and MCP2 2080 shown in FIG. 20A to illustrate the case where more than one value in the phase attribute sub-property tag-set or exception tag-set exists. As previously taught the sub-property exception tag-set may contain more than one value dependent on the number of exceptions attached to a circuit pin. Each exception is verified to be valid and if certain exceptions are not valid then they are removed and new phase attributes are generated without the invalid exceptions if required. The exceptions values may include: false path, multi-cycle path (MCP) and max delay path (MDP) and are attached to a pin. The values and associated circuit pin names are collected in the constraint file for use in timing analysis during the time budgeting process.

In FIG. 20A, an exemplary portion of an integrated circuit 2000 is shown. The output of sequential component 2002 is connected to the input 2004 of logic gate 2006. The output of logic gate 2006 is connected to the input 2008 of logic gate 2010 and the output of logic gate 2010 is connected to the partition boundary pin IN1 2020 of partition portion 2050.

The partition boundary input pin IN1 2020 is connected to logic gate 2022. The output of logic gate 2022 is connected to an input 2024 of sequential component 2032 and the input 2025 of logic gate 2028. The output of logic gate 2028 is connected to an input 2026 of sequential component 2030. As stated in previous examples herein, all clock signals have the same clock name and are triggered with the same edge.

The two multi-cycle paths, MCP1 2060 and MCP2 2080, share a common circuit pin that is, partition boundary pin IN1 2020 as shown in FIG. 20A. There are circuit pins (2004, 2008, 2024, 2035, 2026) for this example that contain the phase attribute and for this example have been assigned the exception tag-set value: multi-cycle path (MCP).

In FIG. 20B, a table listing circuit pins from the integrated circuit 2000 is illustrated. Each circuit pin includes an associated phase attribute and sub-properties. Circuit pin 2004 along a path has a phase 1 attribute and sub-properties including a clock signal name CLK1, a polarity of RISE and exception tag-set value of MCP1. Circuit pin 2008 has a phase 1 attribute assigned with sub-properties of a clock signal name of CLK1, a polarity of RISE, and an exception tag-set value of MCP1. Circuit pin IN1 2020 has a phase 2 attribute assigned to it with sub-properties of a clock signal name CLK1, a polarity of RISE, and an exception tag-set of MCP1, MCP2. Circuit pin IN1 2020 illustrates that the exception tag-set may be a set of values depending on the integrated circuit and designer assignments. Circuit pin 2024 has a phase 3 attribute assigned to it indicating the sub-property of an exception tag-set value, MCP2. Circuit pin 2025 has a phase 1 attribute 1 assigned to it with an exception tag-set value of MCP1. Circuit pin 2026 completes the MCP1 path 2060 shown in FIG. 20A. Circuit pin 2026 has a phase 1 attribute 1 assigned to it with an exception tag-set value of MCP1.

The table in FIG. 20B illustrates that a pin may be assigned a phase attribute by the time budgeting process. The exception tag-set values are modified based upon the designers chip level constraint file directives. The exception tag-set may contain more than one value or a set of values such as shown by partition boundary pin IN1 2020, for example. The time budgeting process checks the validity of the exceptions for each pin and propagates the valid exceptions to the next pin.

Referring momentarily now to FIG. 10, a flow chart is illustrated that includes an exemplary process of integrated circuit design with a clock and data timing budget. At process block 1006, in response to the initial partition netlists and the initial top level of the integrated circuit design, data timing budgets and clock timing budgets for the plurality of partitions and the top level of the integrated circuit design is automatically generated. The automatically generated timing budgets are saved to a file so that they can be read for later analysis and implementation of the detail design of the partition blocks and top level. Further details of the automatically generated timing budgets of process block 1006 are now described with reference to the flow chart shown in FIG. 16.

Figure 16:
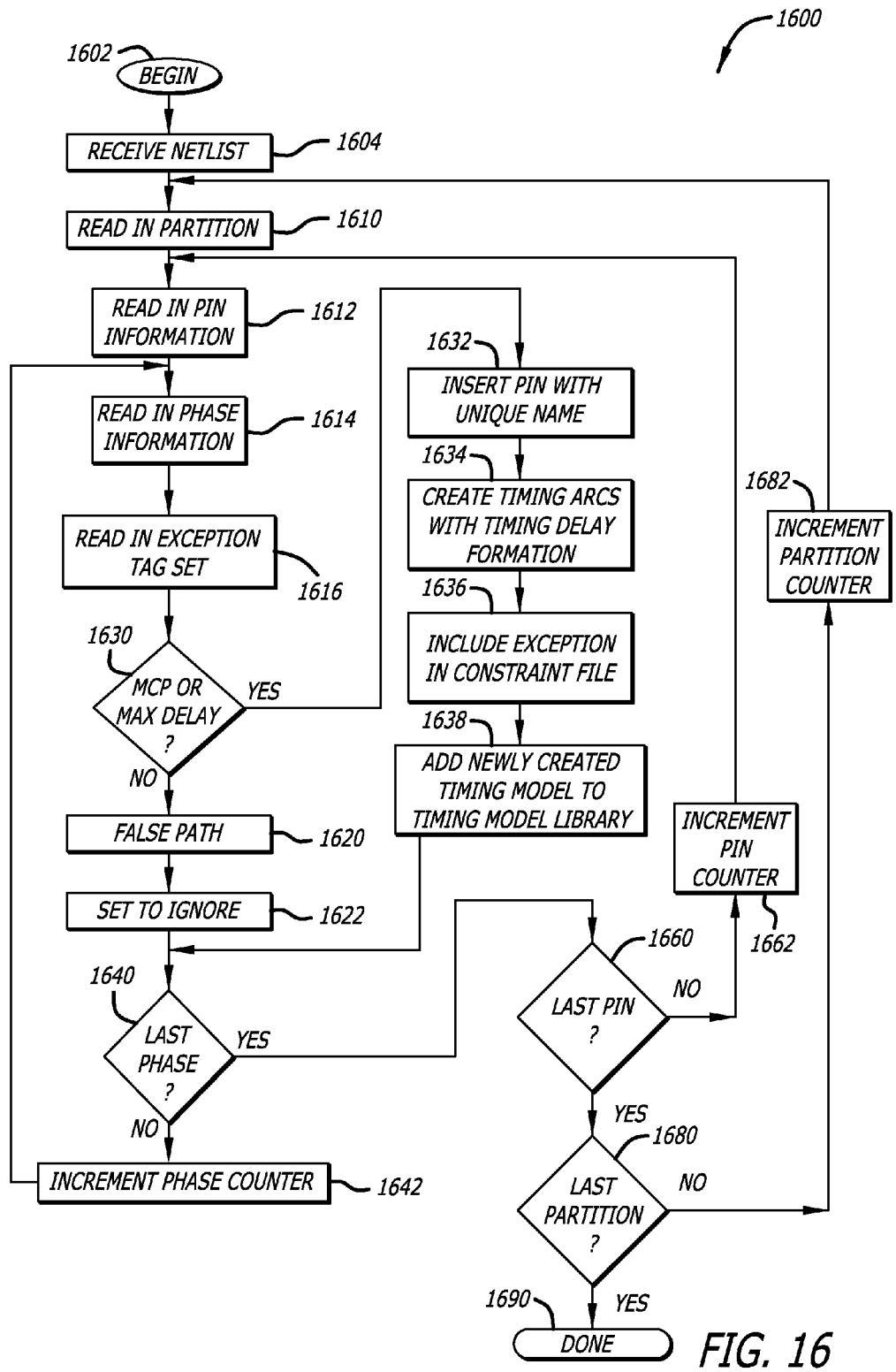
FIG. 16 illustrates a flow chart of a method of identifying exceptions such as false path, maximum delay and multi-cycle paths in partition blocks of an integrated circuit.

Referring now to FIG. 16, a flow chart 1600 is shown to further describe methods of generating multi-phase timing models and constraints for partitions of the integrated circuit design. The integrated chip (IC) designer and or an automated software application may assign one or more attribute phases to one or more pins to indicate a multi-cycle path (MCP), a false path, or a max delay path (MDP). The flow chart 1600 starts or begins at process block 1602 and then goes to process block 1604.

At process block 1604, the top level net list of a hierarchical design of an integrated circuit is received. The process then goes to block 1610.

At process block 1610, a partition of the integrated circuit netlist is read in. If this is the first pass through the functions of the flow chart, then process block 1610 may be deemed to be reading a first partition of the integrated circuit. The process then goes to block 1612.

At process block 1612, a pin of the partition is selected for analysis. If this is the first pass through the functions of the flow chart, then process block 1612 may be deemed to be reading the first pin of the partition. The process then proceeds to block 1614.

At process block 1614, the phase attribute on the partition pin is read in for analysis. If this is the first pass through the functions of the flow chart, then process block 1614 may be deemed to be reading the first phase attribute of the integrated circuit. The process then proceeds to block 1616.

At process block 1616, the sub property exception tag-set is checked for the exception multi-cycle path (MCP) or max delay path (MDP). If it is determined that the exception tag-set designates either a multi-cycle path (MCP) or a max delay path (MCP), then the process proceeds to block 1632. If it is determined that the exception tag-set is not a multi-cycle path (MCP) or a max delay path (MDP), then the process proceeds to block 1620.

At process block 1620, the exception tag-set is not a multi-cycle path (MCP) or a max delay path (MDP) and therefore it is determined to be a false path. The process then proceeds to block 1622.

At process block 1622, assuming an exception tag-set sub property of false path was determined, the phase is then is set to ignore. The process then proceeds to block 1640.

At process block 1640, the current phase assigned to the pin is checked against a list of phase attributes assigned to the pin to determine if it is the last phase to be analyzed or not. If the current phase is not the last phase for the pin, the process goes to block 1642. If the current phase is determined to be the last phase for the pin, the process then proceeds to block 1660.

At process block 1642, the next phase for the pin is selected for analysis. A phase counter may be used and incremented to select the next phase of the given pin for analysis. The process then returns to process block 1614 to analyze the next phase of the pin.

At process block 1660, the current pin being analyzed is checked against a list of pins for the partition to determine if it is the last pin that needs to be analyzed or not. If the current pin is not the last pin, the process goes to block 1662. If the current pin analyzed is determined to be the last pin in the pin list of the partition that needs analyzing, the process goes to process block 1680.

At process block 1662, the next pin from the pin list of the given partition is selected for analysis. A pin counter may be used and incremented to select the next pin for analysis. The process then returns to block 1612 to analyze the next pin.

At process block 1680, the given partition is checked to determine if it is the last partition that needs analysis. If it is determined that the last partition has been analyzed, then the process proceeds to block 1690 and ends. Otherwise if it is determined that the last partition has not been analyzed, then the process proceeds to block 1682.

At process block 1682, a partition list may be checked to select the next partition for analysis. A partition counter may be used and incremented to select the next partition for analysis. The process then returns to process block 1610 to read in the next partition and begin the analysis of its pins.

At process block 1630, assuming an exception tag-set of multi-cycle path (MCP) or max delay path (MDP) was determined for the current phase of the given pin being analyzed, then the process proceeds to process block 1632.

At process block 1632, assuming the exception tag-set has a max delay path (MDP) or multi-cycle path (MCP) for the current phase for the given pin under analysis, an internal multi-phase timing pin with a unique name is created for the multi-phase timing model. The process then proceeds to process block 1634.

At process block 1634, the appropriate timing arcs are created between the newly created internal multi-phase timing pin(s) and corresponding timing arc pin(s) in the timing graph or model. Dummy arcs are then added to the internal multi-phase timing pin(s) and appropriate timing arc pin(s). The process then proceeds to process block 1636.

At process block 1636, the time budgeting constraint file is updated with the newly found exception and may be used by the time budgeting process. The process then proceeds to process block 1638.

At process block 1638, the newly created timing model with its internal multi-phase timing pin(s) and appropriate timing arcs is added to the top level timing model library file. The process then proceeds to process block 1640 to determine if the current phase for the given pin being analyzed is the last phase of the pin that needs analysis.

At process block 1690, this process is completed for a given integrated circuit design and returns to the process shown in the FIG. 10 flow chart.

Single Pass Time Budgeting for Designs with Nested Partitions

Time analysis of a flat very large scale integrated (VLSI) circuit design with full chip timing constraints is difficult and time consuming to complete, if at all. Moreover, a flat integrated circuit design is difficult for multiple design engineers to concurrently design different portions of the integrated circuit design in parallel. Thus, partitioning an integrated circuit design into multiple partitions is desirable. Time budgeting of a partitioned integrated circuit to generate timing constraints for each partition is therefor advantageous for concurrently designing portions of an integrated circuit design in parallel with multiple design engineers.

Figure 22:
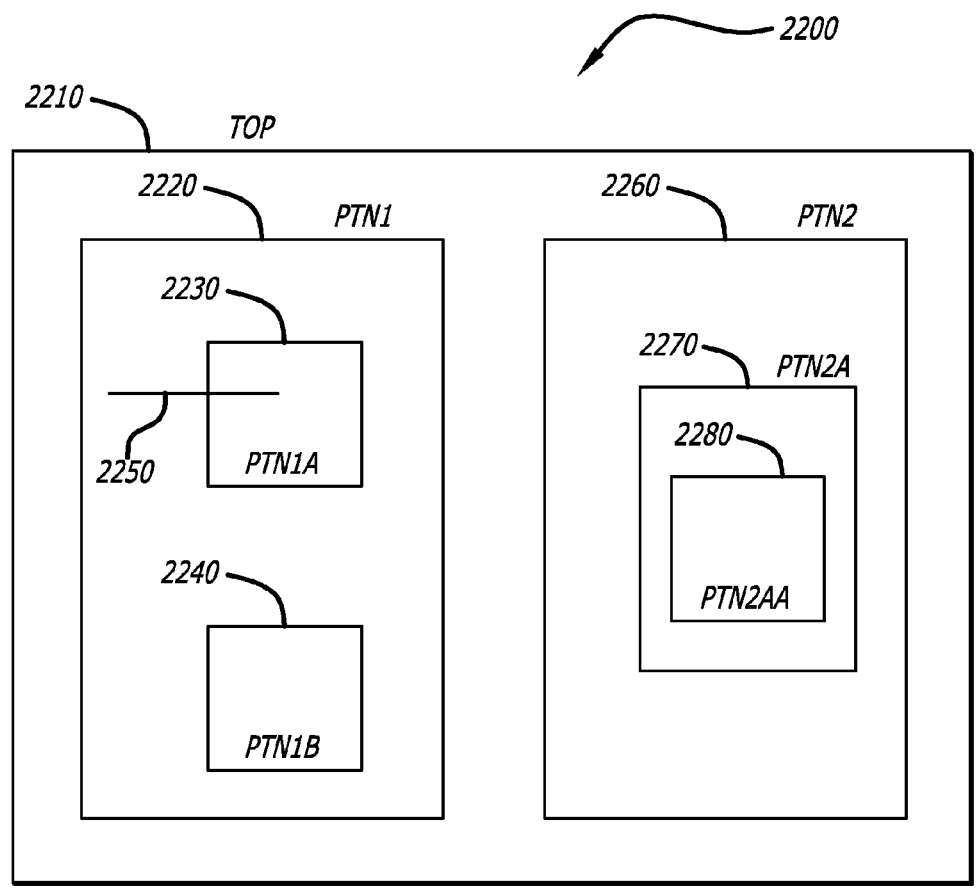
FIG. 22 illustrates a block diagram of a hierarchical integrated circuit design having a hierarchy with nested partitions at multiple levels of hierarchy.

However multiple partitions, especially partitions with nested partitions, makes time budgeting of a partitioned integrated circuit a challenge to accomplish. Previously there was no straightforward design flow available for time budgeting of integrated circuit designs with nested partitions. A nested partition is an inner partition at a lower level of hierarchy within a partition at a higher level of hierarchy. That is, nested partitions are partitions within partitions of a hierarchical integrated circuit design with multiple levels of hierarchy. In FIG. 22, for example, partition PTN2 2260 has a partition PTN2A 2270 inside it, while partition PTN2A 2270 has a partition PTN2AA 2280 inside it. Thus, partitions PTN2A 2270 and PTN2AA 2280 are nested partitions. A nested partition may alternately be referred to as an inner partition or an inner partition portion. The circuits within a partition but outside the nested partition may be referred to as the outer partition portion. The partition containing the nested partition may be referred to as the outer partition. Thus, partition PTN2 2260 may be referred to as the outer partition while partition PTN2A 2270 may be referred to as the nested partition or the inner partition Previously, all of the partitions of an integrated circuit design, including nested partitions, were iteratively processed level by level using multiple time budgeting sessions to generate timing budgets for the partitions. (See FIGS. 23A-23B for example). The iterative process of time budgeting level by level using multiple time budgeting sessions is not straightforward for a user. Moreover, the iterative process of time budgeting level by level for nested partitions using multiple time budgeting sessions may require additional time than the case where there is only a single level of partitions, increasing time to market of an integrated circuit design. Thus, there is a need to simplify the time budgeting process for the user when an integrated circuit design is partitioned into multiple levels of hierarchy.

Referring now to FIG. 22, a top level 2210 of an exemplary integrated circuit design 2200 with partitions is illustrated. The top level 2210 of the exemplary integrated circuit design 2200 includes one or more nested partitions with partitions at multiple levels of hierarchy. The top level 2210 of the exemplary integrated circuit design 2200 includes a partition PTN1 2220 that has two nested partitions PTN1A 2230 and PTN1B 2240 at the first level of nesting and the second level of hierarchy. Neither of the partitions PTN1A 2230 and PTN1B 2240 have further nested partitions at lower levels of hierarchy. The top level 2210 further includes an exemplary partition PTN2 2260. The partition PTN2 2260 has a nested partition PTN2A 2270 at the first level of nesting and the second level of hierarchy. The partition PTN2A 2270 includes a nested partition PTN2AA 2280 at a second level of nesting or partitioning and the third level of hierarchy.

The second level nested partition PTN2AA 2280 may have been partitioned from the partition PTN2A 2270 by the designer to ensure performance of a sub circuit of the integrated circuit design 2200 within the partition, for example. An example of a sub circuit that may be inside an existing partition is an arithmetic logic unit (ALU) that is within a multiplier circuit. There may be timing constraints or performance criteria for the ALU that the designer would like to implement to optimize the multiplier circuit.

As mentioned herein, prior time budgeting of a hierarchical integrated circuit design was an iterative process, time budgeting level by level using multiple time budgeting sessions on one or more computers. The timing budgets for the partitions of the hierarchical integrated circuit design may be generated in a top down approach or a bottoms up approach. In some cases, a partition is represented as a black box. A black box includes a timing model to simplify timing analysis. A black box has the inputs and outputs of the partition and its timing budget and timing constraints (a block box timing model), but lacks a netlist of the internal circuitry. The black box timing model is used to describe the circuit behavior of a partition at its input and output interfaces. One or more internal pins or nodes within the partition may be preserved so that timing constraints/exceptions may be associated with them and considered at upper levels.

For example, consider a top down time budgeting approach to the hierarchy of the IC design 2200 illustrated in FIG. 22. The designer derives timing budgets for the first level of partitions in the hierarchy, partitions PTN1 2220 and PTN2 2260. To generate timing budgets for the inner or next level of partitions below partitions PTN1 2220 and PTN2 2260, the designer loads the partitions PTN1 2220 and PTN2 2260 as top levels so that timing budgets can be generated for the partitions PTN1A 2230, PTN1B 2240, and PTN2A 2270 that are on the same level. The timing budgets for the inner or next level of partitions below partition PTN2A 2270, nested partition PTN2AA 2280, are generated. Partition PTN2A 2270 is loaded as the top level so that the timing budgets can be derived for the nested partition PTN2AA 2280.

Figure 23A:
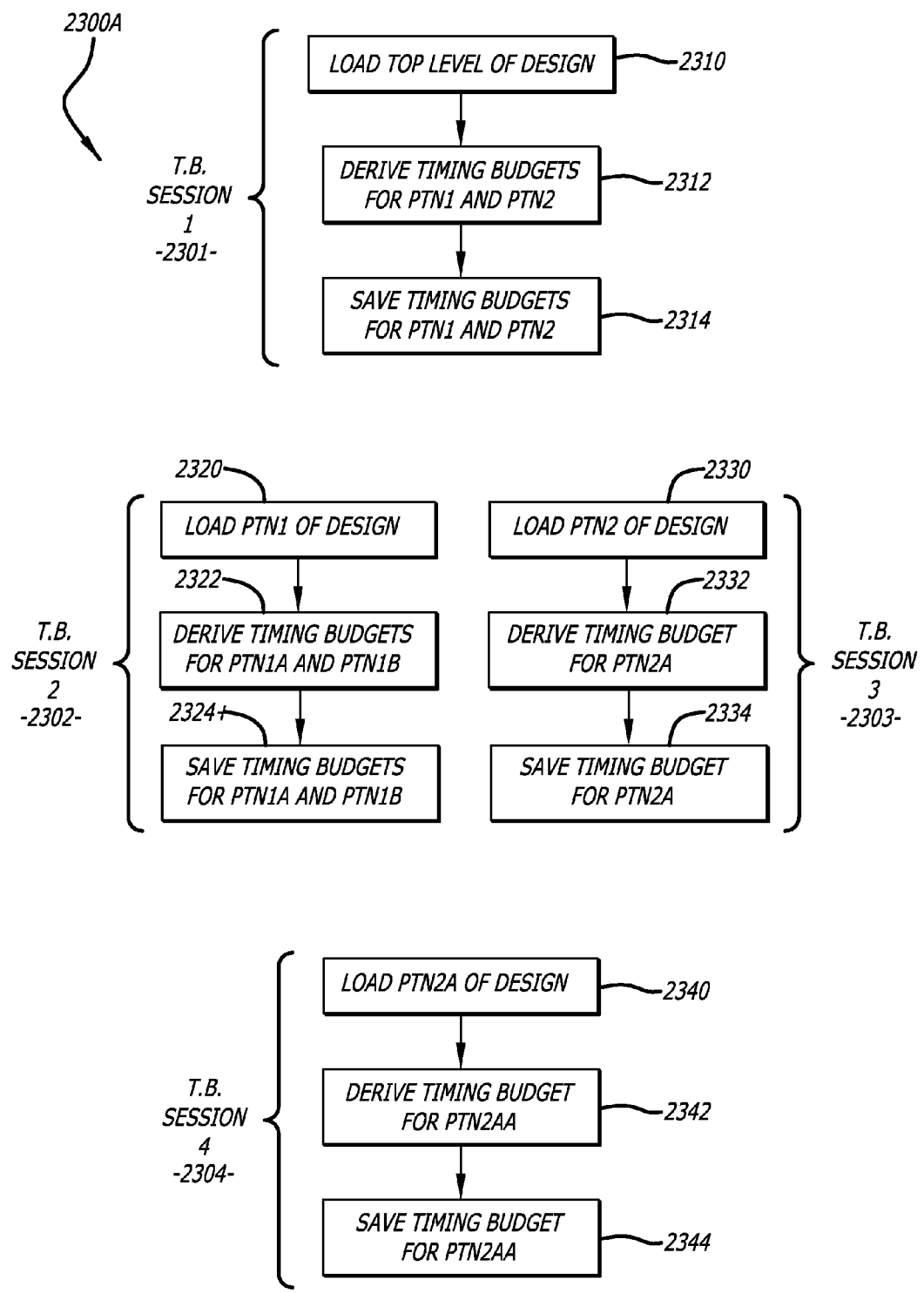
FIG. 23A illustrates a top down timing budget process with multiple time budgeting sessions for the exemplary hierarchy of the integrated circuit design shown in FIG. 22.

Referring now to FIG. 23A, an iterative top down time budgeting process flow 2300A for the hierarchy of the IC design 2200 requires multiple time budgeting sessions 2301-2304. Each of the time budgeting sessions 2301-2304 requires separate execution of time budgeting software and completion of the upper level time budgeting session before moving to lower level time budgeting sessions.

In a first time budgeting session 2301, the process starts at process block 2310 where the top level design 2210 is loaded and processed including partitions PTN1 2220 and PTN2 2260. The top level chip constraints are loaded as well as the high level netlist outside the partitions and therein. At process block 2312, the timing budgeting for partitions PTN1 2220 and PTN2 2260 are derived from the top level constraints, the netlist, and the partition information. Then at process block 2314, the timing budgeting information for partitions PTN1 2220 and PTN2 2260 is saved. The first time budgeting session 2301 can end and then the designer can move on to start up further time budgeting sessions to derive further timing budgets.

In a second time budgeting session 2302, the process starts at process block 2320 where the partition PTN1 2220 is loaded as the top level and processed including partitions PTN1A 2230 and PTN1B 2240. The constraints and timing budget for the partition PTN1 2220 are loaded as well as its timing model. At process block 2322, the timing budgets for the first level of partitions PTN1A 2230 and PTN1B 2240 are derived in response to the timing model, the constraints and timing budget information for the partition PTN1 2220, and partition information for the partitions PTN1A 2230 and PTN1B 2240. Then at process block 2324, the timing budgeting information for partitions PTN1A 2230 and PTN1B 2240 is saved. The second time budgeting session 2302 can end and then the designer can move on to start up a further time budgeting session to derive the timing budget for partition PTN2A 2270.

In a third time budgeting session 2303, the process starts at process block 2330 where the partition PTN2 2260 is loaded as the top level design and processed including partition PTN2A 2270. The constraints and timing budget for the partition PTN2 2260 are loaded as well as its timing model. At process block 2332, the timing budgets for the partition PTN2A 2270 is derived in response to the timing model, the constraints and timing budget information for the partition PTN2, and partition information for the partition PTN2A. Then at process block 2334, the timing budgeting information for partition PTN2A 2270 is saved. The third time budgeting session 2303 can end and then the designer can move on to start up a further time budgeting session to derive the timing budget for the nested partition PTN2AA 2280.

In a fourth time budgeting session 2304, the process starts at process block 2340 where the partition PTN2A 2270 is loaded at the top level design and processed including partition PTN2AA 2280. The constraints and timing budget for the partition PTN2A are loaded as well as its timing model. At process block 2342, the timing budgets for the partition PTN2AA 2280 is derived in response to the timing model, the constraints and timing budget information for the partition PTN2A, and partition information for the partition PTN2AA. Then at process block 2344, the timing budgeting information for partition PTN2AA is saved. The fourth time budgeting session 2304 can end and then the designer send the various partitions and timing budgets to different engineers so that they can be designed in parallel.

Referring now to FIG. 23B, an iterative bottoms up time budgeting process flow 2300B for the hierarchy of the IC design 2200 is illustrated. The iterative bottoms up time budgeting process flow 2300B also requires multiple time budgeting sessions 2305-2307. Each of the time budgeting sessions 2305-2307 requires separate execution of time budgeting software and completion of the lower level time budgeting session before moving to next upper level time budgeting sessions.

In a first time budgeting session 2305, the process starts at process block 2350 where the top level of the integrated circuit design is loaded and processed to read its timing constraints. At process block 2352, the timing budgeting information for partition PTN2AA 2280 is derived. Then at process block 2354, the timing budgeting information for the partition PTN2AA 2280 is saved. The first time budgeting session 2305 can end and then the designer can move to start up further time budgeting sessions to derive further timing budgets.

In a second time budgeting session 2306, the process starts at process block 2370 where the top level of the design 2210 is loaded and processed. At process block 2371, a black box of the partition PTN2AA 2280 is loaded. At process block 2372, the timing budgeting for the partitions PTN1A 2230, PTN1B 2240, and PTN2A 2270 is derived. Then at process block 2374, the timing budgeting information for the partitions PTN1A 2230, PTN1B 2240, and PTN2A 2270 is saved. The second time budgeting session 2306 can end and then the designer can move to start up further time budgeting sessions to derive further timing budgets at a higher level.

In a third time budgeting session 2307, the process starts at process block 2380 where the top level of the design 2210 is loaded and processed. At process block 2381, black box of the partition partitions PTN1A 2230, PTN1B 2240, and PTN2A 2270 are loaded. At process block 2382, the timing budgeting information for the partitions PTN1 2220, and PTN2 2260 is derived. Then at process block 2384, the timing budgeting information for the partitions PTN1 2220, and PTN2 2260 is saved. The third time budgeting session 2307 can then end. A designer can then send the various partitions and timing budgets to different engineers so that they can design each in parallel.

In either of the iterative time budgeting process flows for the hierarchy of the IC design 2200, multiple time budgeting sessions are used to acquire the time budgeting information for each and every partition of an IC design hierarchy with multiple partitions.

There are a number of problems associated with the iterative time budgeting process flows when time budgeting an integrated circuit design with multiple levels of partitions. Incorrect constraints may be created as the nested partitions become black boxes. The internal pins and instances of the inner partitions are no longer available once the partitioning is completed. These issues could lead to an outer partition, a partition that contains an inner partition, having constraints that are unreadable or indeterminate.

Referring now back to FIG. 22, consider the partition PTN1 2220 of the exemplary integrated circuit design 2200. The timing constraints for partition PTN1 2220 could have exceptions or constraints referring to pins that are inside of the partitions PTN1A 2230 and/or PTN1B 2240. However, after the partitions PTN1A 2230 and PTN1B 2240 are committed and replaced with a black box, their internal circuitry and pins are no longer available to the designer. Thus, when the partitions PTN1A 2230 and/or PTN1B 2240 are in black box form during the time budgeting process, the constraints of partition PTN1 2220 that refer to pins that are inside of the partitions PTN1A 2230 and/or PTN1B 2240 are invalid.

Another issue with the iterative time budgeting process flows for time budgeting of multiple levels of partitions is that double budgeting may be needed for the partitions having nested partitions. As the iterative time budgeting process continues, the partitions having nested partitions may undergo time budgeting twice. An IC designer may want to implement a partition with an internal partition being visible. The IC designer may also want to implement the same partition with the internal partition not being visible, i.e. as a black box. The constraints are derived for the same partition twice. The constraints (flat timing constraints) for the partition are derived once with the internal partition(s) being flat. The constraints (black-box timing constraints) for the partition are derived secondly with the internal partition(s) being black boxes. The black-box timing constraints allow a partition to be easily reused and implemented or instantiated repeatedly within the same integrated circuit or over different integrated circuits.

For the partitions as black boxes, the constraints (black-box timing constraints) are generated so that they do not refer to pins within any nested partition. This can be accomplished after the timing budgets for the nested partitions have been generated. The timing libraries of the partitions are used while loading the design for the top to generate timing budgets for the inner nested partitions. Then the top level design is loaded again with the timing libraries of the partitions to generate the timing budgets for the outer partition or upper level partition so that no pin of the nested partitions are referred to in the timing constraints for the outer partition that is being treated as a black box. Manually executing multiple timing sessions to accomplish this can be an error prone process.

Figures 25, 26:
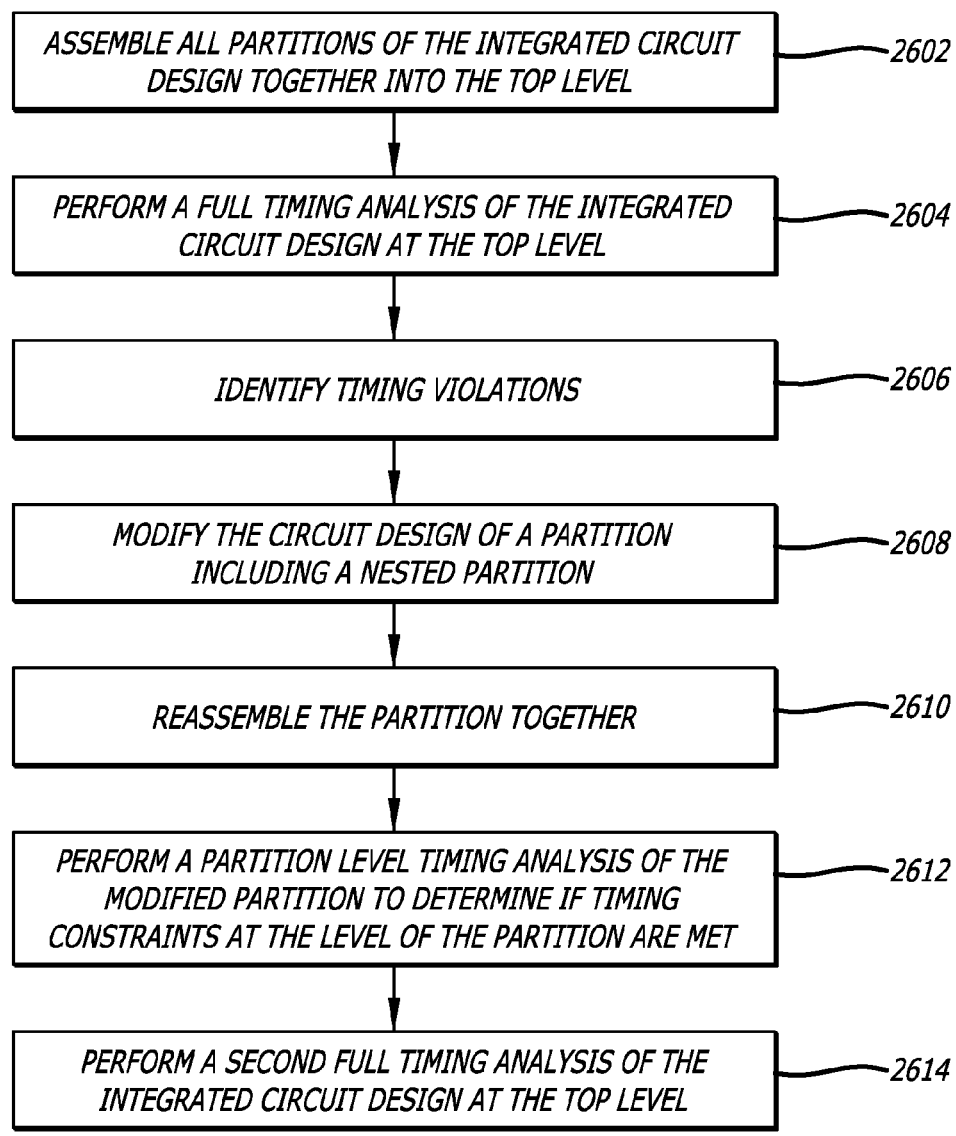
FIG. 25 illustrates an exemplary time budgeting command that includes a double budgeting setting option.
FIG. 26 illustrates a flow chart diagram of an exemplary method of selective timing closure checks.

To automate the derivation of the timing constraints and timing budget with and without the partition being visible or a black box, a global variable or setting is set so that manual repetition of the budgeting process (rebudgeting) by a user is unnecessary. The global variable or setting may be referred to as a dual partition representation option/setting or double budget option/setting (DBS) and may be set in a command line upon execution of the time budgeter. FIG. 25 illustrates an exemplary time budgeting command (deriveTimingBudget) with the DBS variable being set so that the partition with the nested partition, PartitionName, automatically has a dual partition representation with dual timing constraints/exceptions being generated for the two representations of inner nested partitions. In this manner, the timing of a partition can be fully analyzed on its own with the flat timing constraints and as a component of a larger part of an IC design with the black-box timing constraints.

Another problem with the iterative time budgeting process flows for time budgeting of multi-level partitions is the increased time spent executing multiple time budgeting sessions and the resultant lower productivity. The iterative time budgeting process flows use a single level time budgeting methodology. For nested partitions, a time budgeting session is invoked for each level of the multiple levels of partitions such that iterative time budgeting process flow is a slow process and involves many steps. Each level of partition requires loading the design, optimizing, and then performing the time budgeting process. This iterative level-by-level process is time consuming and requires a great deal of a designers time and effort. The iterative time budgeting process flows may drastically increase the time spent before implementation of the integrated circuit design and thereby increase the time to market. The time to market of an integrated circuit design can be a very important and critical milestone in an integrated circuit design project.

Integrated circuit designers desire parallel implementation in order to balance work loads between circuit design engineers and layout designers that perform the integrated circuit implementation and thereby decrease time to market. Layout designers may convert the circuit design representations or symbols into physical layered structures that can then be used to fabricate an integrated circuit design. After a partition is time budgeted, it may be sent to a layout designer for physical implementation. The layout designers can work to physically implement several partitions concurrently. Thereafter, the physical implementations may be integrated together. The circuit designers cannot close the implementation cycle until all the partitions are physically implemented and integrated together. Thus, parallel implementation is desirable.

Unfortunately, nested partitions are typically the last to be implemented due to the lag created by the iterative step-by-step timing budget process flow. Thus with nested partitions, the iterative time budgeting process becomes a sequential implementation process such that layout designers may be unable to work concurrently and in parallel on the partitions of an integrated circuit design. Thus, an iterative time budgeting process on an integrated circuit with nested partitions may increase the time to market of the integrated circuit design.

The single level partition time budgeting process flow 2300 reduces the flexibility for design analysis of circuits by the designer. For example, consider the IC design example illustrated in FIG. 22. After deriving the timing budgets for all the partitions, if a designer would like to implement partition PTN1 2220 with partition PTN1A 2230 and partition PTN1B being flat, without any hierarchy, it is difficult to accomplish with high accuracy. The timing budget generated for partition PTN1 2220 does not include exceptions that are to be applied inside the partitions PTN1A 2230 and PTN1B 2260. The designer would have to re-budget timing of partition PTN1 2220 so that constraints are generated with the exceptions for the nested partitions at lower levels of hierarchy. Having to yet again perform a time budgeting process for the partition PTN1 2220 adds further delay in the analysis of the integrated circuit design.

Single-Step Multi Level Timing Budget Process Flow

In one embodiment of the invention, nested partitions are time budgeted in a single-step multi level timing budget process flow. The problems with using an iterative method utilizing single levels has been previously presented and shown to increase time to market. A single-step multi level timing budget process flow allows the physical implementation to begin sooner by deriving timing budgets (timing constraints) and timing models for all the partitions at all levels of hierarchy of an integrated circuit design in a single-step. Partitioned design data can be sent to design engineers sooner so that portions of the integrated circuit can be designed in parallel to reduce design time and the time to market of an integrated circuit.

Figure 24:
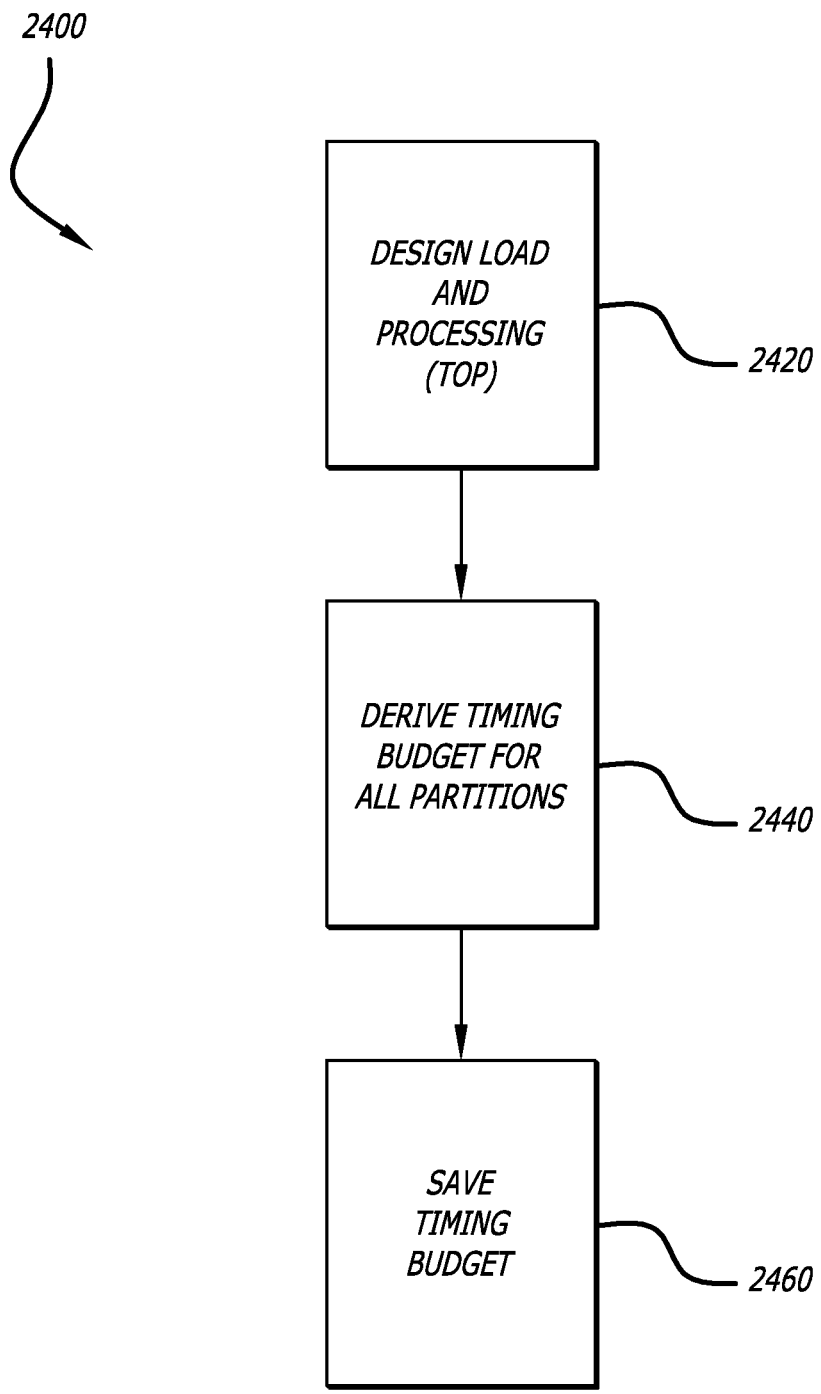
FIG. 24 illustrates a flow chart diagram of the process flow for a single-step multi-level timing budget process flow for an integrated circuit design having a hierarchy with nested partitions.

Referring now to FIG. 24, a single-step timing budget process flow 2400 is illustrated. The top level of the integrated design is read, loaded and processed in process step 2420. In implementing the single step multi-level timing budgeting process, the top level of the design is loaded and the order of the partitions from the innermost partitions at the lowest level of hierarchy to the outermost partitions at the highest level of hierarchy (i.e., from inside to outside) is determined and saved.

The top level of the IC design that is read and loaded includes a full netlist (from the top level through all lower levels of the netlist), a partition floorplan, timing model library of standard cells; and top or chip level timing constraints of the IC design. The full netlist may be in the form of a high level design (HDL) description, a register transfer logic (RTL) description, or a transistor level (e.g., SPICE) description. The netlist for each partition may be converted from a higher level description into a lower level description such as from HDL to RTL through logic synthesis. The partition floorplan defines the hierarchy of partitions including multiple levels with one or more nested partitions. The order of hierarchy of partitions may be determined from the innermost partition to the outermost partition from the floorplan, or if unavailable, from the full netlist description or from other user input. With the partitions being defined, timing models for each partition may be generated from the portion of the netlist within the partition. The timing model library of standard cells includes the timing models and timing information for the standard cells that are to be used in the IC design. The timing model library may be provided by a silicon foundry that is associated with a given semiconductor manufacturing process.

Next at process step 2440, the timing budgets for all the partitions at all levels of hierarchy of the integrated circuit are automatically derived in response to the netlist, a partition floorplan, and top level or chip level timing constraints. Time budgeting of each partition automatically occurs in a bottoms-up or inside-to-outside approach similar to that shown in FIG. 23B, but with a single time budgeting session. All of the innermost partitions at the lowest level of hierarchy are automatically time budgeted first concurrently together. Then, all of the partitions at the next level of hierarchy are automatically time budgeted concurrently together. The automatic time budgeting process continues at each level for all partitions, level by level, from the innermost partition up to and including the outermost partition(s), such as the top level. The timing budgets for each partition are automatically derived concurrently in a single process when the full netlist at the top level of the IC design is available.

Next at process step 2460, the resulting timing budgets are stored into an IC design database. For further design and physical implementation, each partition is saved with their top or outer partition portion as a flat netlist. In one embodiment of the invention, the nested partitions or inner partitions in each partition is saved as a black box. In this case, only the required data of inner partitions are saved for later use. In another embodiment of the invention, the nested partitions or inner partitions in each partition is saved both as a black box and as a full flat netlist with timing budgets and timing constraints for each. When an inner partition is saved in black box form, most of the timing information is associated with the interface pins and their pin names. However, some information is saved with the black box that may also moved up into the outer partition portion to save information that would otherwise be lost when the partitions are committed into black box form and removed from the partition netlist. For example, the internal pin names of the nested partition are saved because a timing constraint may be written for them.

The single-step timing budget flow concurrently derives timing budgets for all the partitions of a hierarchical IC design at all levels of hierarchy with a single time budgeting session. As illustrated by FIG. 24, a single-step timing budget process flow simplifies hierarchical time budgeting for an integrated circuit design. This is enabled by deriving timing budgets in a single-step and only saving required data of the nested partitions after the partitions have been committed. A partition is committed when it has been replaced with a black box representation including interface pins, a timing model, and timing constraints associated with the interface pins. The required data for partitions and nested partitions is generated and saved early in the time budgeting flow when all of the design data for the integrated circuit chip is available. In the embodiments of the invention, there are no multiple timing budgeting sessions with repeated iterations of loading and processing of a top level of the IC design to obtain timing budgets for a partition that includes a nested partition, such those illustrated in FIG. 22.

The extra timing budgeting data that is saved for the nested partitions after it is committed to a black box representation is minimal. Besides the interface or outer pin names, some internal data of a black box of a partition is kept available, namely the internal pin names that are used to write timing constraints. The pin names are stored in a string form format. The lower level, internal, or inner nested partitions become black boxes after they are committed. The timing paths and other things, such as the netlist, are unavailable in a black box partition, they may be referred to as being invisible. The timing connectivity and everything is derived and stored at the deriveTimingBudget level itself. The path exceptions are also processed during time budgeting at the deriveTimingBudget level to save information that might otherwise be lost after committing the partitions to black box form.

Flexible Partition Implementation Constraints

In another embodiment of the invention, a single-step timing budgeting process flow provides flexibility to the designer for implementing the nested partitions as a flat circuit or netlist and at the same time as a black box. In the case of the black box, the nested partition is only represented by a timing model with input/output pins and timing constraints/exceptions. Concurrently representing a nested partition as both a flat circuit and a black box with proper timing exceptions/constraints for each, avoids extra timing budgeting sessions regarding the double time budgeting issue described previously. The outer partition (the partition containing the nested partition) is implemented in each case as a flat circuit with all the circuitry available for analysis.

Two sets of timing exceptions/constraints may be concurrently generated for the partition with both representations of the inner nested partition by setting the predetermined global variable (DBS) prior to the loading of the chip or top level timing constraints. As shown in FIG. 25, for example, the single global variable (e.g., -DBS) can be set in the timing budget command deriveTimingBudget so that during the timing budgeting process dual sets of timing exceptions/constraints (flat timing constraints and black box timing constraints) are concurrently determined in a single time budgeting session for the two different representation of the inner nested partitions.

A timing constraint/exception may extend from the top level and/or outer partition to an object (e.g., a gate, a node, or a circuit) inside the inner nested partition. In this case, with the user setting the DBS global variable, the timing exceptions/constraints for a partition with the inner nested partition are written in two sets. One set of timing exceptions/constraints is written for the partition considering that the nested partition is a flat netlist (or visible netlist) and a second set of timing exceptions/constraints is written for the partition considering that the nested partition is a black box model.

The timing exceptions/constraints may be written in equation format, such as follows for example:

if {UseFlatPins} {
  set_multicycle_path 2-through Ptn1/in-through Ptn1/Ptn1A/bufin/A
} else {
  set_multicycle_path 2-through Ptn1/in-through Ptn1/Ptn1A/in
}

In the case of the flat netlist (UseFlatPins), all the objects (e.g., gates and node names) are available so the timing exception/constraint can readily be associated with it. In the case of the black-box representation of the inner partition, objects may be pushed to a port to maintain the timing exception/constraint associated with the inner nested partition. For example, the buffer bufin and its input A are pushed from the inner partition to the inner partition port with the second timing exception.

As a further example, reference is now made to FIGS. 21A-21C. In FIG. 21A, a block diagram of an integrated chip (IC) design 2100 is shown with a top level 2110 to further discuss exception handling of a partitioned IC design with nested partitions. The top level 2100 includes a circuit element, a flip flop FF1 2120, with an output pin Q 2121 that is connected to an outer partition PTN1 2130 through the partition input pin IN 2131.

The outer partition PTN1 2130 contains a circuit element, buffer/inverter A1 2140, and an inner nested partition PTN2 2150. The buffer/inverter A1 2140 has an input pin A 2141 that is connected to the outer partition PTN1 2130 through the partition input pin IN 2131 and an output pin Y 2142 that is connected to inner nested partition PTN2 2150 via the input pin IN 2151.

The inner nested partition PTN2 2150 includes a first circuit element, buffer/inverter B1 2160, coupled to a second circuit element, flip flop FF2 2170. The input pin IN 2151 of the inner nested partition PTN2 2150 is connected to an input pin A 2161 of the buffer/inverter B1 2160. An output pin Y 2162 of the buffer/inverter B1 2160 connects to an input pin D 2171 of the flip flop FF2 2170.

One or more timing exceptions/constraints for the IC design 2100 may cross partition boundaries from an object at the top level 2110 to an object inside the inner nested partition PTN2 2150. For example, consider a top level timing exception/constraint to be:

Set_multicycle_path 2-from FF1/Q-to PTN1/PTN2/FF2/D.

This exemplary top level timing constraint from the Q output 2121 of the flip flop FF1 to the D input pin 2171 of the flip flop FF2 2170 crosses the boundaries of both the outer partition PTN1 2130 and the inner nested partition PTN2 2150.

It is desirable to have the outer partition PTN1 2130 designed separate and apart from the top level. Thus, a timing budget is generated for the outer partition PTN1 2130. A user desires to represent the inner nested partition PTN2 2150 as both a black box and as a flat or visible netlist. In which case, the exemplary top level timing exception/constraint needs to be budgeted into the outer partition PTN1 2130 for the dual representation of the inner nested partition PTN2 2150.

With the user setting the dual representation global variable, two sets of timing exceptions/constraints are generated for the outer partition PTN1 with the inner nested partition being represented by a flat netlist and a black box.

In the first case, case 1, the timing exceptions/constraints for the outer partition PTN1 2130 is generated from the top level timing exceptions/constraints with the inner nested partition PTN2 2150 being treated as a black box that is committed. In the second case, case 2, the timing exceptions/constraints for the outer partition PTN1 2130 is generated from the top level timing exceptions/constraints with the inner nested partition PTN2 2150 being uncommitted, having a full netlist of the circuits available therein, such as with a flat netlist for example.

Referring now to FIG. 21B, the first case 1 2180 is shown illustrating the outer partition PTN1 2130 with the inner nested partition PTN2 2105 being represented as a black box. With the inner nested partition PTN2 being represented by a black box, the circuit descriptions of the buffer/inverter B1 2160 and the flip flop FF2 2170 are eliminated. Providing a black box to represent the inner nested partition PTN2 minimizes the time budgeting analysis by considering timing only at the input port and input pin IN 2151 and not circuitry within partition PTN2. In the case of the black box, the timing exception within the inner nested partition PTN1 is pushed out/up to the ports/pins at the boundary of the inner partition PTN2. Similarly, a timing exception may be pushed in/down to the ports/pins at the boundary of the inner partition. The exemplary timing exception for the partition PTN1 2130 is written as:

Set_multicycle_path 2-through A-through PTN2/A

With a black box representation of the inner nested partition, the timing exception can no longer refer to the D input (FF2/D) of the flip flop FF2. This is because with the circuit description of the inner nested partition is eliminated so that the D input pin is not available.

Referring now to FIG. 21C, the second case 2 2190 of the outer partition PTN1 2130 is illustrated with the inner nested partition PTN2 being fully represented by a flat netlist description. As the inner nested partition PTN2 in this case is uncommitted, the circuit elements of the buffer/inverter B1 2160 and the flip flop FF2 2170 within the inner partition PTN2 2150 are available as shown. With a full netlist of the inner partition PTN2 available, the exemplary top level timing constraint/exception for the IC design 2100 is written for the partition PTN1 2130 as follows:

Set_multicycle_path 2-through A-to PTN2/FF2/D

With a full netlist representation of the inner nested partition, the timing exception can refer to the D input (FF2/D) of the flip flop FF2 within the inner nested partition. This timing exception also refers to the input A 2141 of the buffer/inverter A1 within the outer partition PTN1.

Previously, a designer would have executed two or more time budgeting sessions in order to generate two sets of timing constraints/exceptions for a partition with a nested partition using an iterative single level timing budget flow. With the embodiment of the present invention, a designer/user no longer needs to manually write dual timing constraints for each instance/pin. With the embodiment of the invention automatically and concurrently generating dual timing constraints for both a flat representation and a black box representation of the inner partition, provides flexibility in the implementation of a circuit design.

Selective Post Assembly Timing Closure

In another embodiment of the invention, the single-step multi level timing budget flow provides selective timing closure checks. After assembling all of the partitions together into and with the top level, full chip timing is analyzed to see if top chip level timing constraints are met (post assembly full chip timing closure). In the case that the post assembly full chip timing closure is not met, a designer can perform a more limited timing closure check (a partition level timing check) of one or more partitions and nested partitions therein to identify where the timing problem is located. With the timing closure problem identified in a partition, changes can be implemented to circuits within the partitions and/or nested partitions to fix the timing problem at that level. The partition level timing closure check can then be repeated to determine if the timing problem has been solved at the partition level. With the timing check performed and the timing problem solved at the partition level, a repetition of the full chip timing closure procedure is unnecessary. Repetition of the full chip timing closure procedure is a lengthy and time consuming process that can be avoided if the repeated partition level timing closure is met.

To further illustrate this timing closure process for example, reference is now made to FIGS. 22 and 26.

At block 2602, after the design of each partition is completed, all partitions of the integrated circuit design 2210 are assembled together into the top level.

At block 2604, a full timing analysis of the integrated circuit design is performed at the top level to determine if timing constraints of the top level are met.

At block 2606, a timing violation is identified as being caused at a lower level by a partition having an inner nested partition and an outer partition portion. The timing violation in the partition is determined by performing a level by level top down timing analysis of each partition at each level until the partition cause the timing violation (partition level timing violation) is found out.

Assume that after post assembly of the integrated circuit design 2210 with all its partitions that a full timing check finds that a timing path 2250 (e.g., a data, clock, control or other type of signal path) within partition PTN1 2220 that extends into the inner nested partition PTN1A 2230 violates a timing constraint (timing violation).

At block 2608, the circuit design of partition including the nested partition is modified to overcome the timing violation and meet the violated timing constraint. In order to fix this timing violation and meet the timing constraint, assume that a change to a circuit needs to be made within the nested partition PTN1A 2230. In this case, the outer partition portion of the partition PTN1 2220 need not change. The circuit change is made to the flat circuit representation of the nested partition PTN1A 2230.

At block 2610, the modified circuit in the partition is assembled back into the partition to reassemble it together. The modified nested partition is assembled back into the outer partition portion of the partition PTN1 2220. A subsequent partition level timing check of the partition PTN1 2220 need only be made to determine if the timing constraint is now met by the circuit change.

At block 2612, a partition level timing analysis is performed on the modified partition to determine if timing constraints at the level of the partition are all now met. If all timing constraints are met at the partition level of the partition PTN1 2220 through a partition level timing analysis, then the timing constraints at the top level will be met. In this manner, a repetition of a full timing check of the integrated circuit design 2210 is unnecessary.

Regardless, a designer/user may still want to perform another full timing check of the integrated circuit design 2210 but with the knowledge that the timing constraints should be met after the partition level timing check. In which case at block 2614, a second full timing analysis of the integrated circuit design is performed at the top level to be certain that the timing constraints of the top level are met after the timing constraints at the level of the partition are met.

Computer System for Use with Time Budgeting Software

Figure 17:
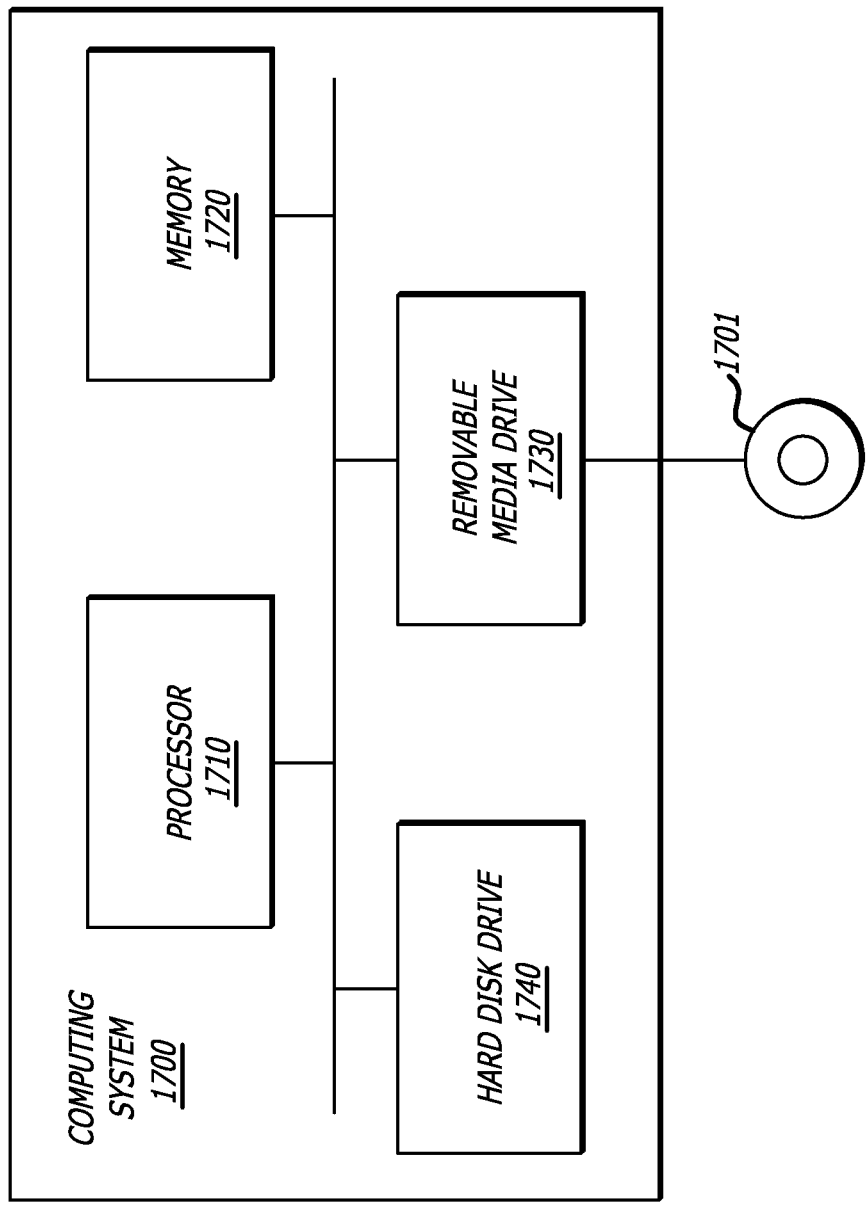
FIG. 17 illustrates a computing system that may be used to perform some or all of the processes in accordance with several of the embodiments of the invention.

Referring now to FIG. 17, a computing system 1700 is illustrated that may be used to perform some or all of the processes in accordance with a number of embodiments of the invention. In one embodiment of the invention, the computing system 1700 includes a processor 1710, a memory 1720, a removable media drive 1730, and a hard disk drive 1740.

In one embodiment, the processor 1710 executes instructions residing on a machine-readable medium, such as the hard disk drive 1740, a removable medium 1701 (e.g., an optical medium (compact disk (CD), digital video disk (DVD), etc.), a magnetic medium (magnetic disk, a magnetic tape, etc.), or a combination of both. The machine-readable medium may be considered a non-transitory medium because it can store instructions in a static manner. The instructions may be loaded from the machine-readable medium into the memory 1720, which may include random access memory (RAM), dynamic RAM (DRAM), or other type of storage device or mechanism. The processor 1710 may retrieve the instructions from the memory 1720 and execute the instructions to perform the operations described herein.

Note that any or all of the components and the associated hardware illustrated in FIG. 17 may be used in various embodiments of the system 1700. However, it should be appreciated that other configurations of the system 1700 may include more or less devices than those shown in FIG. 17.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

When implemented as an apparatus for performing the operations described herein, the apparatus may be specially constructed for the required purposes, or it may comprise a general-purpose computer selectively activated or reconfigured by a computer program stored in the computer. Such a computer program may be stored in a computer readable storage medium, any type of storage media or device suitable for storing electronic instructions, and each coupled to a computer system bus.

The processes presented herein are not inherently related to any particular computer or other apparatus. Various general-purpose systems may be used with programs in accordance with the teachings herein, or it may prove convenient to construct a more specialized apparatus to perform the operations described.

When implemented in software, the elements of the embodiments of the invention are essentially the program, code segments, or instructions to perform the tasks. The program, code segments, or instructions can be stored in a processor readable medium or storage device that can be read and executed by a processor or other type of computing machine. The processor readable medium may include any storage medium or storage device that can store information in a form readable by a processor or other type of computing machine.

The program or code segments may be downloaded via computer networks such as the Internet, Intranet, etc. and stored in the processor readable medium or storage device.

When implemented as a system, such as an electronic computer aided design (ECAD) system, the elements of the embodiments of the invention include one or more processors to execute the program, code segments, or instructions that may be stored in a processor readable medium or storage device to perform the tasks or functions of a method or process. The one or more processors may be specifically adapted to electronic computer aided design including processing logic that may comprise hardware (e.g., circuitry, dedicated logic, etc.), software, or a combination of both.

CONCLUSION

The single-step multi level timing budget process flow for timing budgeting of an entire IC design with nested partitions has a number of advantages over the single level timing budget process flow that is run iteratively in multiple timing budget sessions. Time budgeting for the nested partitions provides additional granularity in analyzing an integrated chip design and allows for parallel/concurrent implementation of the integrated chip design. The single-step multi level timing budget process flow provides a designer/user with a one shot derivation of the budgets for partitions having nested partitions saving considerable time. The single-step multi level timing budget process flow provides an option to generate dual constraints for a partition when replacing a nested partition with black box and thus eliminating having to repeat the time budgeting process.

Additionally, the single-step multi level timing budget process flow provides flexibility in that a black box and/or flat models may be optionally generated for the nested partition. The single-step multi level timing budget process flow provides the ability to have a faster post assembly timing closure through identifying, modifying, and achieving timing closure of a localized partition and nested partition that avoids repeating the full chip timing closure and thereby saving time and IC design resources. Thus, overall the single-step multi level timing budget process flow can provide productivity gains in the design of integrated circuits.

The embodiments of the invention are thus described. While embodiments of the invention have been particularly described, they should not be construed as limited by such embodiments. The embodiments of the invention should be construed according to the claims that follow below.

What is claimed is:

1. A method of designing an integrated circuit, the method comprising:
   receiving a plurality of top level timing constraints and a description of the integrated circuit design defining a hierarchy of a plurality of partitions having multiple levels with at least one partition having one or more nested partitions;
   generating timing models for each partition of the plurality of partitions in response to the description of the integrated circuit design, wherein at least one of the nested partitions is represented by a black box having a black box timing model; and
   with a processor, in response to the description of the integrated circuit design, the timing models, and the plurality of top level timing constraints, concurrently generating timing budgets level by level for all partitions at each level, beginning with a lowest level to each next upper level of the hierarchy of the partitions.

2. The method of claim 1, wherein
the timing budget for each partition includes one or more timing constraints associated with one or more interface pins of the timing model associated with input/output ports of each partition.

3. The method of claim 2, wherein
the timing budget for each partition includes one or more timing constraints associated with one or more inner pins of the timing model.

4. The method of claim 1, wherein
each partition with a nested partition includes an outer partition portion within the partition outside the nested partition, and
the concurrent generation of timing budgets for each partition with a nested partition includes:
   generating a first timing budget for the nested partition;
   committing a netlist of the nested partition such that the nested partition is represented by a black box having a black box timing model;
   generating a first timing budget for the partition with the nested partition in response to the black box timing model and the first timing budget of the nested partition.

5. The method of claim 4, wherein
the concurrent generation of timing budgets for each of the one or more nested partitions further includes:
   saving the internal pin names for nodes of the nested partition; and
   discarding the netlist of the nested partition to conserve computing resources.

6. The method of claim 4, wherein
the first timing budget of the nested partition includes black box timing constraints for the black box timing model without referring to objects within the nested partition.

7. The method of claim 6, wherein
a dual partition representation option is selected for an inner nested partition within a partition, and
the concurrent generation of timing budgets for each partition with a nested partition further includes:
   saving the netlist of the nested partition for implementation; and
   generating at least one dual timing constraint/exception for the partition in response to the flat netlist of the nested partition, wherein the at least one dual timing constraint/exception includes a reference to an object within the flat netlist of the nested partition.

8. The method of claim 7, wherein
the concurrent generation of timing budgets for each of the one or more partitions with a nested partition further includes:
pushing down one or more interface circuits of the outer partition portion into one or more ports of the inner nested partition or pushing up one or more interface circuits of the inner nested partition into one or more ports of the inner nested partition.

9. The method of claim 5, wherein
the concurrent generation of timing budgets for at least one partition with a nested partition further includes:
   generating one or more lower level timing constraints in response to the saved internal pin names; and
   pushing the lower level timing constraints associated with the nested partition up to one or more upper levels of hierarchy of the plurality of partitions.

10. The method of claim 1, wherein
the timing models for each partition are timing graphs.

11. A system for designing an integrated circuit, the system comprising:
- a processor to execute instructions; and
- a storage device to couple to the processor, the storage device to store instructions that when executed cause the processor to perform the operations of
    - receiving a plurality of top level timing constraints and a description of the integrated circuit design;
    - determining an order of hierarchy of partitions from an innermost partition to an outermost partition; and
    - in response to the order of hierarchy of partitions, the top level timing constraints, and the description of the integrated circuit design, concurrently generating timing budgets level by level from the innermost partition to the outermost partition for all partitions at each level, including generating a timing budget for a black box timing model.

12. The system of claim 11, wherein
the description of the integrated circuit design is a high level design language (HDL) description.

13. The system of claim 12, wherein the storage device stores further instructions that when executed cause the processor to further perform the operations of
- reading the HDL description of the integrate circuit design; and
- generating a register transfer level description of the integrated circuit design.

14. The system of claim 11, wherein
the description of the integrated circuit design is a transistor level netlist description.

15. A non-transitory machine readable media having stored thereon instructions that when executed by a machine causes the machine to perform operations comprising:
- receiving a plurality of top level timing constraints and a description of the integrated circuit design defining a hierarchy of partitions having multiple levels with one or more nested partitions;
- generating timing models for each partition of the plurality of partitions in response to the description of the integrated circuit design, wherein at least one of the nested partitions is represented by a black box having a black box timing model; and
- concurrently generating timing budgets level by level for all partitions at each level, beginning with a lowest level to each next upper level of the hierarchy of the partitions in response to the description of the integrated circuit design, the timing models, and the plurality of top level timing constraints.

16. The non-transitory machine readable media of claim 15, wherein
- each partition with a nested partition includes an outer partition portion within the partition outside the nested partition, and
- the machine readable media has further instructions stored thereon that when executed by a machine causes the machine to perform operations for concurrent generation of timing budgets of each partition with a nested partition comprising:
    - generating a first timing budget for the nested partition;
    - committing a netlist of the nested partition such that the nested partition is represented by a black box having a black box timing model;
    - generating a first timing budget for the partition with the nested partition in response to the black box timing model and the first timing budget of the nested partition.

17. The non-transitory machine readable media of claim 16, wherein
the machine readable media has further instructions stored thereon that when executed by a machine causes the machine to perform operations for concurrent generation of timing budgets of each partition with a nested partition comprising:
- saving the internal pin names for nodes of the nested partition; and
- discarding the netlist of the nested partition to conserve computing resources.

18. The non-transitory machine readable media of claim 16, wherein
the first timing budget of the nested partition includes black box timing constraints for the black box timing model without referring to objects within the nested partition.

19. The non-transitory machine readable media of claim 18, wherein
- a dual partition representation option is selected for an inner nested partition within a partition, and
- the machine readable media has further instructions stored thereon that when executed by a machine causes the machine to perform operations for concurrent generation of timing budgets of each partition with a nested partition comprising:
    - saving the netlist of the nested partition for implementation; and
    - generating at least one dual timing constraint/exception for the partition in response to the flat netlist of the nested partition, wherein the at least one dual timing constraint/exception includes a reference to an object within the flat netlist of the nested partition.

\* \* \* \* \*